(12) United States Patent
Kaechi

(10) Patent No.: US 11,172,523 B2
(45) Date of Patent: Nov. 9, 2021

(54) COMMUNICATION APPARATUS FOR EXECUTING SERVICE, CONTROL METHOD AND STORAGE MEDIUM THEREFOR, AND COMMUNICATION SYSTEM

(71) Applicant: CANON KABUSHIKI KAISHA, Tokyo (JP)

(72) Inventor: Shuya Kaechi, Hashimoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 16/264,931

(22) Filed: Feb. 1, 2019

(65) Prior Publication Data
US 2019/0166639 A1 May 30, 2019

Related U.S. Application Data

(63) Continuation of application No. PCT/JP2017/021956, filed on Jun. 14, 2017.

(30) Foreign Application Priority Data

Aug. 10, 2016 (JP) .............................. JP2016-158125

(51) Int. Cl.
*H04W 76/14* (2018.01)
*H04L 29/08* (2006.01)
(Continued)

(52) U.S. Cl.
CPC ............. *H04W 76/14* (2018.02); *H04L 29/06* (2013.01); *H04L 29/08* (2013.01); *H04W 84/20* (2013.01)

(58) Field of Classification Search
CPC ...... H04W 76/14; H04W 84/20; H04L 29/06; H04L 29/08
See application file for complete search history.

(56) References Cited

U.S. PATENT DOCUMENTS 8,189,835 B2 * 5/2012 Dietz .................. H04R 25/554
381/315
10,097,931 B2 * 10/2018 Solum ................. H04R 25/552
(Continued)

FOREIGN PATENT DOCUMENTS

| CN | 101751778 A | 6/2010 |
| CN | 103581451 A | 2/2014 |

(Continued)

OTHER PUBLICATIONS

The above documents were cited in a Dec. 18, 2020 Chinese Office Action, which is enclosed with an English Translation, that issued in Chinese Patent Application No. 201780049294.9.
(Continued)

*Primary Examiner* — Lewis G West
(74) *Attorney, Agent, or Firm* — Cowan, Liebowitz & Laman, P.C.

(57) ABSTRACT

A communication apparatus comprises: a communication unit configured to establish a connection with an external apparatus and communicating data with the external apparatus in order to execute a predetermined service; and a control unit configured to control the communication unit so that the communication apparatus operates as a first role in the case of connecting to a first external apparatus operating as a second role, and so that the communication apparatus operates as the second role in the case of connecting to a second external apparatus operating as the first role, wherein the control unit controls the communication unit so that the communication apparatus operates as the second role to connect to the second external apparatus operating as the first role in between times when the communication apparatus carries out a process for operating as the first role and periodically transmitting a predetermined signal.

12 Claims, 54 Drawing Sheets

(51) Int. Cl.
*H04L 29/06* (2006.01)
*H04W 84/20* (2009.01)

(56) References Cited

U.S. PATENT DOCUMENTS

| | | | | |
|---|---|---|---|---|
| 10,200,843 | B1* | 2/2019 | Chen | H04W 4/02 |
| 10,841,976 | B2* | 11/2020 | Ferrari | H04W 4/80 |
| 2007/0283075 | A1 | 12/2007 | Patton | |
| 2010/0056054 | A1 | 3/2010 | Yamato et al. | |
| 2010/0312849 | A1* | 12/2010 | Miyabayashi | H04W 12/50 |
| | | | | 709/209 |
| 2014/0071807 | A1* | 3/2014 | Tohzaka | H04W 48/20 |
| | | | | 370/216 |
| 2014/0169599 | A1* | 6/2014 | Solum | H04R 25/554 |
| | | | | 381/315 |
| 2015/0281943 | A1* | 10/2015 | Iwamoto | H04W 52/0274 |
| | | | | 455/420 |
| 2016/0073188 | A1* | 3/2016 | Linden | H04R 1/1025 |
| | | | | 381/309 |
| 2018/0184234 | A1* | 6/2018 | Chen | H04W 76/14 |
| 2019/0182415 | A1* | 6/2019 | Sivan | G06F 3/013 |

FOREIGN PATENT DOCUMENTS

| | | |
|---|---|---|
| EP | 1223715 A1 | 7/2002 |
| EP | 2744233 A2 | 6/2014 |
| JP | 2003-107335 A | 4/2003 |
| JP | 2009-267852 A | 11/2009 |
| JP | 2010-252193 A | 11/2010 |
| WO | 2016/103556 A1 | 6/2016 |
| WO | 2017/051173 A1 | 3/2017 |

OTHER PUBLICATIONS

The US Publication and foreign documents 2 and 3 were cited the International Search Report of PCT/JP2017/021956 Aug. 29, 2017, which is enclosed.

The above patent documents were cited in a European Partial Search Report dated Jan. 8, 2020, which is enclosed, that issued in the corresponding European Patent Application No. 17839052.2.

* cited by examiner

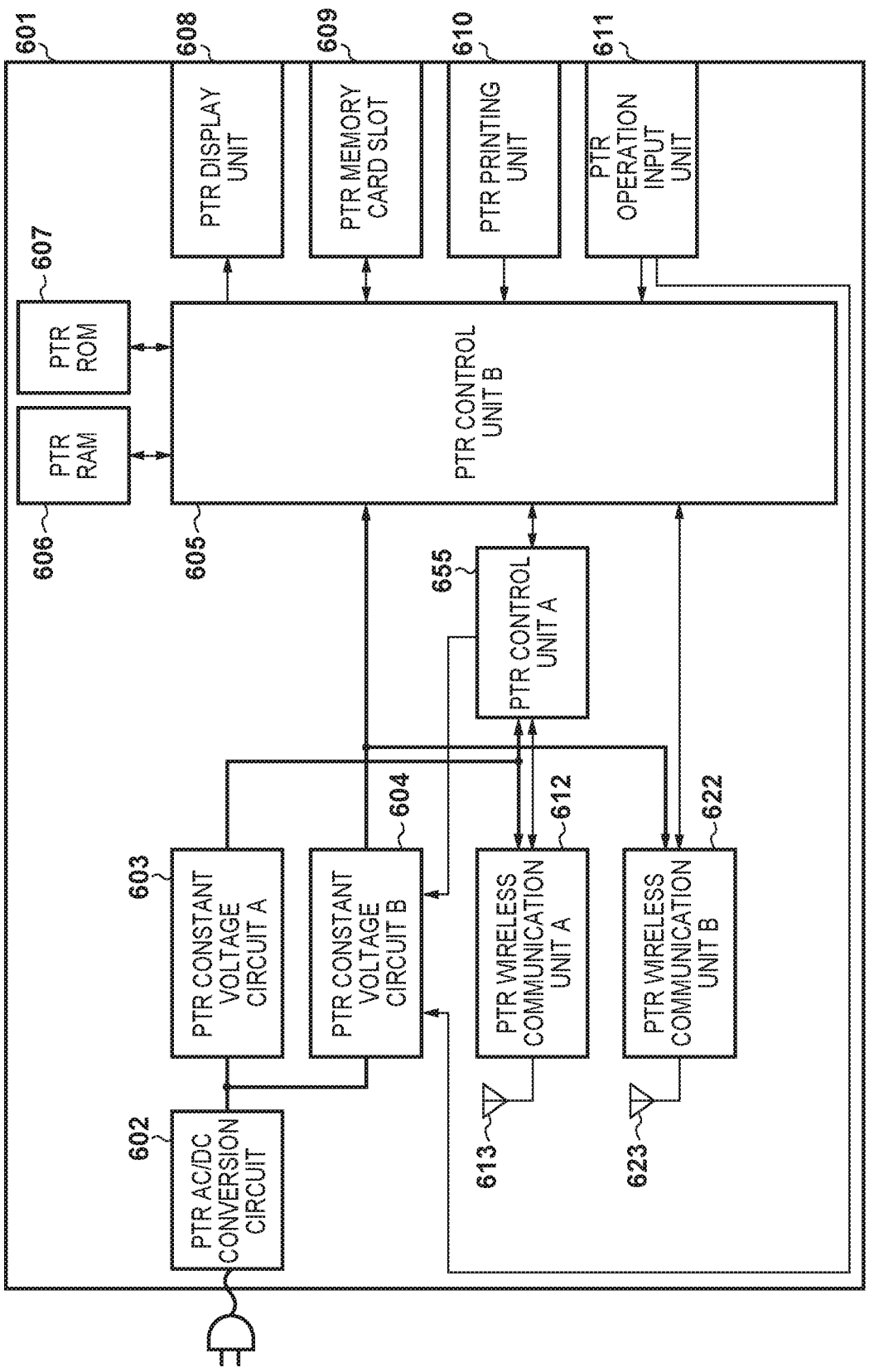

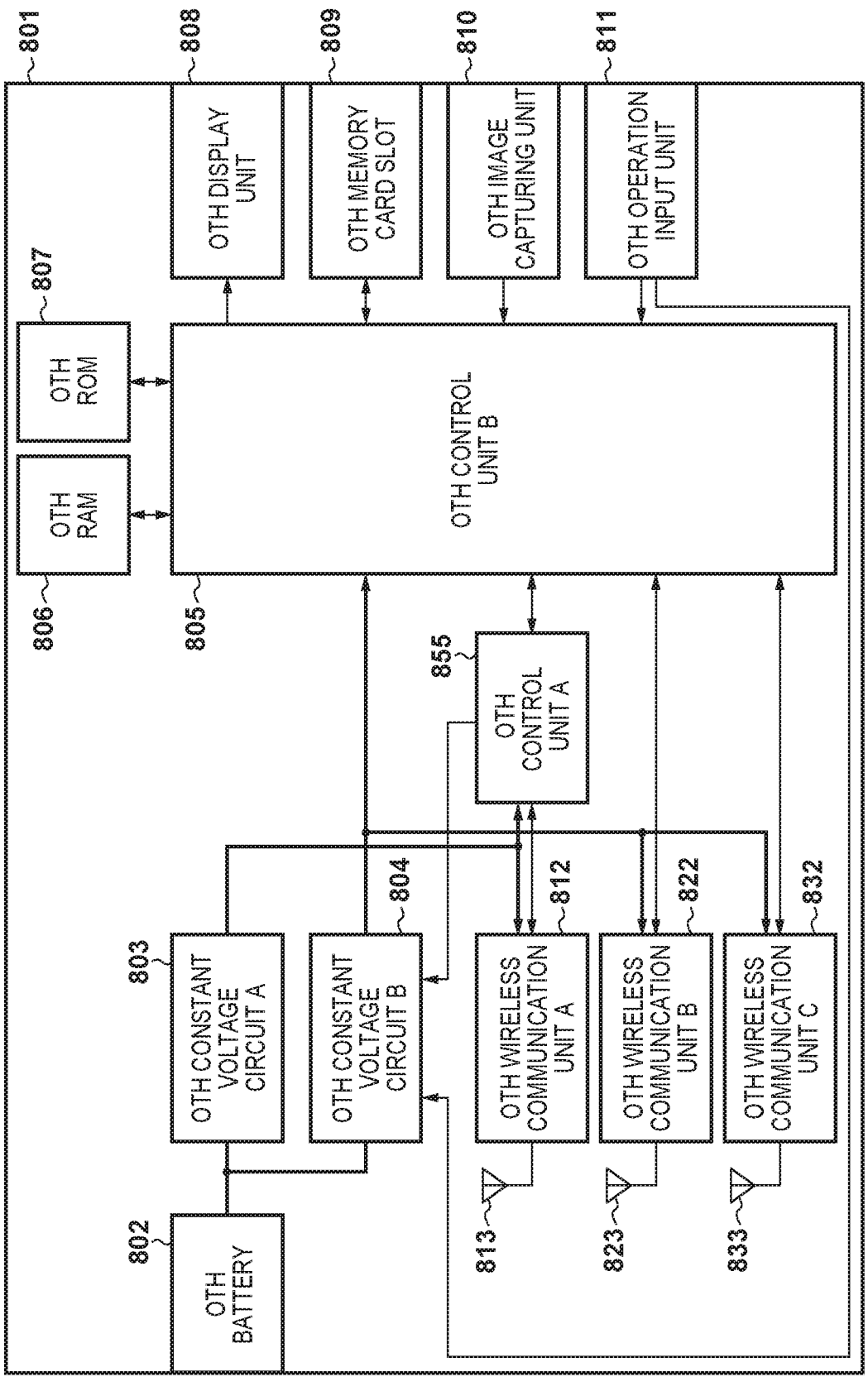

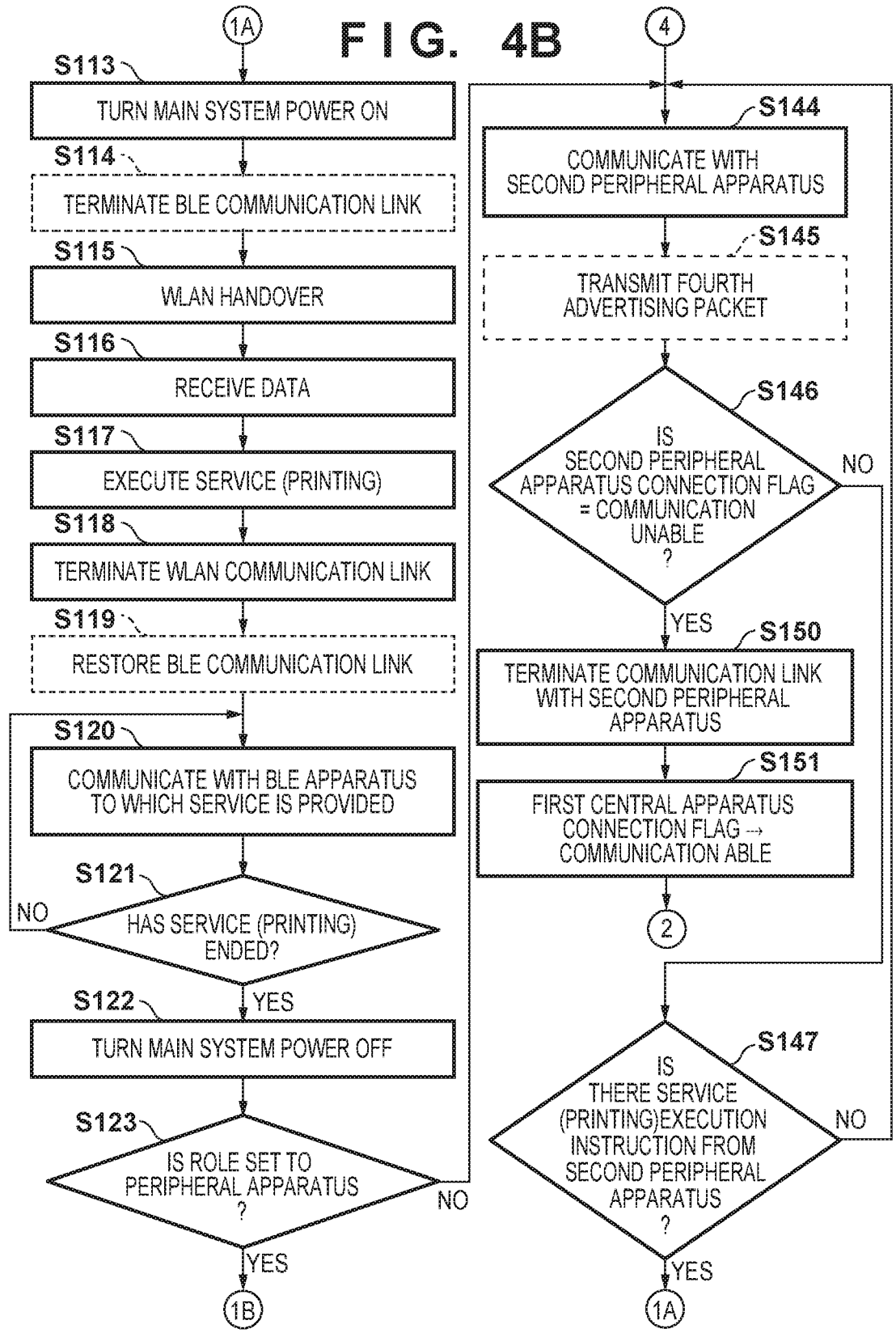

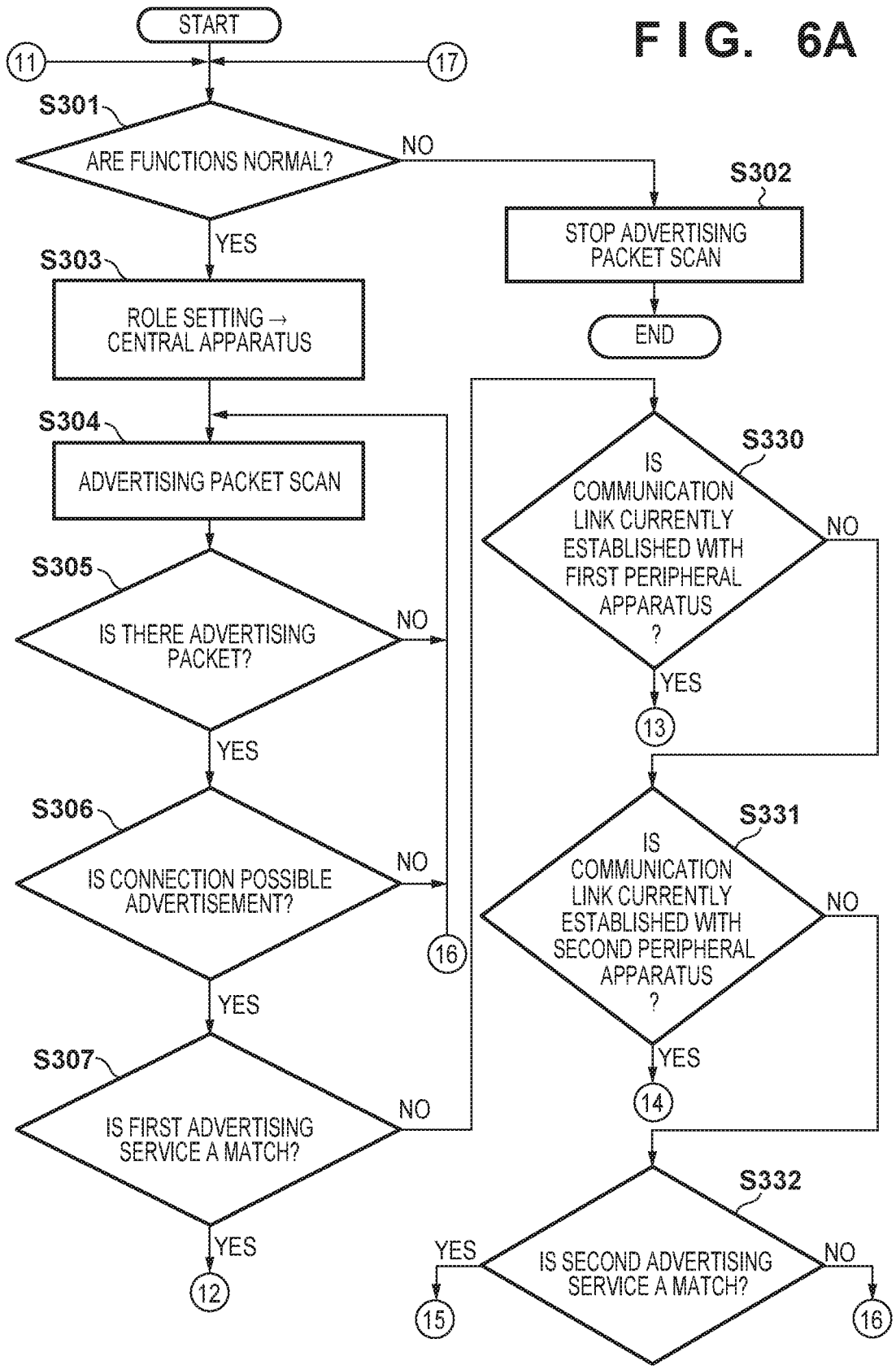

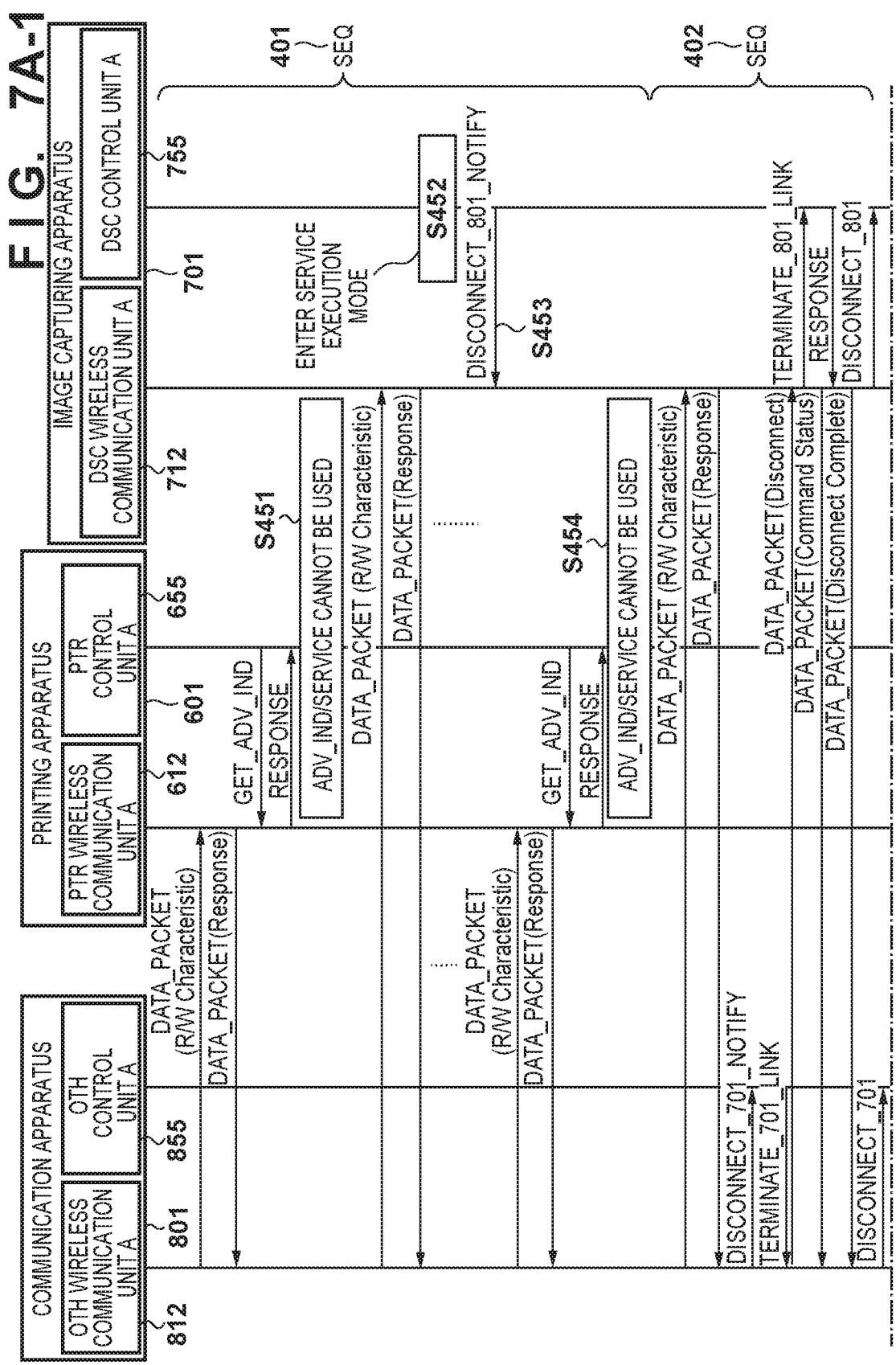

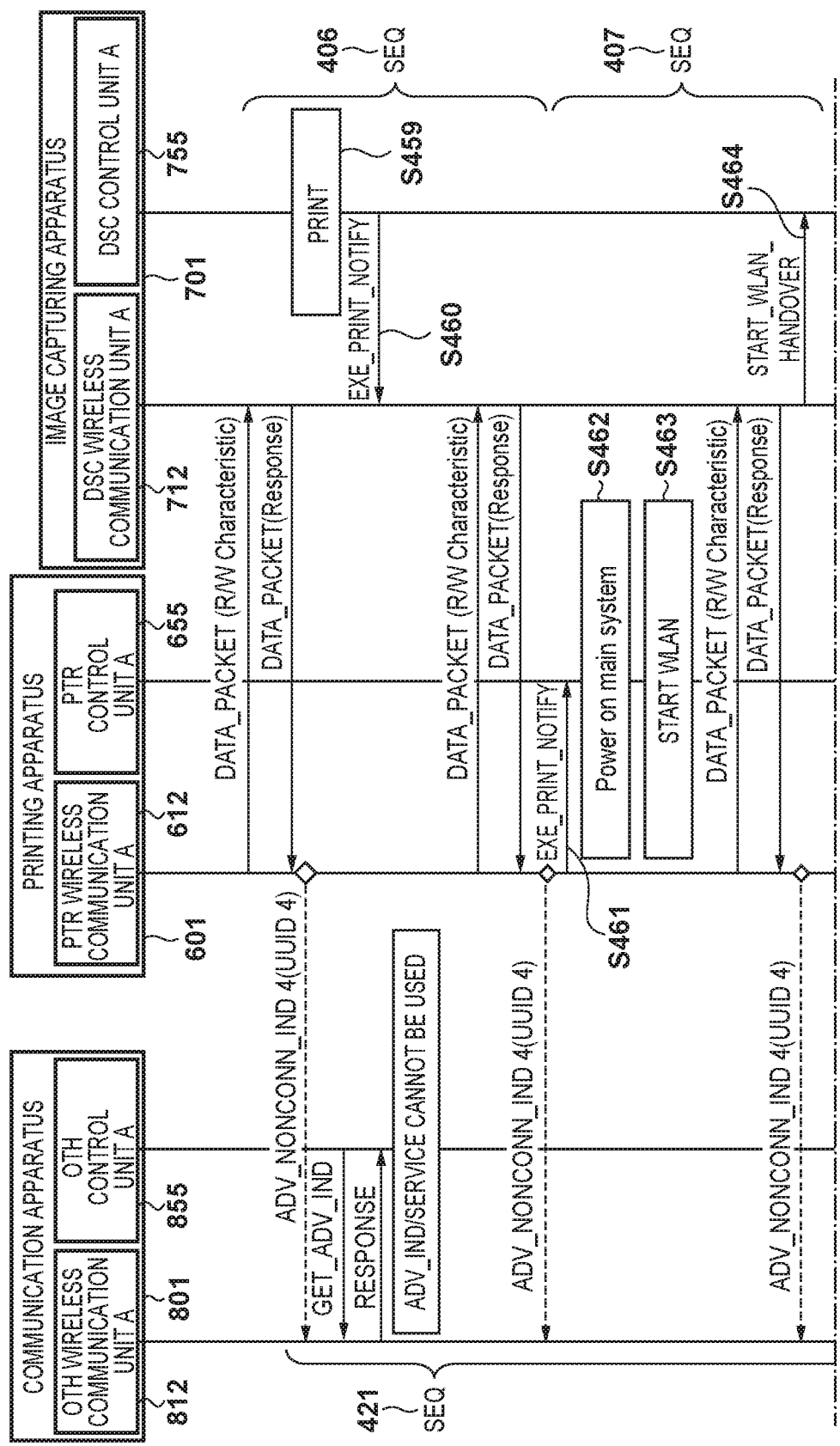

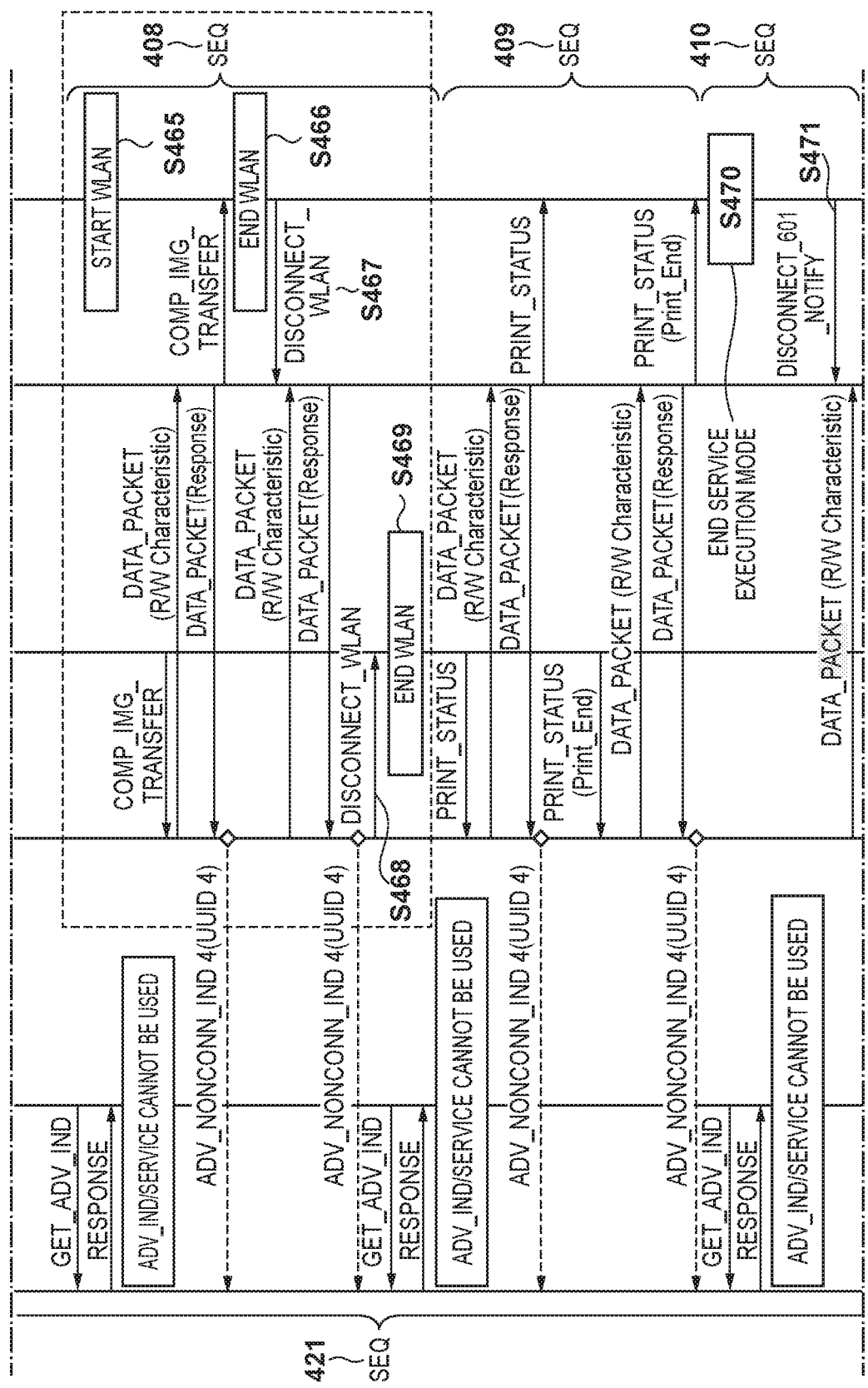

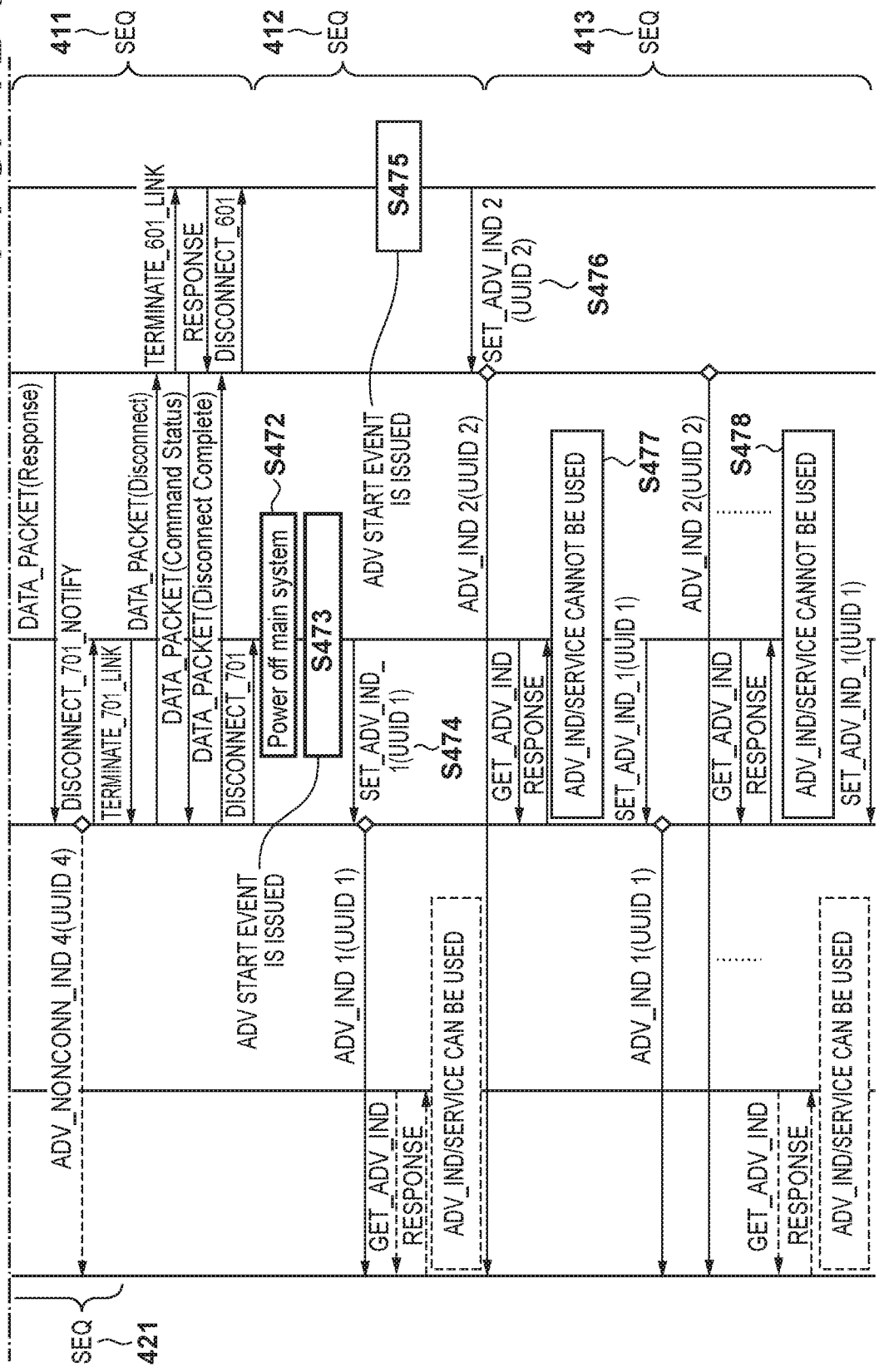

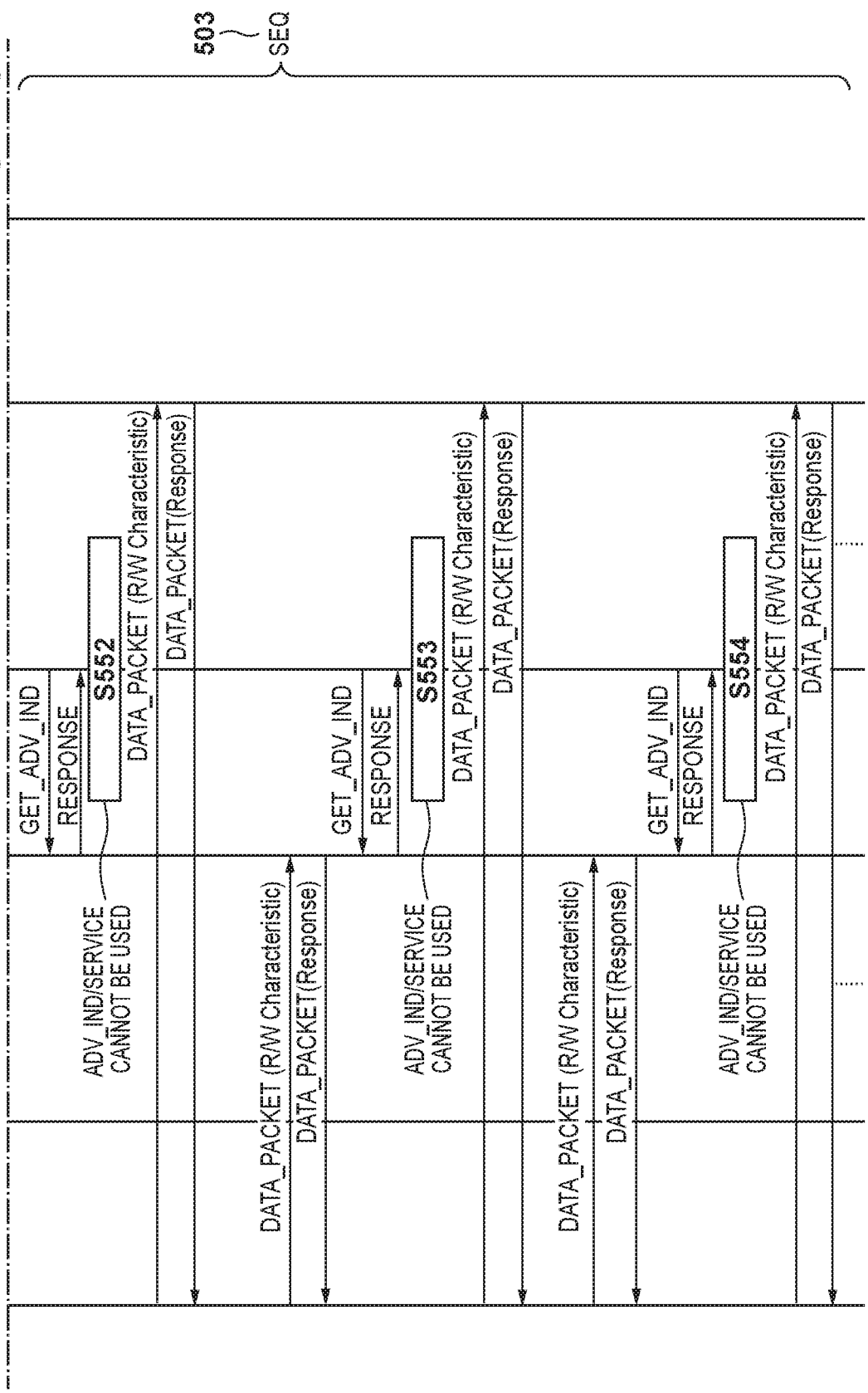

F I G. 11A

| Service 1 (PRINT) UUID 1 | | |
|---|---|---|
| Service 1 Characteristic UUID 1 | PRINT ABLE/UNABLE FLAG | VALUE |
| Service 1 Characteristic UUID 2 | SSID | VALUE |
| Service 1 Characteristic UUID 3 | PASSWORD | VALUE |
| Service 1 Characteristic UUID 4 | DEVICE NAME | VALUE |
| Service 1 Characteristic UUID 5 | SUPPORTED PRINTING PROTOCOL 1 | VALUE |
| Service 1 Characteristic UUID 6 | SUPPORTED PRINTING PROTOCOL 2 | VALUE |
| Service 1 Characteristic UUID 7 | PRINT STATUS | VALUE |
| Service 1 Characteristic UUID 8 | CENTRAL CONNECTION FLAG | VALUE |
| Service 1 Characteristic UUID 9 | WLAN STATUS | VALUE |

F I G. 11B

| Service 2(IT) UUID 2 | | |
|---|---|---|
| Service 2 Characteristic UUID 1 | IMAGE TRANSFER CAPABLE/INCAPABLE FLAG | VALUE |
| Service 2 Characteristic UUID 2 | SSID | VALUE |
| Service 2 Characteristic UUID 3 | PASSWORD | VALUE |
| Service 2 Characteristic UUID 4 | DEVICE NAME | VALUE |
| Service 2 Characteristic UUID 5 | CENTRAL CONNECTION FLAG | VALUE |
| Service 2 Characteristic UUID 6 | WLAN STATUS | VALUE |

| Service 3 (PRINT_REQ) UUID 3 | | |
|---|---|---|
| Service 3 Characteristic UUID 1 | PRINT REQUEST FLAG | VALUE |
| Service 3 Characteristic UUID 2 | SSID | VALUE |
| Service 3 Characteristic UUID 3 | PASSWORD | VALUE |
| Service 3 Characteristic UUID 4 | DEVICE NAME | VALUE |
| Service 3 Characteristic UUID 5 | SUPPORTED PRINTING PROTOCOL 1 | VALUE |
| Service 3 Characteristic UUID 6 | SUPPORTED PRINTING PROTOCOL 2 | VALUE |
| Service 3 Characteristic UUID 7 | PRINT STATUS | VALUE |
| Service 3 Characteristic UUID 8 | CENTRAL CONNECTION FLAG | VALUE |
| Service 3 Characteristic UUID 9 | WLAN STATUS | VALUE |

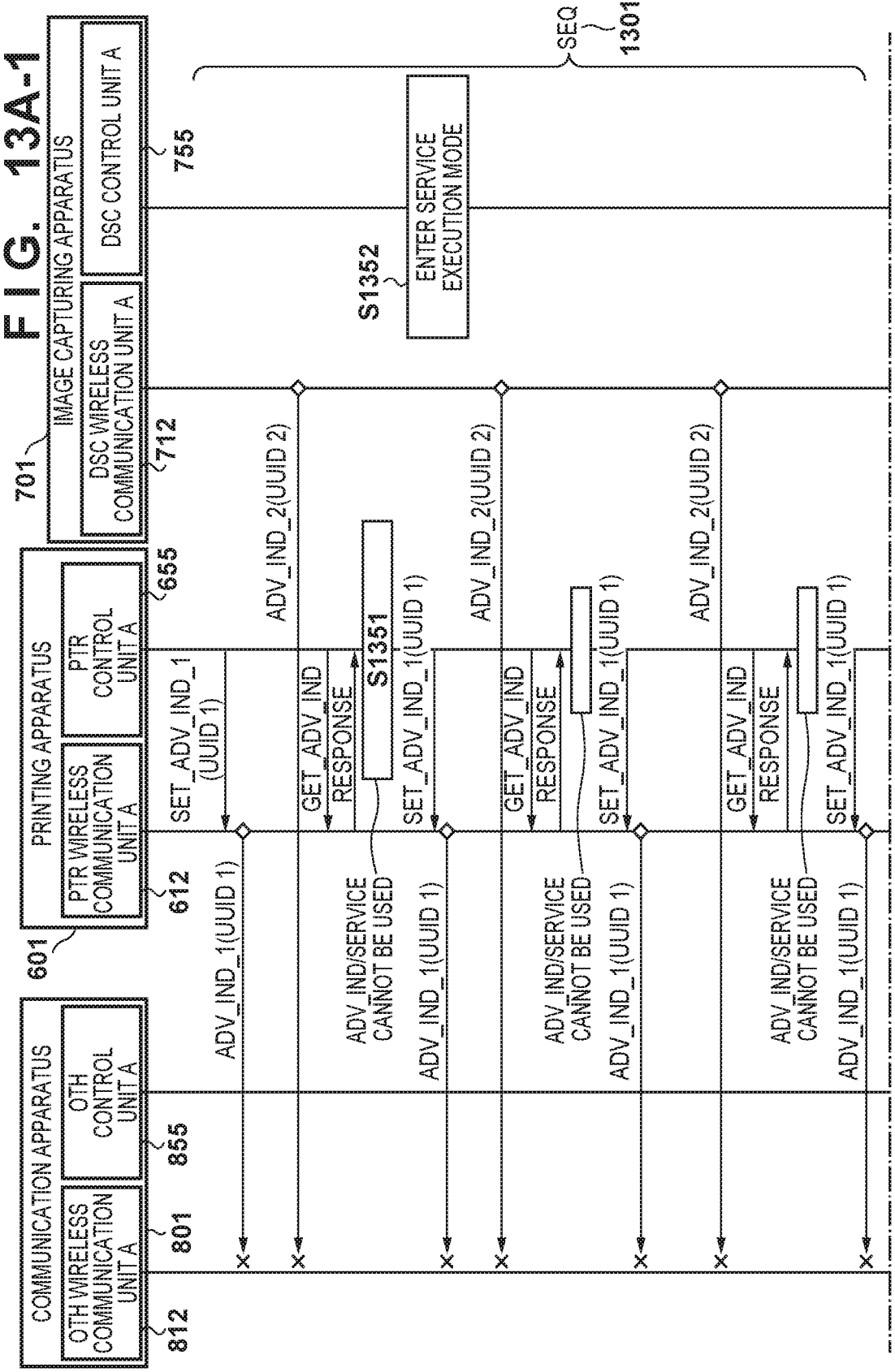

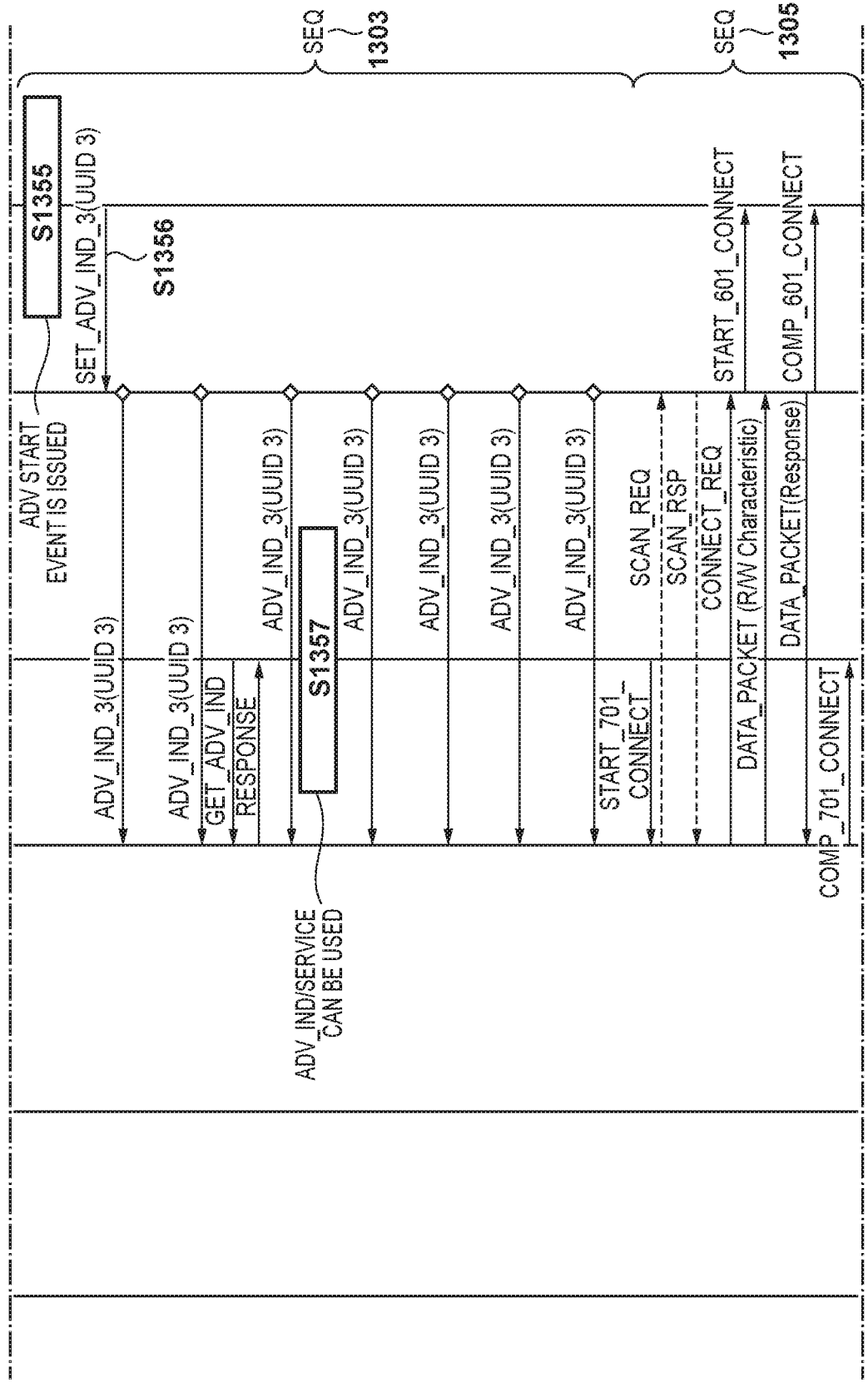

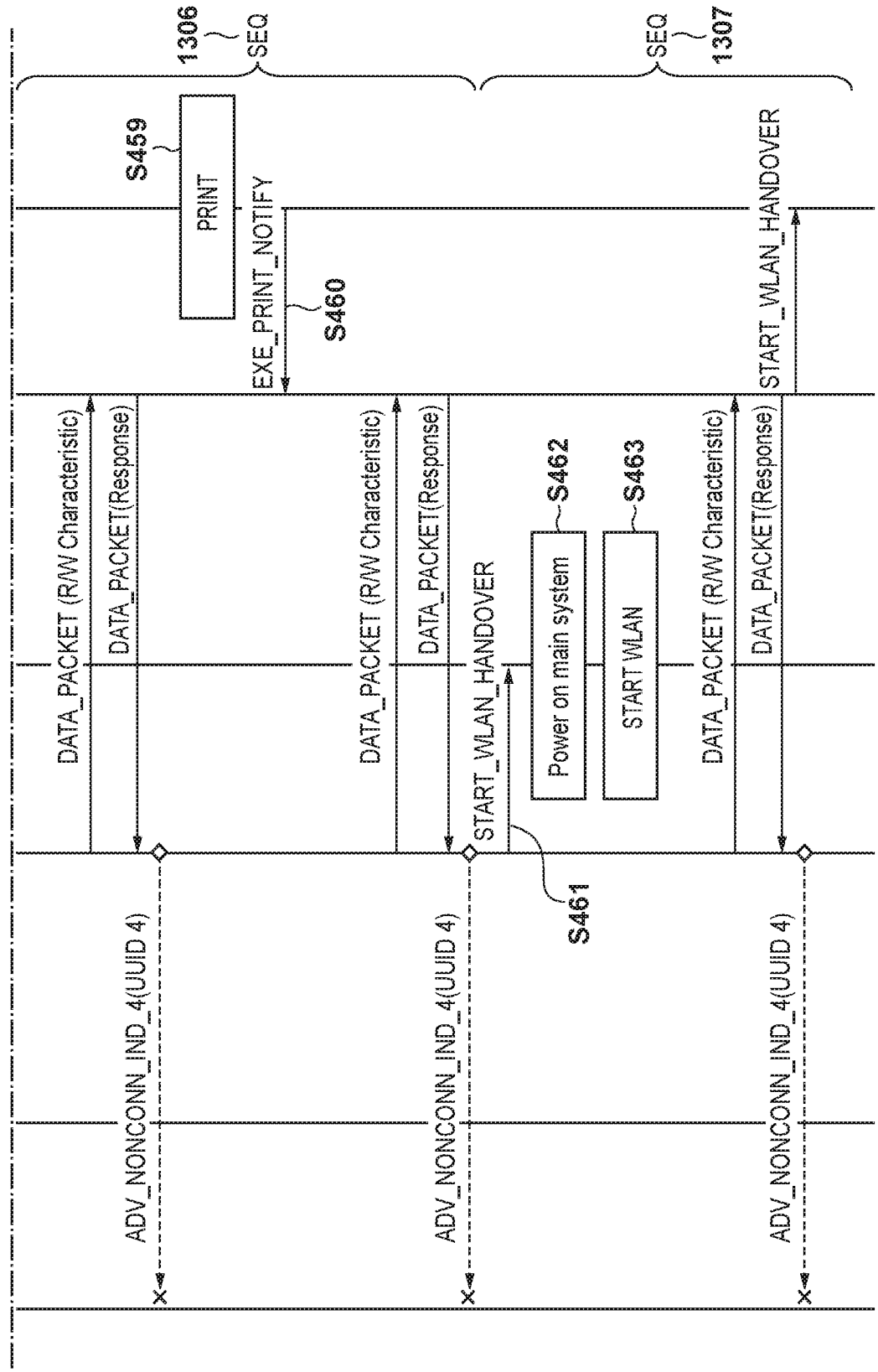

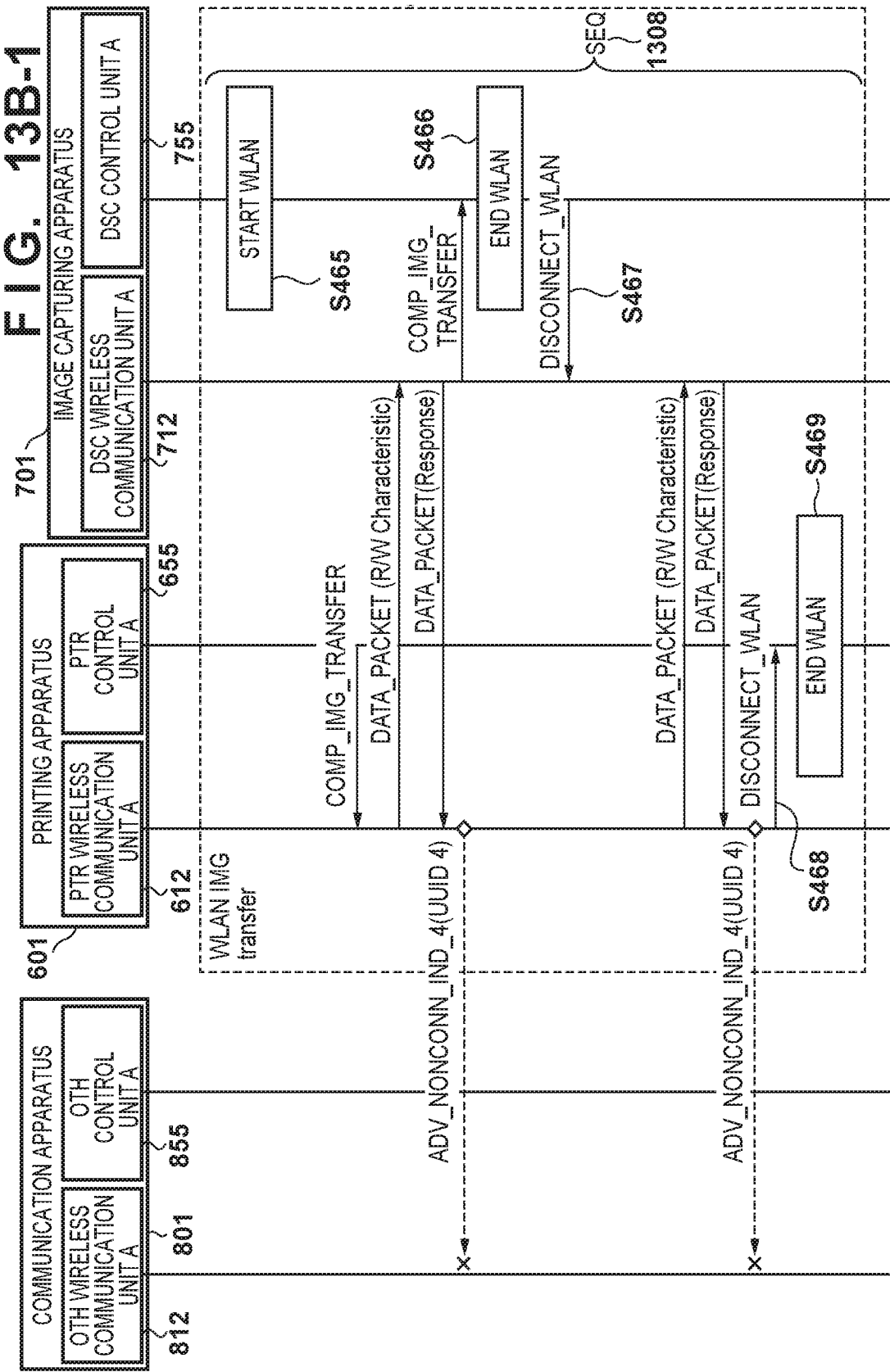

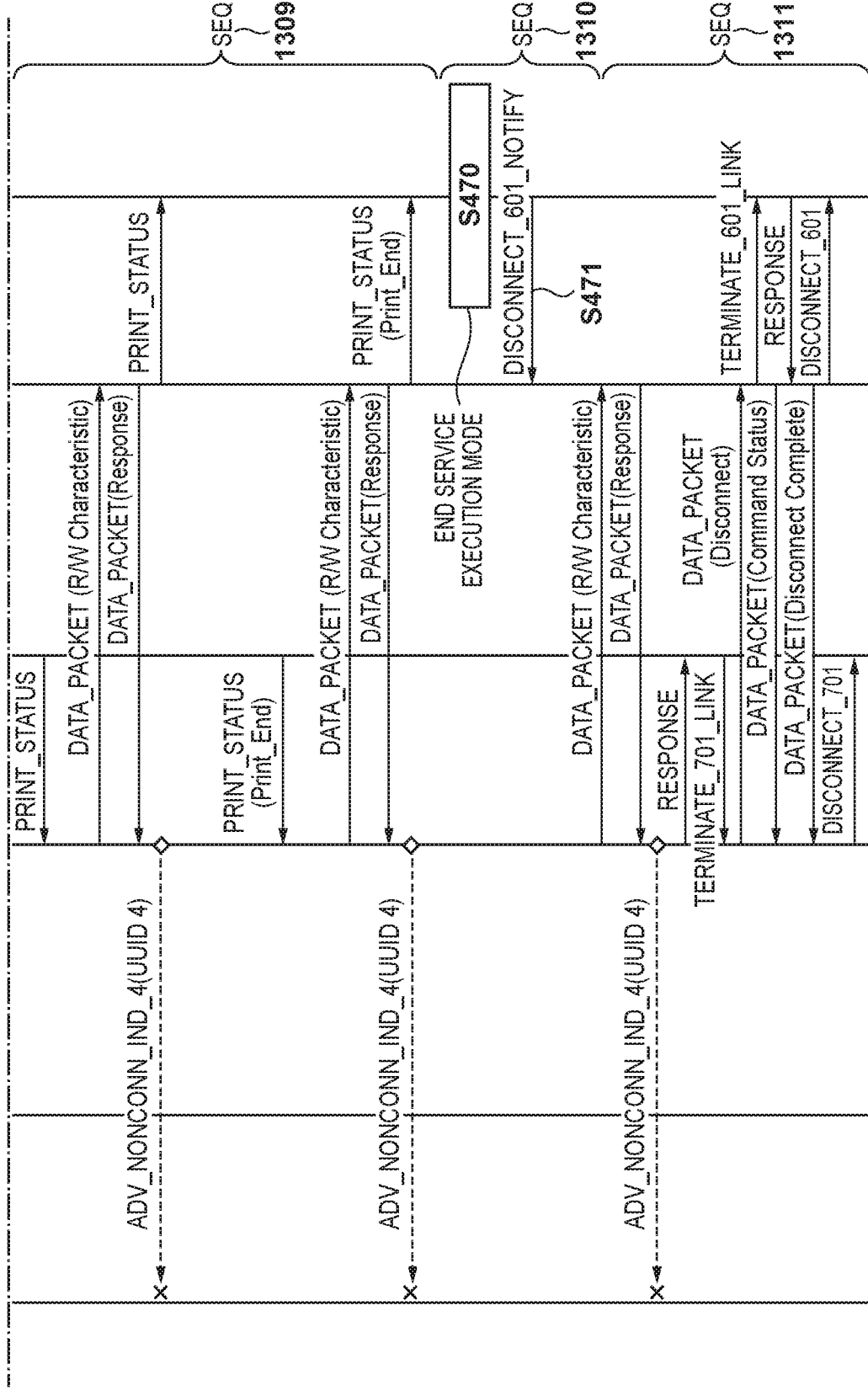

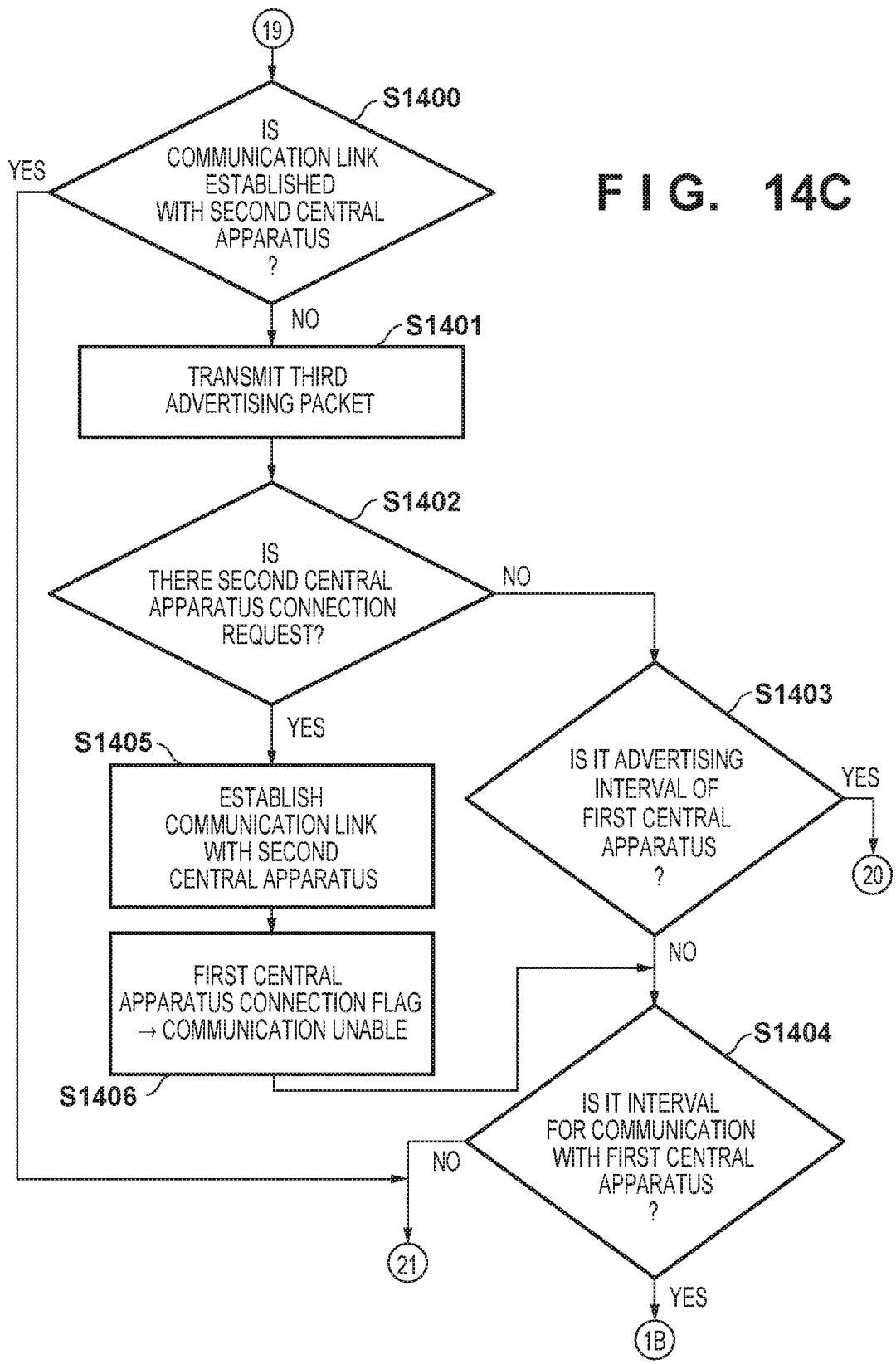
F I G. 14C

FIG. 16A

Service 1 (PRINT 1)
UUID 1

| Service 1 Characteristic UUID 1 | PRINT ABLE/UNABLE FLAG | VALUE |
|---|---|---|
| Service 1 Characteristic UUID 2 | SSID | VALUE |
| Service 1 Characteristic UUID 3 | PASSWORD | VALUE |
| Service 1 Characteristic UUID 4 | DEVICE NAME | VALUE |
| Service 1 Characteristic UUID 5 | SUPPORTED PRINTING PROTOCOL 1 | VALUE |
| Service 1 Characteristic UUID 6 | SUPPORTED PRINTING PROTOCOL 2 | VALUE |
| Service 1 Characteristic UUID 7 | PRINT STATUS | VALUE |
| Service 1 Characteristic UUID 8 | CENTRAL CONNECTION FLAG | VALUE |
| Service 1 Characteristic UUID 9 | WLAN STATUS | VALUE |

Service 3 (PRINT 3)
UUID 3

| Service 3 Characteristic UUID 1 | PRINT ABLE/UNABLE FLAG | VALUE |
|---|---|---|
| Service 3 Characteristic UUID 2 | SSID | VALUE |
| Service 3 Characteristic UUID 3 | PASSWORD | VALUE |
| Service 3 Characteristic UUID 4 | DEVICE NAME | VALUE |
| Service 3 Characteristic UUID 5 | SUPPORTED PRINTING PROTOCOL 1 | VALUE |
| Service 3 Characteristic UUID 6 | SUPPORTED PRINTING PROTOCOL 2 | VALUE |
| Service 3 Characteristic UUID 7 | PRINT STATUS | VALUE |
| Service 3 Characteristic UUID 8 | CENTRAL CONNECTION FLAG | VALUE |
| Service 3 Characteristic UUID 9 | WLAN STATUS | VALUE |

Service 6 (PRINT 6)
UUID 6

| Service 6 Characteristic UUID 1 | PRINT ABLE/UNABLE FLAG | VALUE |
|---|---|---|
| Service 6 Characteristic UUID 2 | SSID | VALUE |
| Service 6 Characteristic UUID 3 | PASSWORD | VALUE |
| Service 6 Characteristic UUID 4 | DEVICE NAME | VALUE |
| Service 6 Characteristic UUID 5 | SUPPORTED PRINTING PROTOCOL 1 | VALUE |
| Service 6 Characteristic UUID 6 | SUPPORTED PRINTING PROTOCOL 2 | VALUE |
| Service 6 Characteristic UUID 7 | PRINT STATUS | VALUE |
| Service 6 Characteristic UUID 8 | CENTRAL CONNECTION FLAG | VALUE |
| Service 6 Characteristic UUID 9 | WLAN STATUS | VALUE |

Service 7 (PRINT 7)
UUID 7

| Service 7 Characteristic UUID 1 | PRINT ABLE/UNABLE FLAG | VALUE |
|---|---|---|
| Service 7 Characteristic UUID 2 | SSID | VALUE |
| Service 7 Characteristic UUID 3 | PASSWORD | VALUE |
| Service 7 Characteristic UUID 4 | DEVICE NAME | VALUE |
| Service 7 Characteristic UUID 5 | SUPPORTED PRINTING PROTOCOL 1 | VALUE |
| Service 7 Characteristic UUID 6 | SUPPORTED PRINTING PROTOCOL 2 | VALUE |
| Service 7 Characteristic UUID 7 | PRINT STATUS | VALUE |
| Service 7 Characteristic UUID 8 | CENTRAL CONNECTION FLAG | VALUE |
| Service 7 Characteristic UUID 9 | WLAN STATUS | VALUE |

F I G. 16B

| Service 2(IT) UUID 2 | | |
|---|---|---|
| Service 2 Characteristic UUID 1 | IMAGE TRANSFER CAPABLE/INCAPABLE FLAG | VALUE |
| Service 2 Characteristic UUID 2 | SSID | VALUE |
| Service 2 Characteristic UUID 3 | PASSWORD | VALUE |
| Service 2 Characteristic UUID 4 | DEVICE NAME | VALUE |
| Service 2 Characteristic UUID 5 | CENTRAL CONNECTION FLAG | VALUE |
| Service 2 Characteristic UUID 6 | WLAN STATUS | VALUE |

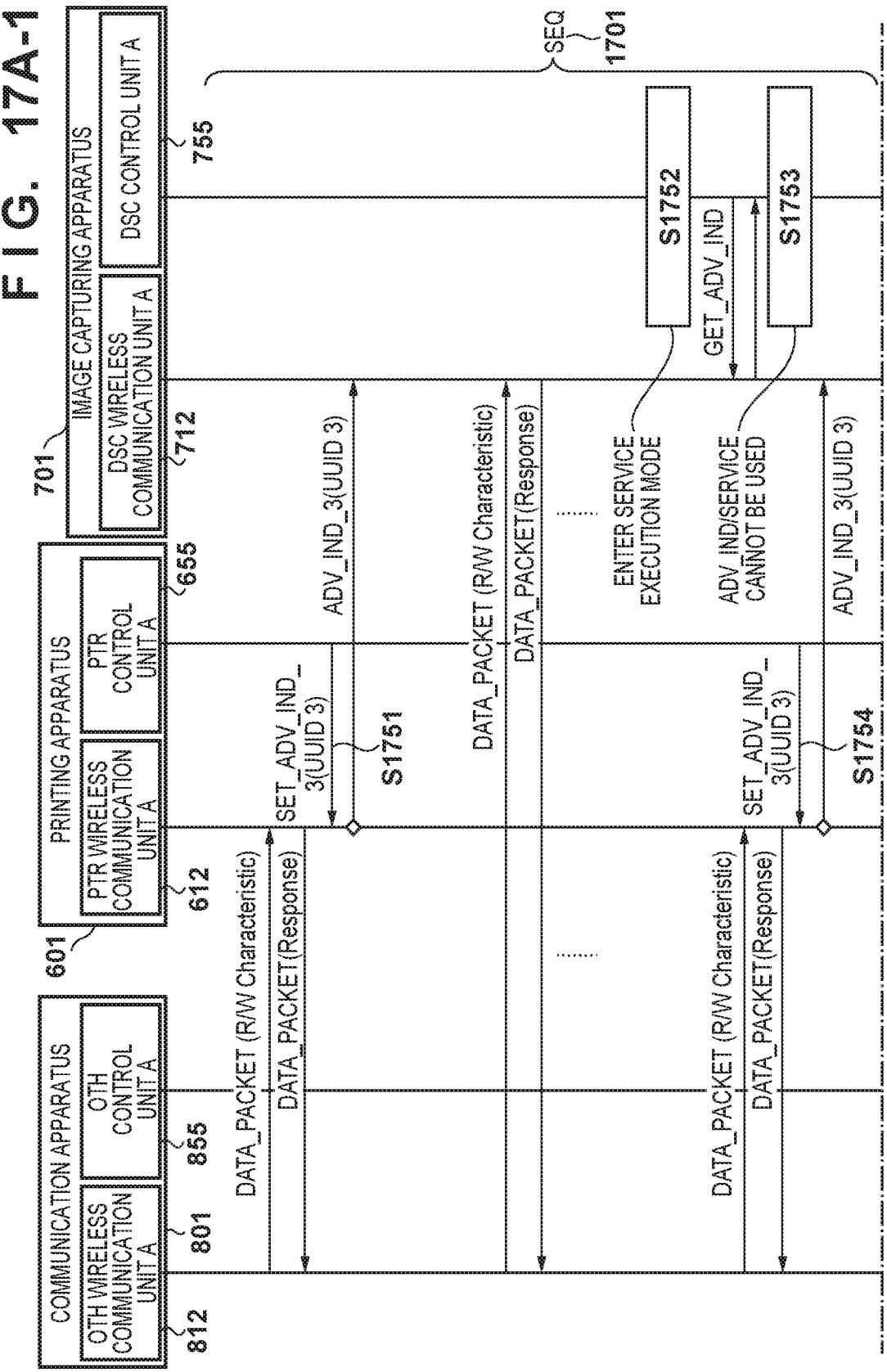

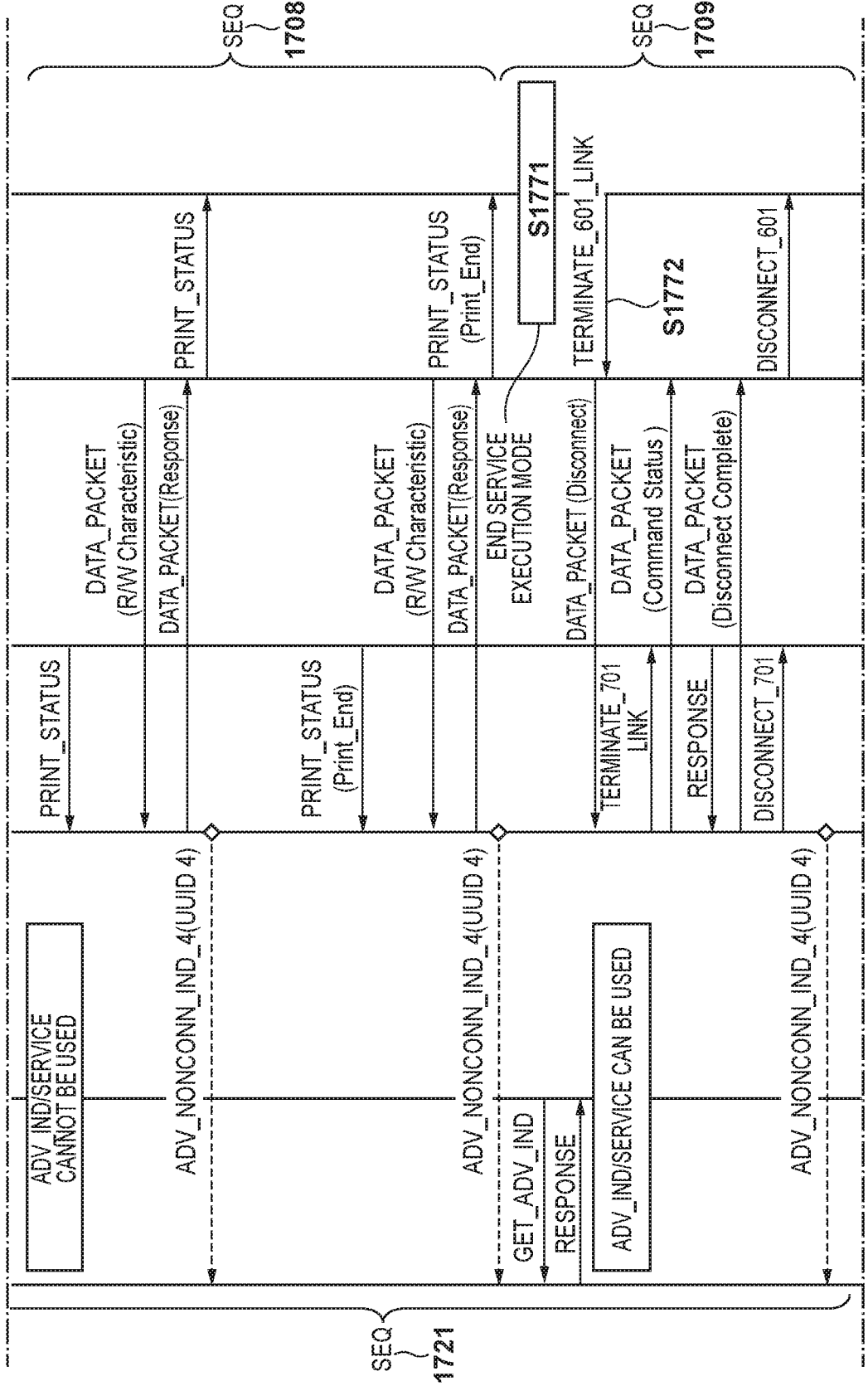

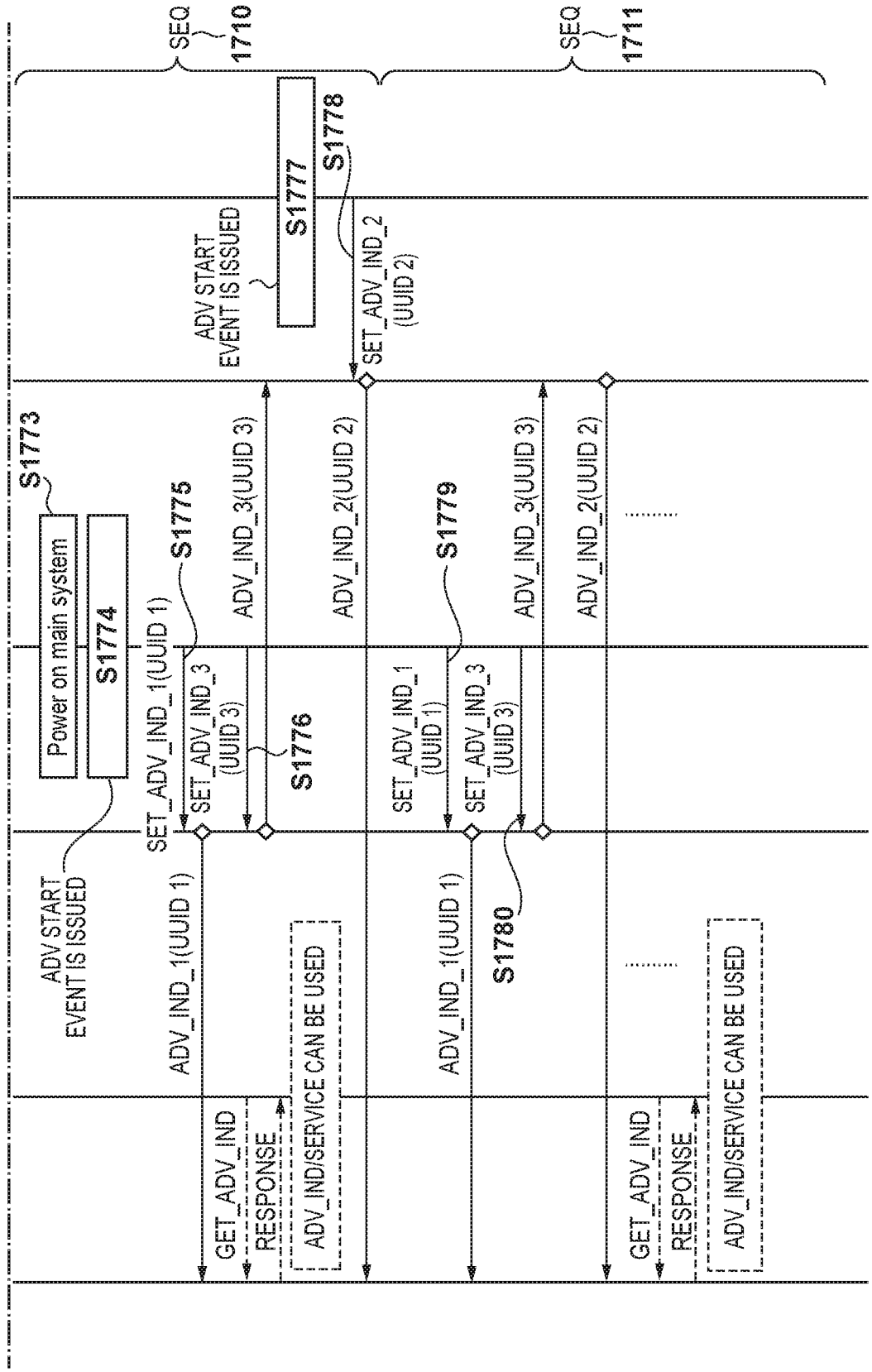

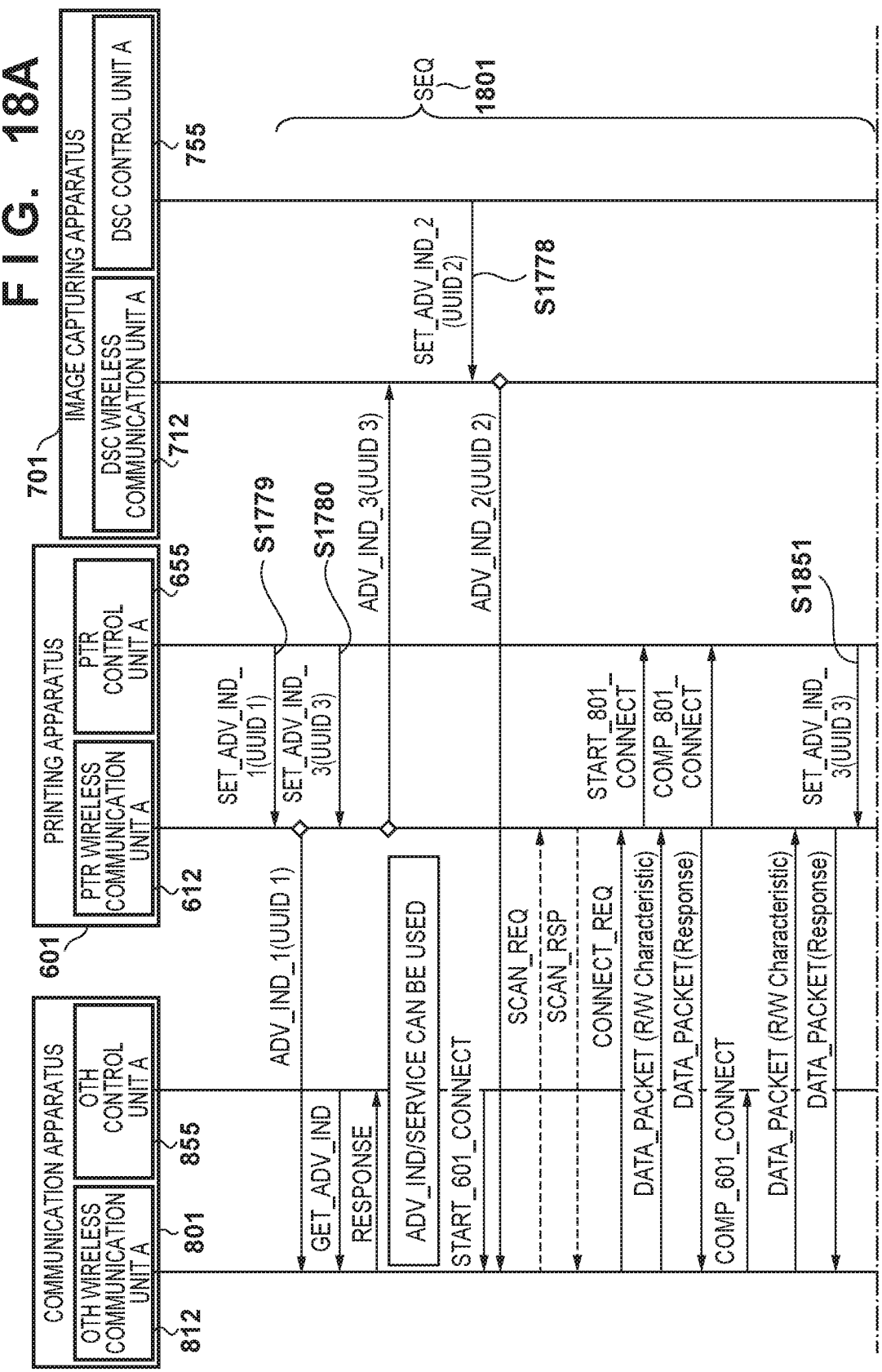

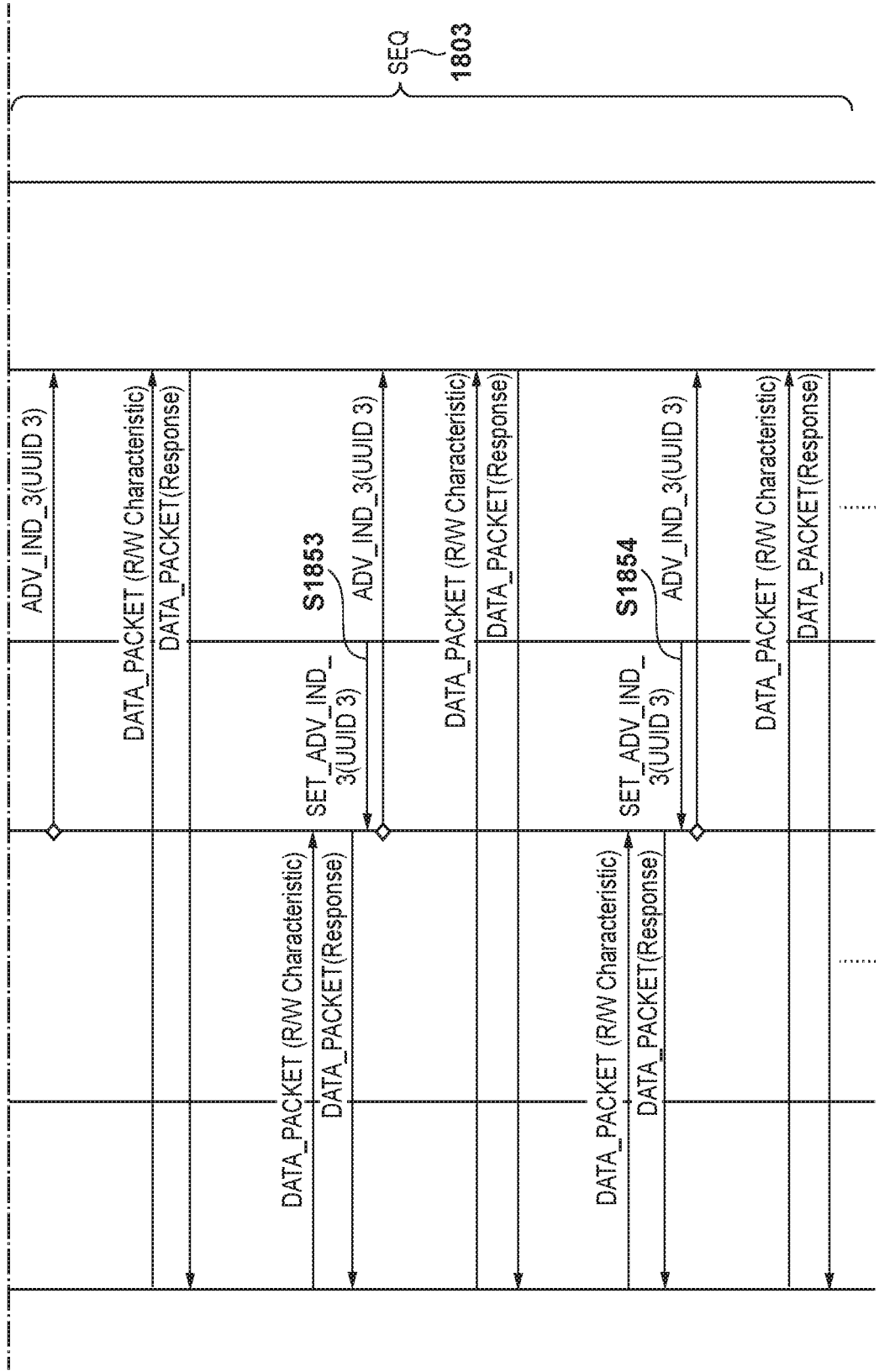

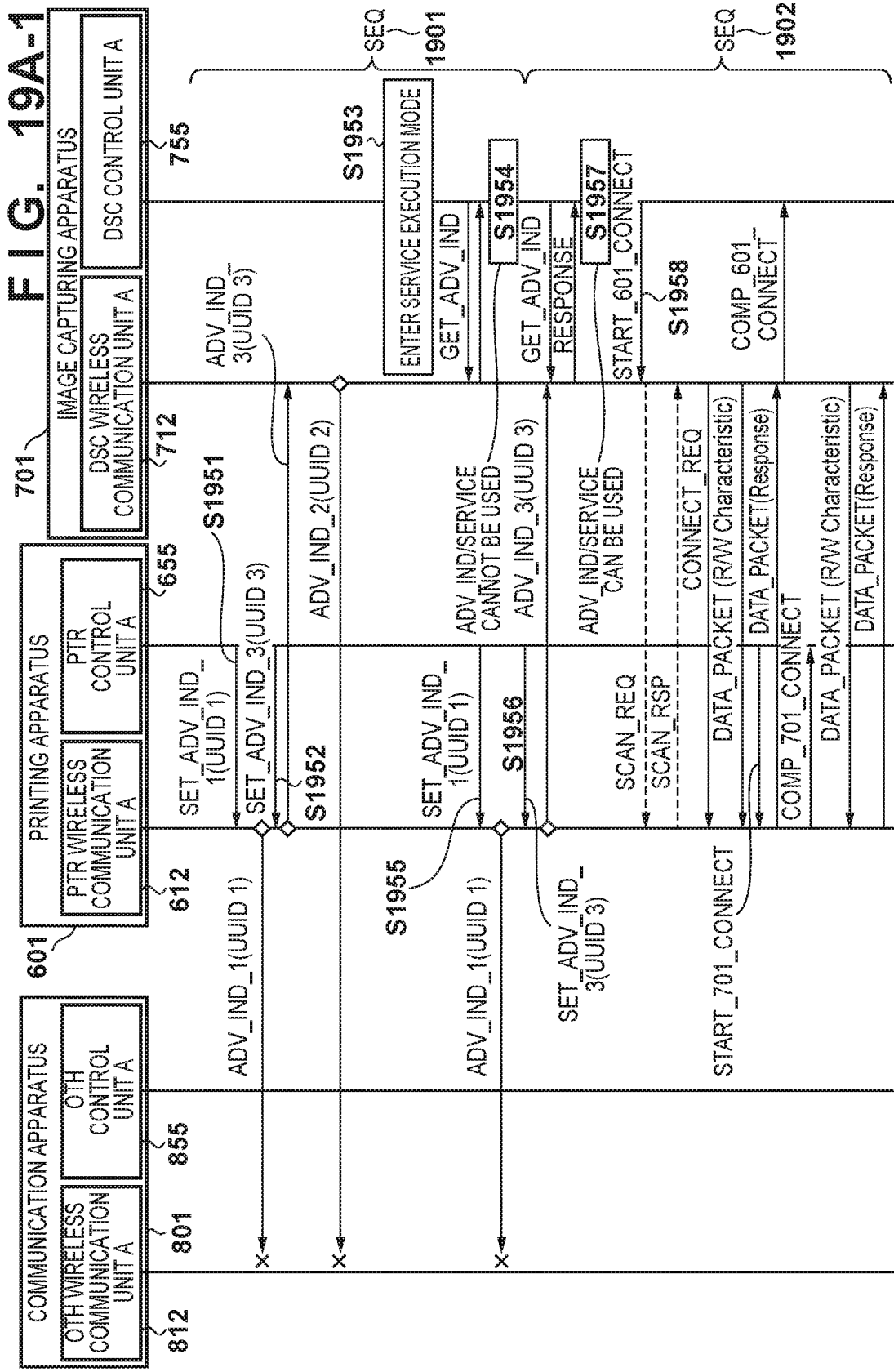

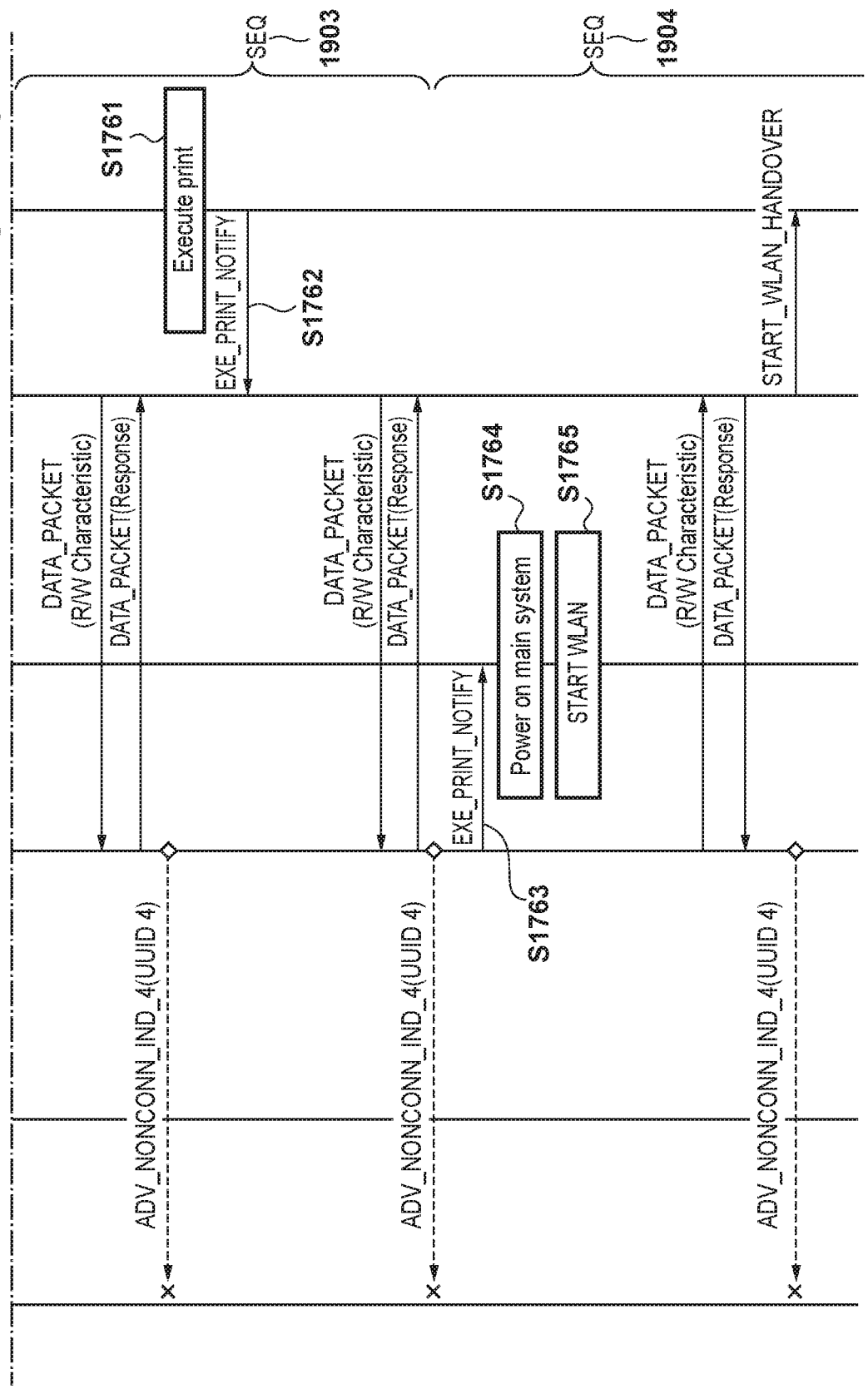

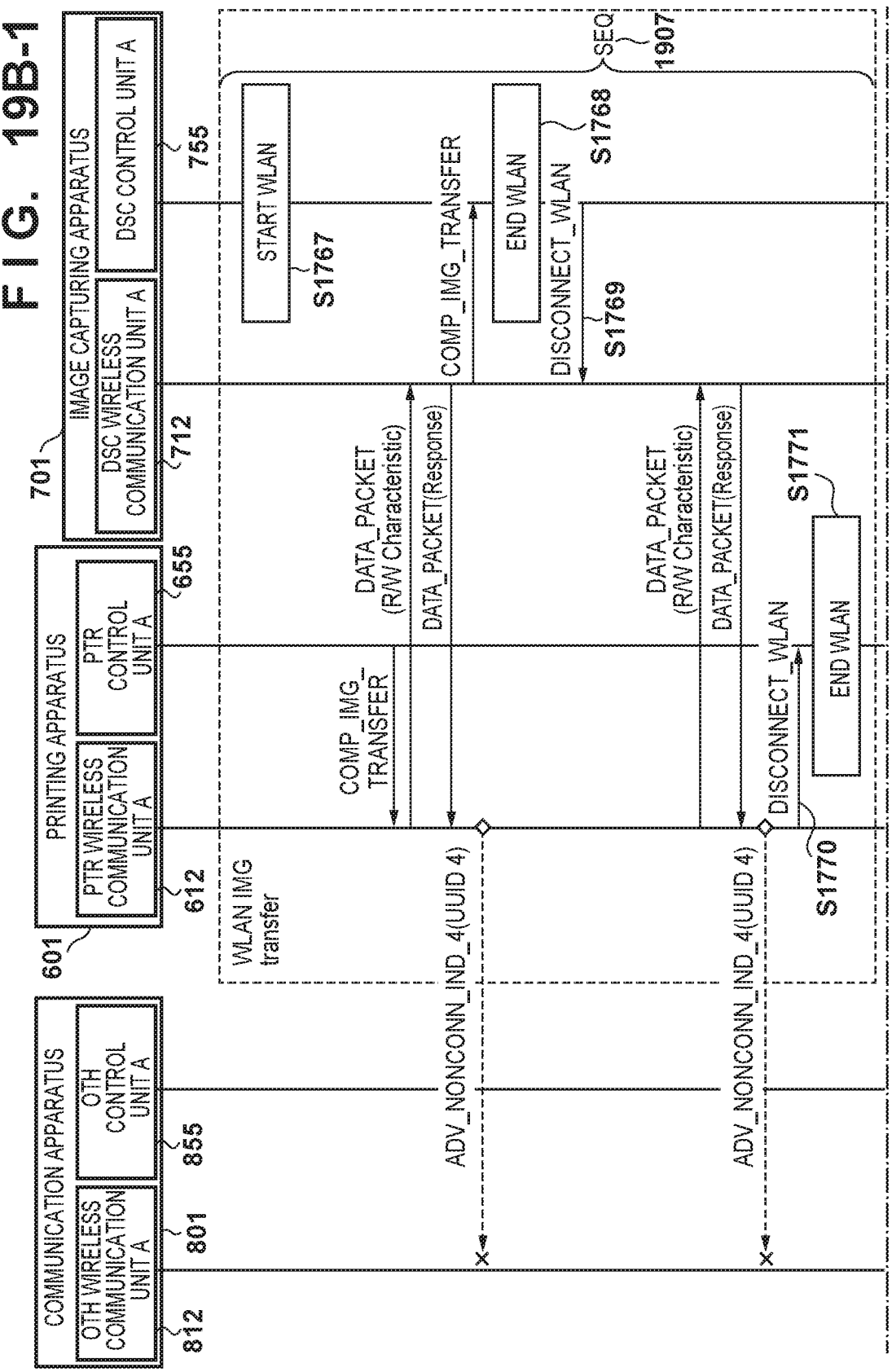

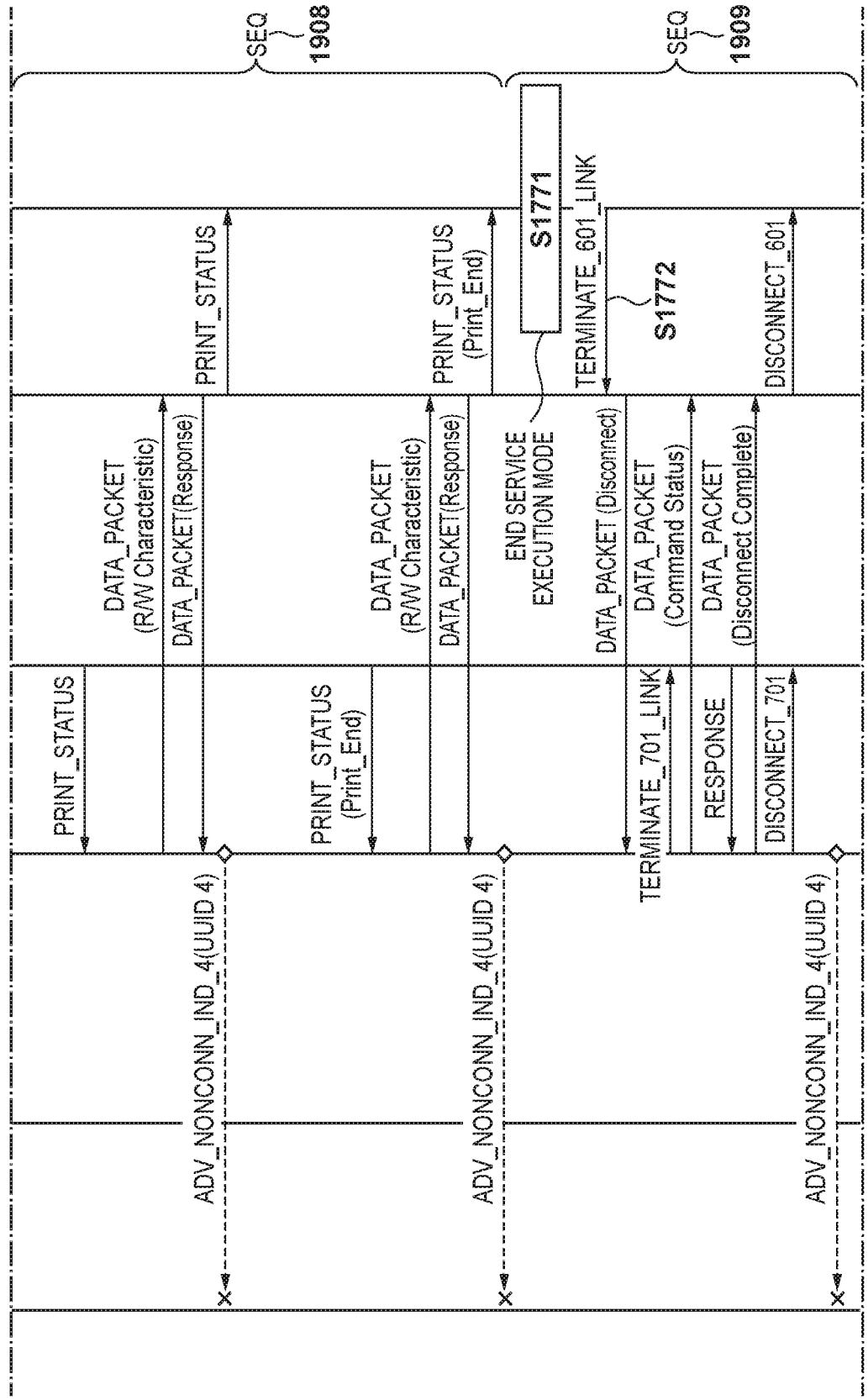

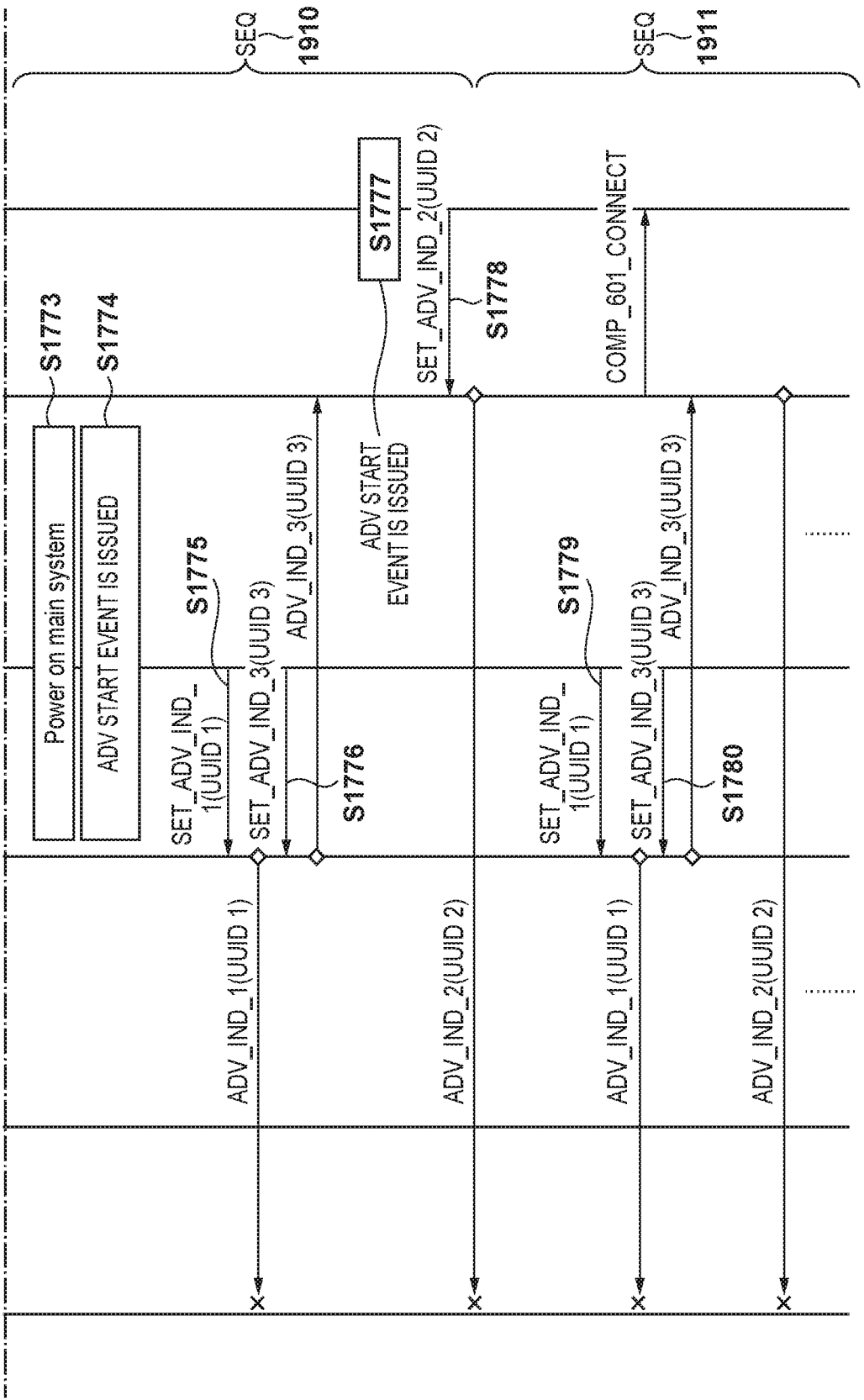

COMMUNICATION APPARATUS FOR EXECUTING SERVICE, CONTROL METHOD AND STORAGE MEDIUM THEREFOR, AND COMMUNICATION SYSTEM

CROSS-REFERENCE TO RELATED APPLICATIONS

This application is a Continuation of International Patent Application No. PCT/JP2017/021956, filed Jun. 14, 2017, which claims the benefit of Japanese Patent Application No. 2016-158125, filed Aug. 10, 2016, both of which are hereby incorporated by reference herein in their entirety.

BACKGROUND OF THE INVENTION

Field of the Invention

The present invention relates to a communication apparatus for executing a service, a control method and a storage medium therefor, and a communication system.

Background Art

Cellular phones, printing apparatuses, and the like that use wireless communication technologies such as Bluetooth Low Energy ("Bluetooth" is a registered trademark; this will also be called "BLE" hereinafter) for inter-apparatus communication have become known in recent years. When establishing inter-apparatus communication with BLE, an apparatus playing the role (part) of a peripheral transmits an advertising packet (i.e., information indicating the presence of the self apparatus). Next, upon receiving the advertising packet and detecting the presence of a peripheral role apparatus, an apparatus playing the role of a central makes a request for a connection to the peripheral role apparatus. A connection is then established between the apparatuses, and data exchange is carried out.

With BLE, connections are restricted on the basis of roles, circumstances, and so on. For example, a peripheral role apparatus can only connect to a single central role apparatus, and peripheral role apparatuses cannot connect to each other. In other words, when printing apparatuses, image capturing apparatuses, and the like play the role of peripherals, these apparatuses can use BLE to connect to another apparatus, which plays the role of a central, and can communicate only to the central role apparatus with which the connection is established. However, the image capturing apparatuses and the printing apparatuses both play the role of peripheral, and therefore cannot connect to each other. There are therefore cases where a printing service of a printing apparatus cannot be used directly from an image capturing apparatus, for example. In such a case, it is necessary for a user to, for example, cut the connections, change the role settings again, and establish a new connection in order to connect an image capturing apparatus with the printing apparatus.

In response to this issue, Patent Document 1 proposes a technique in a wireless communication system constituted by apparatuses in which one operates as a master and another operates as a slave, where the roles of master and slave are changed in accordance with a required communication quality necessary for the apparatuses to communicate with each other.

CITATION LIST

Patent Literature

Patent Document 1: Japanese Patent Laid-Open No. 2003-107335

However, although the roles can be changed in accordance with the communication conditions between the apparatuses during communication, the technique proposed by Patent Document 1 does not take into consideration a technique for making an optimal role assignment with a new apparatus when such a new apparatus attempts to establish a connection during communication. In other words, what is needed, in communication that establishes connections among apparatuses having different roles, is a technique through which an apparatus operating with a predetermined role in order to connect to other apparatuses can easily connect to an apparatus operating with the same role.

The present invention has been conceived in light of these problems with conventional technologies. An object of the present invention is to provide a communication apparatus that can, in communication in which apparatuses having different roles are connected, easily connect to an apparatus operating with the same role as the self apparatus, and to provide a control method and program therefor, as well as a communication system.

SUMMARY OF THE INVENTION

To solve this problem, a communication apparatus according to the present invention has, for example, the following configuration. That is, a communication apparatus that executes a predetermined service by communicating with an external apparatus, the communication apparatus comprises: a communication unit configured to establish a connection with the external apparatus and communicating data with the external apparatus in order to execute the predetermined service; and a control unit configured to control the communication unit so that the communication apparatus operates as a first role in the case of connecting to a first external apparatus operating as a second role, and so that the communication apparatus operates as the second role in the case of connecting to a second external apparatus operating as the first role, wherein the control unit controls the communication unit so that the communication apparatus operates as the second role to connect to the second external apparatus operating as the first role in between times when the communication apparatus carries out a process for operating as the first role and periodically transmitting a predetermined signal.

Further features of the present invention will become apparent from the following description of exemplary embodiments (with reference to the attached drawings).

BRIEF DESCRIPTION OF THE DRAWINGS

The appended drawings, which are included in and constitute part of the specification, illustrate embodiments of the present invention, and along with those descriptions serve to illustrate the principles of the present invention.

FIG. 1 is a block diagram illustrating an example of the functional configuration of a printing apparatus according to a first embodiment.

FIG. 3 is a block diagram illustrating an example of the functional configuration of a communication apparatus according to the first embodiment.

FIGS. 4A, 4B, and 4C are flowcharts illustrating a sequence of operations in a connection changing process of a printing apparatus according to the first embodiment.

FIGS. 6A, 6B, and 6C are flowcharts illustrating a sequence of operations in a connection changing process of the communication apparatus according to the first embodiment.

FIGS. 7A-1, 7A-2, 7B-1, 7B-2, and 7B-3 are sequence charts (a first half) illustrating a sequence through which a wireless communication connection is made between the printing apparatus and the image capturing apparatus according to the first embodiment.

FIGS. 8A, 8B, and 8C are sequence charts (a second half) illustrating a sequence through which a wireless communication connection is made between the printing apparatus and the image capturing apparatus according to the first embodiment.

FIGS. 11A and 11B are examples of a database in a GATT server storing services and characteristics, according to the first embodiment.

FIGS. 13A-1, 13A-2, 13A-3, 13B-1, 13B-2, and 13B-3 are sequence charts illustrating a sequence through which a wireless communication connection is made between a printing apparatus and an image capturing apparatus according to a second embodiment.

FIGS. 14A, 14B, and 14C are flowcharts illustrating a sequence of operations in a connection changing process of a printing apparatus according to a third embodiment.

FIGS. 16A and 16B are examples of a database in a GATT server storing services and characteristics, according to the third embodiment.

FIGS. 17A-1, 17A-2, 17A-3, 17B-1, 17B-2, and 17B-3 are sequence charts (a first half) illustrating a sequence through which a wireless communication connection is made between the printing apparatus and the image capturing apparatus according to the third embodiment.

FIGS. 18A, 18B, and 18C are sequence charts (a second half) illustrating a sequence through which a wireless communication connection is made between the printing apparatus and the image capturing apparatus according to the third embodiment.

FIGS. 19A-1, 19A-2, 19B-1, 19B-2, and 19B-3 are sequence charts illustrating a sequence through which a wireless communication connection is made between a printing apparatus and an image capturing apparatus according to a fourth embodiment.

DESCRIPTION OF THE EMBODIMENTS

First Embodiment

Hereinafter, an exemplary embodiment of the present invention will be described in detail with reference to the drawings. The present embodiment will describe an example in which a communication apparatus 801, which plays the role of a central, is connected to a printing apparatus 601 and an image capturing apparatus 701, which play the role of peripherals, over BLE, and a connection is then established between the printing apparatus 601 and the image capturing apparatus 701.

Although an example of a communication system using the printing apparatus 601, the image capturing apparatus 701, and the communication apparatus 801, which are examples of communication apparatuses having wireless communication functions, will be described here, these apparatuses may be any other apparatuses as long as those apparatuses have wireless communication functions. In other words, a personal computer, a tablet terminal, a game console, an eyeglass- or timepiece-type wearable terminal, a head-mounted display, a vehicle-mounted device, a medical device, and the like may be used. Additionally, the dimensions, shapes, relative arrangements, and so on of the constituent elements described as examples in the following embodiments are to be changed as appropriate in accordance with the configurations of the apparatuses to which the present embodiment is applied, various types of conditions, and so on, and the present embodiment is not intended to be limited to these examples.

Configuration of Printing Apparatus

Figures 2, 17A:
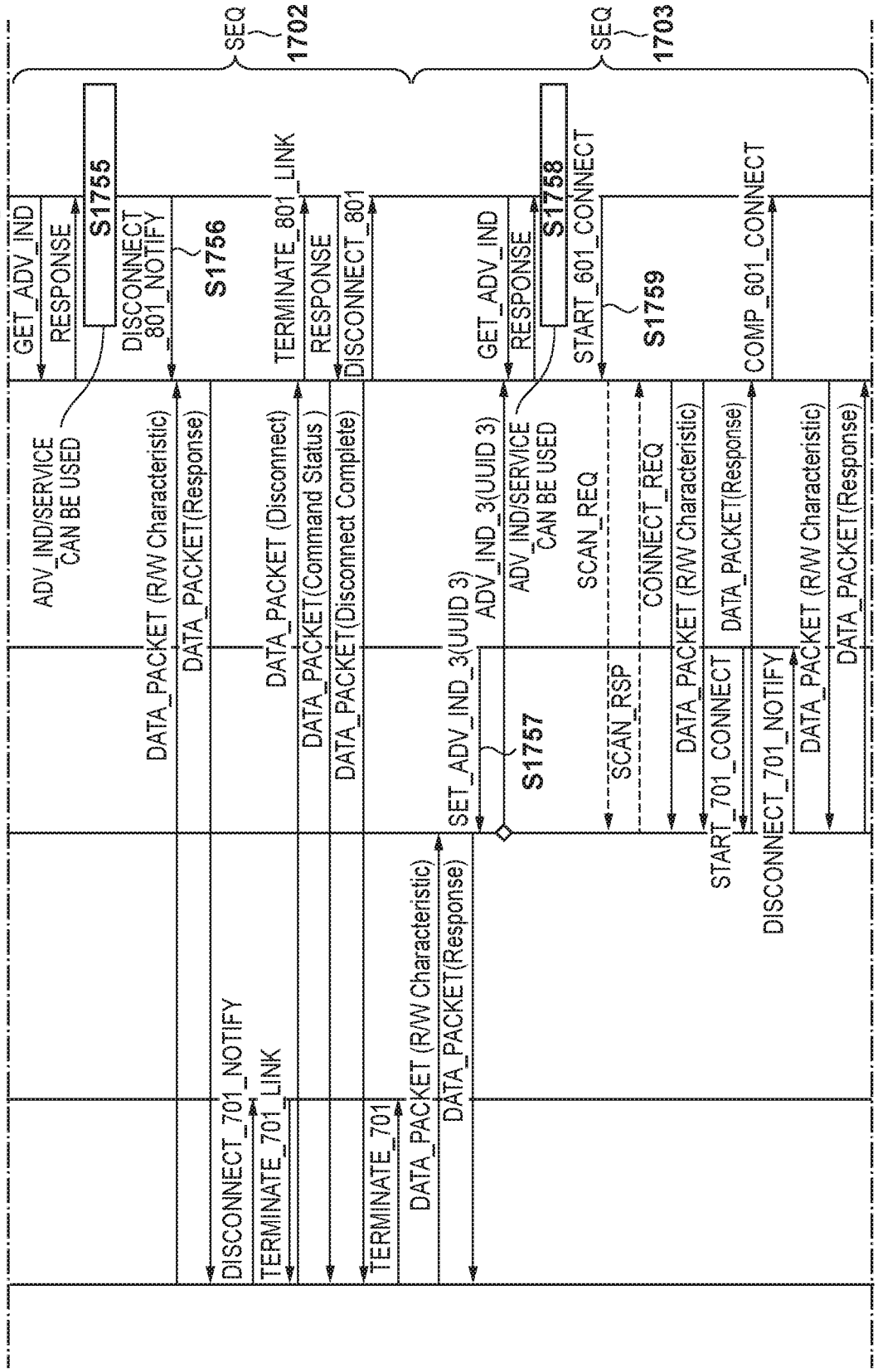
Figures 3, 17A:
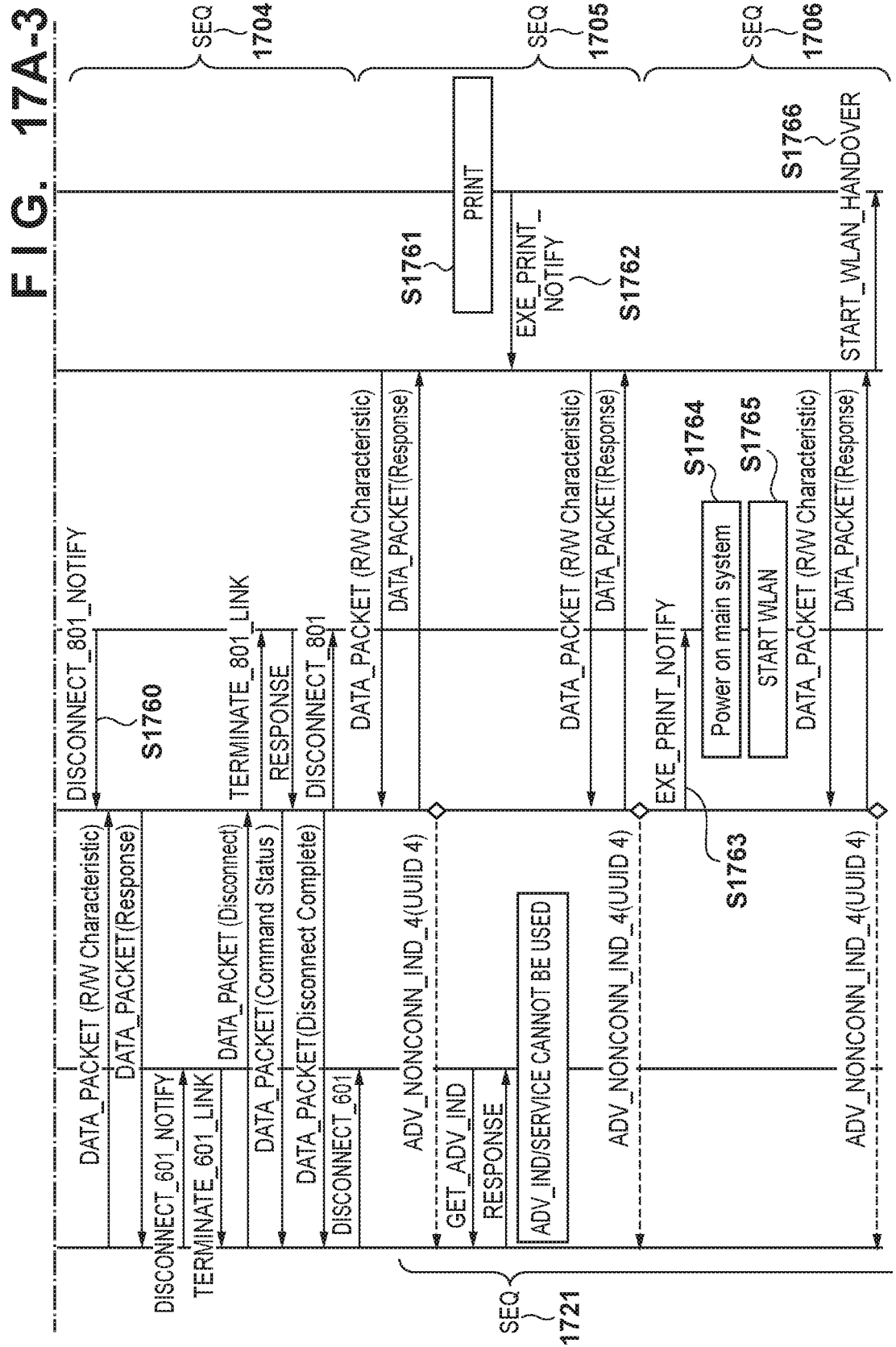
Figures 1, 17B:
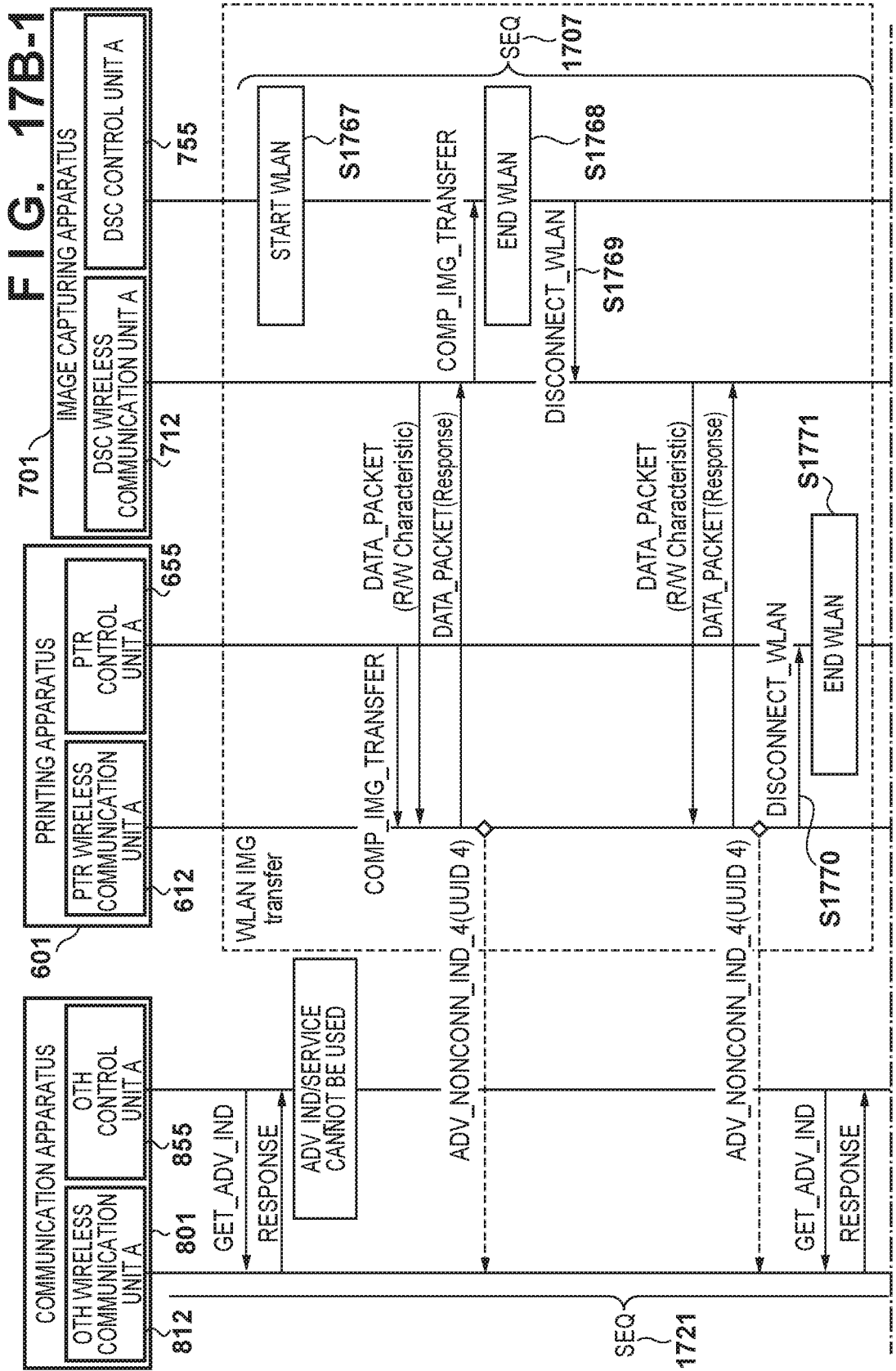

FIG. 1 is a block diagram illustrating an example of the functional configuration of the printing apparatus 601 according to the present embodiment. Note that power source connections to blocks not needed to describe the present embodiment are omitted from the following block diagrams, and the descriptions of blocks and operations not needed to describe the present embodiment will not be given. Additionally, the characters "PTR" may be added to blocks and the like to distinguish the printing apparatus 601 from the other apparatuses.

The printing apparatus 601 illustrated in FIG. 1 is an apparatus capable of printing onto a printing medium. A PTR control unit B605 includes a CPU (Central Processing Unit), and controls the printing apparatus 601 as a whole by loading programs stored in PTR ROM 607 into PTR RAM 606 and executing those programs. The PTR control unit B605 operates as the main system of the printing apparatus 601. The PTR control unit B605 can display digital image data and the like in a PTR display unit 608, and can carry out image processing that converts the digital image data and the like into data that can be printed onto the printing medium. The PTR RAM 606 is RAM (Random Access Memory) used as a work area for the PTR control unit B605, and is constituted by, for example, volatile memory such as dynamic RAM. The PTR ROM 607 is ROM (Read Only Memory) that stores programs executed by the PTR control unit B605, and is constituted by, for example, rewritable non-volatile memory such as flash memory.

A PTR control unit A655 is a control unit that controls some of the functions of the printing apparatus 601, and includes RAM used as a work area and ROM storing programs. The PTR control unit A655 is a sub system of the printing apparatus 601. The PTR control unit A655 can operate even when the PTR control unit B605 is off (i.e., on standby power), and consumes less power than the PTR control unit B605. For example, the PTR control unit A655 can be used to enable wireless communication connections with other apparatuses (external apparatuses) during a standby state where a printing service is not being provided. The PTR control unit A655 and the PTR control unit B605 can operate using separate power source circuits. For example, the PTR control unit A655 turns the power source circuit of the PTR control unit B605 on, and transitions the PTR control unit B605, which was off, into an on state.

A PTR AC/DC conversion circuit 602 converts an AC voltage input from the exterior of the printing apparatus 601 into a DC voltage. The post-conversion DC voltage is furthermore converted into a voltage that can be supplied to circuit blocks in later stages by a PTR constant voltage circuit A603 and a PTR constant voltage circuit B604. The PTR constant voltage circuit A603 includes a constant voltage circuit, and supplies operating power to the PTR control unit A655 and a PTR wireless communication unit A612, which will be described later. The PTR constant voltage circuit A603 is a circuit that can output a voltage while the PTR control unit B605 is off, and thus enables the PTR control unit A655 to operate even when the PTR control unit B605 is off. The PTR constant voltage circuit B604 includes a constant voltage circuit, and supplies operating power to circuit blocks aside from the circuit blocks, such as the PTR control unit B605, which are supplied with operating power by the PTR constant voltage circuit A603. The PTR constant voltage circuit B604 is a circuit that can output a voltage in response to signal control from the PTR constant voltage circuit A603 and others. Note that the PTR constant voltage circuit A603 may be constituted by a circuit that can supply less current, and that itself consumes less current, than the PTR constant voltage circuit B604.

The PTR wireless communication unit A612 is a communication unit that can carry out short-range wireless communication with other apparatuses. The short-range wireless communication carried out by the PTR wireless communication unit A612 is compliant with, for example, Bluetooth Low Energy, which is a short-range wireless standard ("Bluetooth" is a registered trademark; this will also be called "BLE" hereinafter). A PTR communication antenna A613 is an antenna that can carry out short-range wireless communication with other apparatuses. The PTR communication antenna A613 has a resonance frequency near the 2.4 GHz band, which is a UHF band, for example.

A PTR wireless communication unit B622 is a communication unit that can carry out wireless communication with other apparatuses. The wireless communication carried out by the PTR wireless communication unit B622 is compliant with, for example, the IEEE 802.11 specification, which is a WLAN standard. A PTR communication antenna B623 is an antenna that can carry out wireless communication with other apparatuses. The PTR communication antenna B623 has a resonance frequency near the 2.4 GHz band, which is a UHF band, for example.

The PTR display unit 608 is a display unit that can display operation information of the printing apparatus 601, images to be printed, and the like, and is constituted by, for example, an LCD (Liquid Crystal Display). A PTR memory card slot 609 enables, for example, a flash memory card in which digital data of images is recorded to be inserted. The PTR control unit B605 can write and read the digital data of images recorded in the flash memory card inserted into the PTR memory card slot 609.

A PTR printing unit 610 is a printing unit that provides the printing service of the printing apparatus 601. The PTR printing unit 610 is constituted by, for example, a motor, a paper transport mechanism, and a print head, and can print data, which has been subjected to image processing in the PTR control unit B605, onto the printing medium. A PTR operation input unit 611 is an operation input unit constituted by operation keys, buttons, and the like, and in addition to communicating operation information from a user to the PTR control unit B605, can turn the PTR constant voltage circuit B604 on, and thus can turn the PTR control unit B605 on, in response to a user operation.

Configuration of Image Capturing Apparatus

Figure 2:
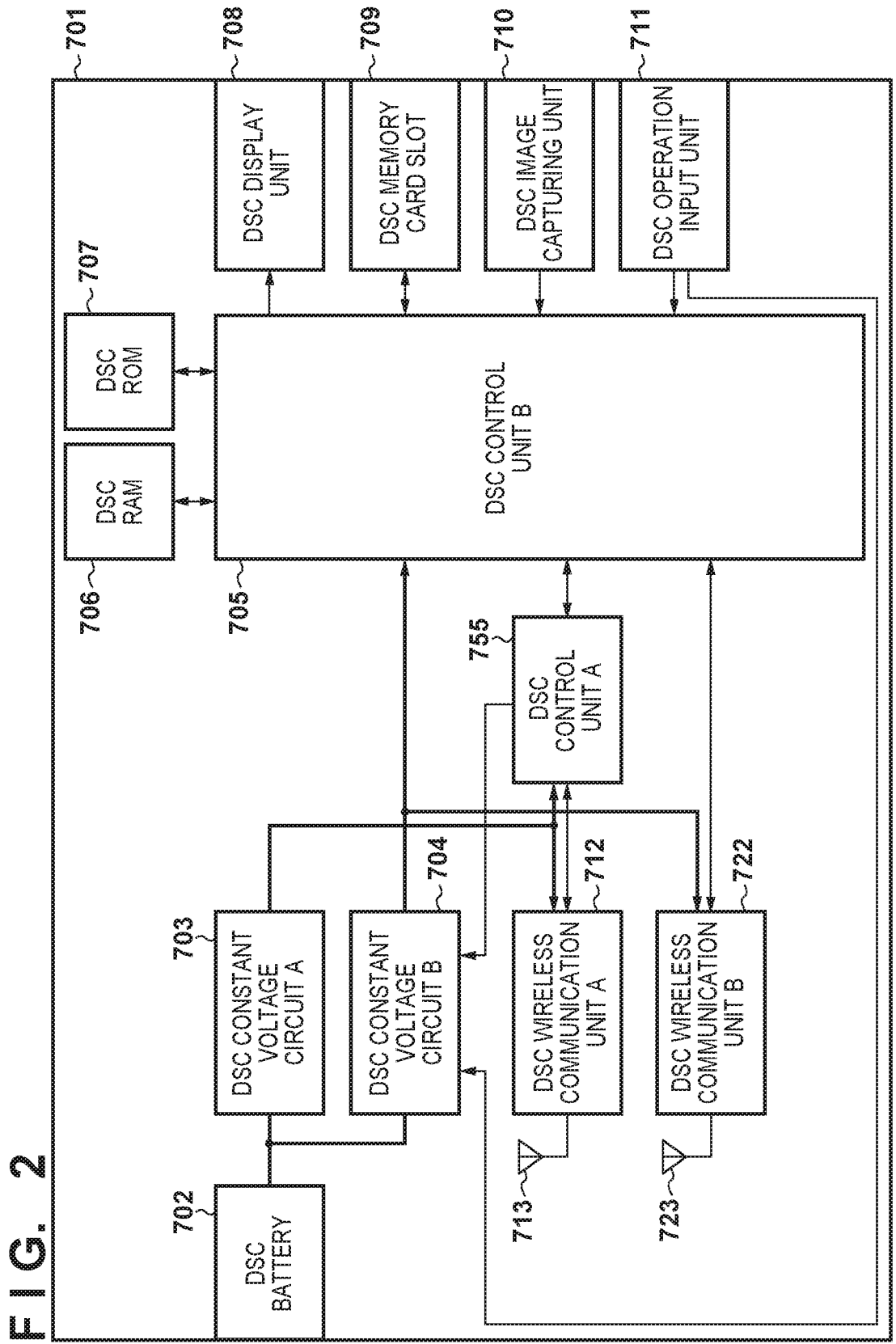
FIG. 2 is a block diagram illustrating an example of the functional configuration of an image capturing apparatus according to the first embodiment.

An example of the functional configuration of the image capturing apparatus 701 according to the present embodiment will be described next with reference to FIG. 2. Note that the characters "DSC" may be added to blocks and the like to distinguish the image capturing apparatus 701 from the other apparatuses. The image capturing apparatus 701 illustrated in FIG. 2 is an apparatus that can capture images (including video). A DSC control unit B705 includes a CPU, and controls the image capturing apparatus 701 as a whole by loading programs stored in DSC ROM 707 into DSC RAM 706 and executing those programs. The DSC control unit B705 operates as the main system of the image capturing apparatus 701. The DSC control unit B705 can display digital image data and the like in a DSC display unit 708, and can carry out image processing that converts the digital image data and the like into data that can be recorded into a recording medium. The DSC RAM 706 is RAM used as a work area for the DSC control unit B705, and is constituted by, for example, volatile memory such as dynamic RAM. The DSC ROM 707 is ROM that stores programs of the DSC control unit B705, and is constituted by, for example, rewritable non-volatile memory such as flash memory.

A DSC control unit A755 is a control unit that controls some of the functions of the image capturing apparatus 701, and includes RAM used as a work area and ROM storing programs. The DSC control unit A755 is a sub system of the image capturing apparatus 701. The DSC control unit A755 can operate even when the DSC control unit B705 is off (i.e., on standby power), and consumes less power than the DSC control unit B705. For example, the DSC control unit A755 can be used to enable wireless communication connections with other apparatuses during a standby state where image capturing, an image transfer service, and the like are not being provided. The DSC control unit A755 and the DSC control unit B705 can operate using separate power source circuits. For example, the power source circuit of the DSC control unit B705 is turned on by the DSC control unit A755, which causes the DSC control unit B705, which was off, to transition to an on state.

A DSC battery 702 is a battery that can supply power to the various units in the image capturing apparatus 701, and is constituted by a lithium-ion battery, for example. The output of the DSC battery 702 is furthermore converted into a voltage that can be supplied to circuit blocks in later stages by a DSC constant voltage circuit A703 and a DSC constant voltage circuit B704. The DSC constant voltage circuit A703 includes a constant voltage circuit, and supplies operating power to the DSC control unit A755 and a DSC wireless communication unit A712, which will be described later. The DSC constant voltage circuit A703 is a circuit that can output a voltage while the DSC control unit B705 is off, and thus enables the DSC control unit A755 to operate even when the DSC control unit B705 is off. The DSC constant voltage circuit B704 includes a constant voltage circuit, and supplies operating power to circuit blocks aside from the circuit blocks, such as the DSC control unit B705, which are supplied with operating power by the DSC constant voltage circuit A703. The DSC constant voltage circuit B704 is a circuit that can output a voltage in response to signal control from the DSC constant voltage circuit A703 and others. Note that the DSC constant voltage circuit A703 may be constituted by a circuit that can supply less current, and that itself consumes less current, than the DSC constant voltage circuit B704.

The DSC wireless communication unit A712 is a communication unit that can carry out short-range wireless communication with other apparatuses. The short-range wireless communication carried out by the DSC wireless communication unit A712 is compliant with, for example, BLE, which is a short-range wireless standard. A DSC communication antenna A713 is an antenna that can carry out short-range wireless communication with other apparatuses. The DSC communication antenna A713 has a resonance frequency near the 2.4 GHz band, which is a UHF band, for example.

A DSC wireless communication unit B722 is a communication unit that can carry out wireless communication with other apparatuses. The wireless communication carried out by the DSC wireless communication unit B722 is compliant with, for example, the IEEE 802.11 specification, which is a WLAN standard. A DSC communication antenna B723 is an antenna that can carry out wireless communication with other apparatuses. The DSC communication antenna B723 has a resonance frequency near the 2.4 GHz band, which is a UHF band, for example.

The DSC display unit 708 is a display unit that can display operation information of the image capturing apparatus 701, images to be printed, and the like, and is constituted by, for example, an LCD. A DSC memory card slot 709 enables, for example, a flash memory card in which digital data of images is recorded to be inserted. The DSC control unit B705 can write and read captured digital image data and the like in the flash memory card inserted into the DSC memory card slot 709.

A DSC image capturing unit 710 is an image capturing unit that provides an image capturing service of the image capturing apparatus 701. The DSC image capturing unit 710 includes, for example, an optical unit constituted by a lens and a driving system thereof, and an image sensor. Digital image data or video data captured by the image sensor is subjected to image processing by the DSC control unit B705, and is recorded into the recording medium as necessary. A DSC operation input unit 711 is an operation input unit constituted by operation keys, buttons, and the like, and in addition to communicating operation information from a user to the DSC control unit B705, can turn the DSC constant voltage circuit B704 on, and thus can turn the DSC control unit B705 on, in response to a user operation.

Configuration of Communication Apparatus

Figures 3, 13B:
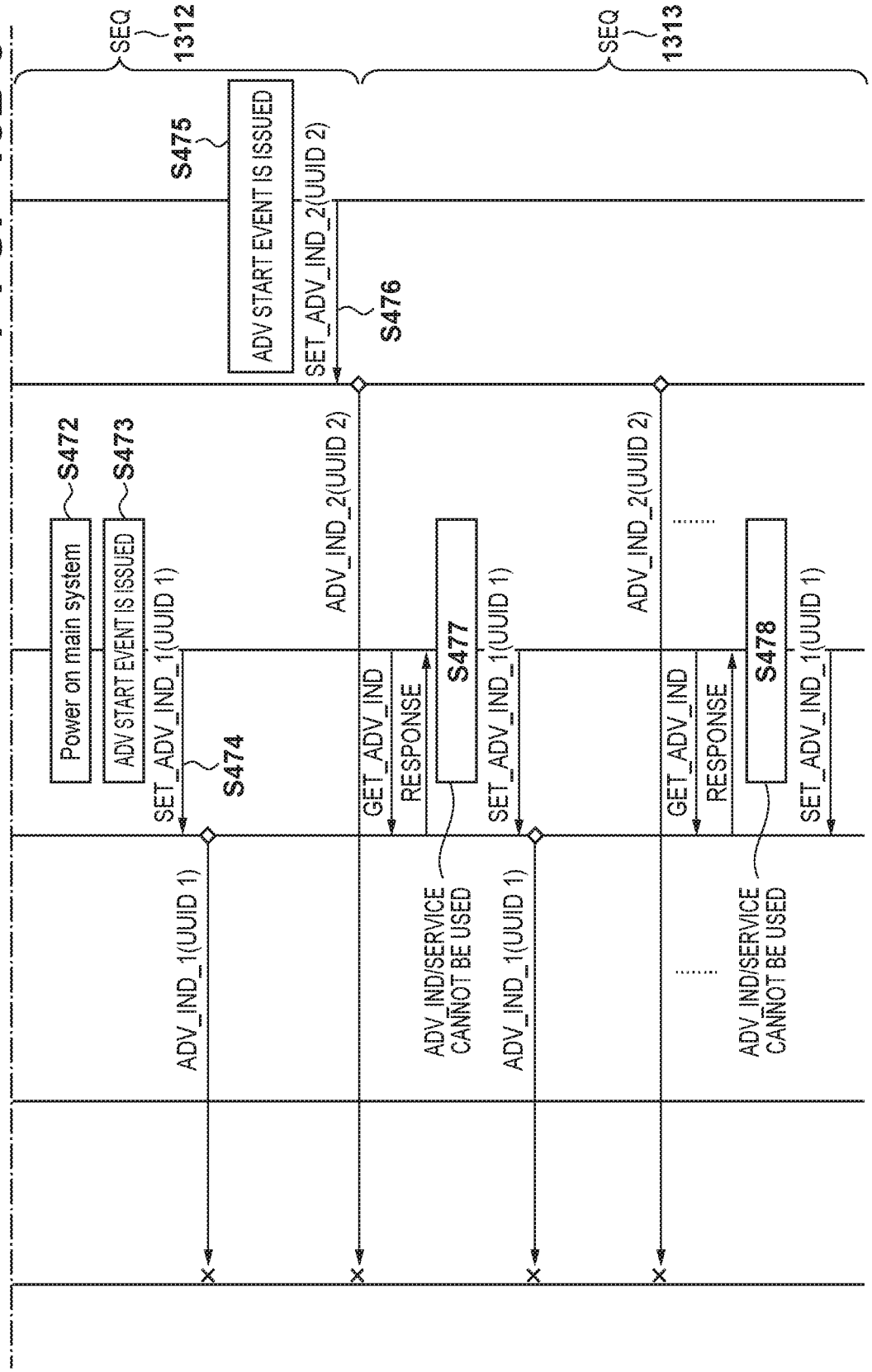

Furthermore, an example of the functional configuration of the communication apparatus 801 according to the present embodiment will be described next with reference to FIG. 3. In FIG. 3, the communication apparatus 801 is an apparatus capable of capturing images (including video) and wireless communication over a public wireless line. Note that the characters "OTH" may be added to blocks and the like to distinguish the communication apparatus 801 from the other apparatuses.

An OTH control unit B805 includes a CPU, and controls the communication apparatus 801 as a whole by loading programs stored in OTH ROM 807 into OTH RAM 806 and executing those programs. The OTH control unit B805 operates as the main system of the communication apparatus 801. The OTH control unit B805 can display digital image data and the like in an OTH display unit 808, and can carry out image processing that converts the digital data and the like into data that can be recorded into a recording medium. The OTH RAM 806 is RAM used as a work area for the OTH control unit B805, and is constituted by, for example, volatile memory such as dynamic RAM. The OTH ROM 807 is ROM that stores programs of the OTH control unit B805, and is constituted by, for example, rewritable non-volatile memory such as flash memory.

An OTH control unit A855 is a control unit that controls some of the functions of the communication apparatus 801, and includes RAM used as a work area and ROM storing programs. The OTH control unit A855 is a sub system of the communication apparatus 801. The OTH control unit A855 can operate even when the OTH control unit B805 is off (i.e., on standby power), and consumes less power than the OTH control unit B805. For example, the OTH control unit A855 can be used to enable wireless communication connections with other apparatuses during a standby state where image capturing, an image transfer service, and the like are not being provided. The OTH control unit A855 and the OTH control unit B805 can operate using separate power source circuits. For example, the power source circuit of the OTH control unit B805 is turned on by the OTH control unit A855, which causes the OTH control unit B805, which was off, to transition to an on state.

An OTH battery 802 is a battery that can supply power to the communication apparatus 801, and is constituted by a lithium-ion battery, for example. The output of the OTH battery 802 is furthermore converted into a voltage that can be supplied to circuit blocks in later stages by an OTH constant voltage circuit A803 and an OTH constant voltage circuit B804. The OTH constant voltage circuit A803 includes a constant voltage circuit, and supplies operating power to the OTH control unit A855 and an OTH wireless communication unit A812, which will be described later. The OTH constant voltage circuit A803 is a circuit that can output a voltage while the OTH control unit B805 is off, and thus enables the OTH control unit A855 to operate even when the OTH control unit B805 is off. The OTH constant voltage circuit B804 includes a constant voltage circuit, and supplies operating power to circuit blocks aside from the circuit blocks, such as the OTH control unit B805, which are supplied with operating power by the OTH constant voltage circuit A803. The OTH constant voltage circuit B804 is a circuit that can output a voltage in response to signal control from the OTH constant voltage circuit A803 and others. Note that the OTH constant voltage circuit A803 may be constituted by a circuit that can supply less current, and that itself consumes less current, than the OTH constant voltage circuit B804.

The OTH wireless communication unit A812 is a communication unit that can carry out short-range wireless communication with other apparatuses. The short-range wireless communication carried out by the OTH wireless communication unit A812 is compliant with, for example, BLE, which is a short-range wireless standard. An OTH communication antenna A813 is an antenna that can carry out short-range wireless communication with other apparatuses. The OTH communication antenna A813 has a resonance frequency near the 2.4 GHz band, which is a UHF band, for example.

An OTH wireless communication unit B822 is a communication unit that can carry out wireless communication with other apparatuses. The wireless communication carried out by the OTH wireless communication unit B822 is compliant with, for example, the IEEE 802.11 specification, which is a WLAN standard. An OTH communication antenna B823 is an antenna that can carry out wireless communication with other apparatuses. The OTH communication antenna B823 has a resonance frequency near the 2.4 GHz band, which is a UHF band, for example.

An OTH wireless communication unit C832 is a communication unit that can carry out wireless communication with other apparatuses over a public wireless line via a base station. The wireless communication carried out by the OTH wireless communication unit C832 is compliant with a mobile communication system such as 3G or 4G, defined by the International Telecommunication Union (ITU), for example. An OTH communication antenna C833 is an antenna that can carry out wireless communication with other apparatuses. The OTH communication antenna C833 has resonance frequencies near the 400-900 MHz, 2 GHz, and 3 GHz bands, which are UHF and SHF band, for example.

The OTH display unit 808 is a display unit that can display operation information of the communication apparatus 801, images to be printed, and the like, and is constituted by, for example, an LCD. An OTH memory card slot 809 enables, for example, a flash memory card in which digital data of images is recorded to be inserted. The OTH control unit B805 can write and read captured digital image data and the like in the flash memory card inserted into the OTH memory card slot 809.

An OTH image capturing unit 810 is an image capturing unit that provides an image capturing service of the communication apparatus 801. The OTH image capturing unit 810 includes, for example, an optical unit constituted by a lens and a driving system thereof, and an image sensor. Digital image data or video data captured by the image sensor is subjected to image processing by the OTH control unit B805, and is recorded into the recording medium as necessary. An OTH operation input unit 811 is an operation input unit constituted by operation keys, buttons, and the like, and in addition to communicating operation information from a user to the OTH control unit B805, can turn the OTH constant voltage circuit B804 on, and thus can turn the OTH control unit B805 on, in response to a user operation.

Series of Operations in Connection Changing Process by Printing Apparatus

Figure 4A:
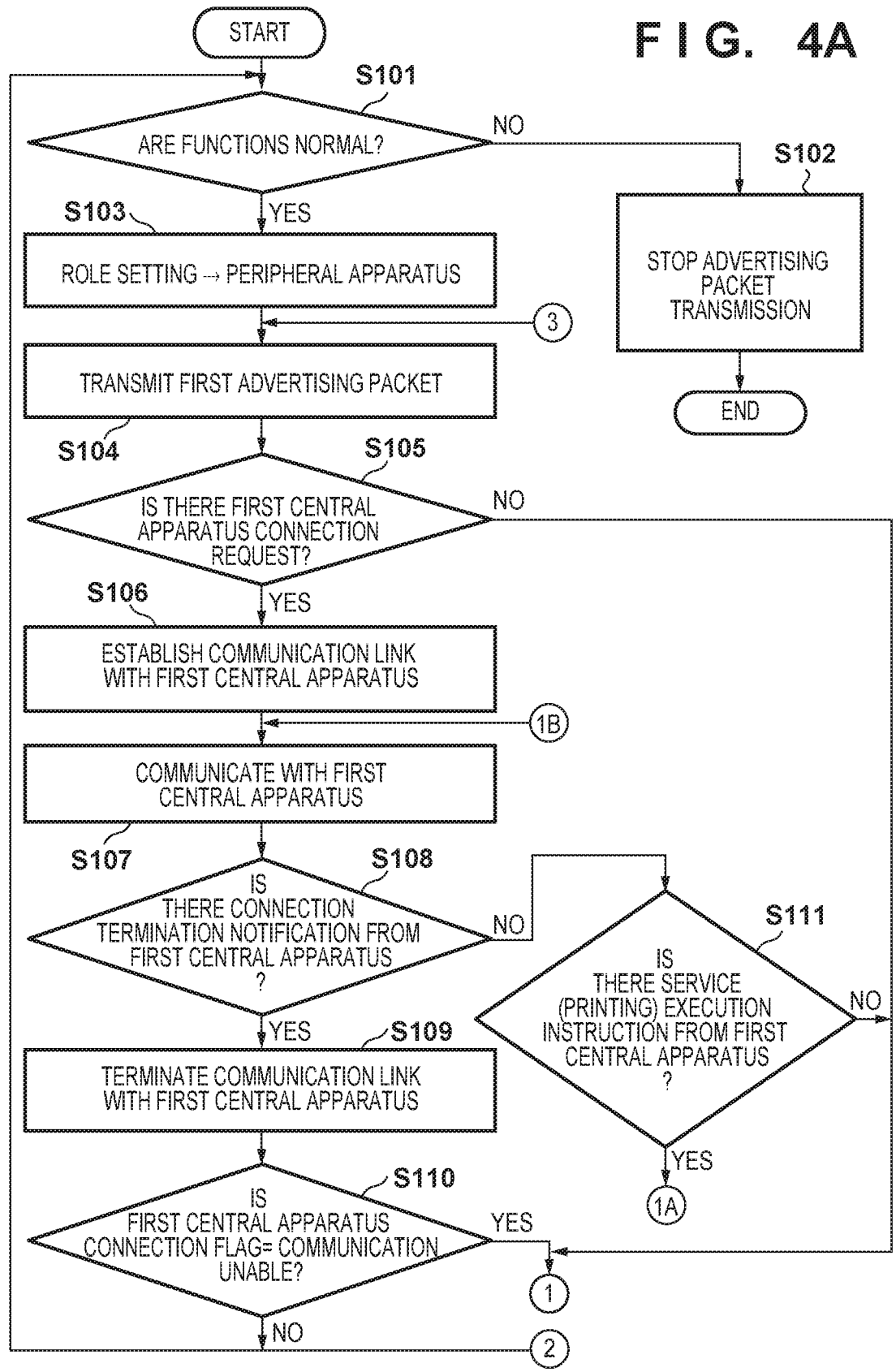
Figure 4C:
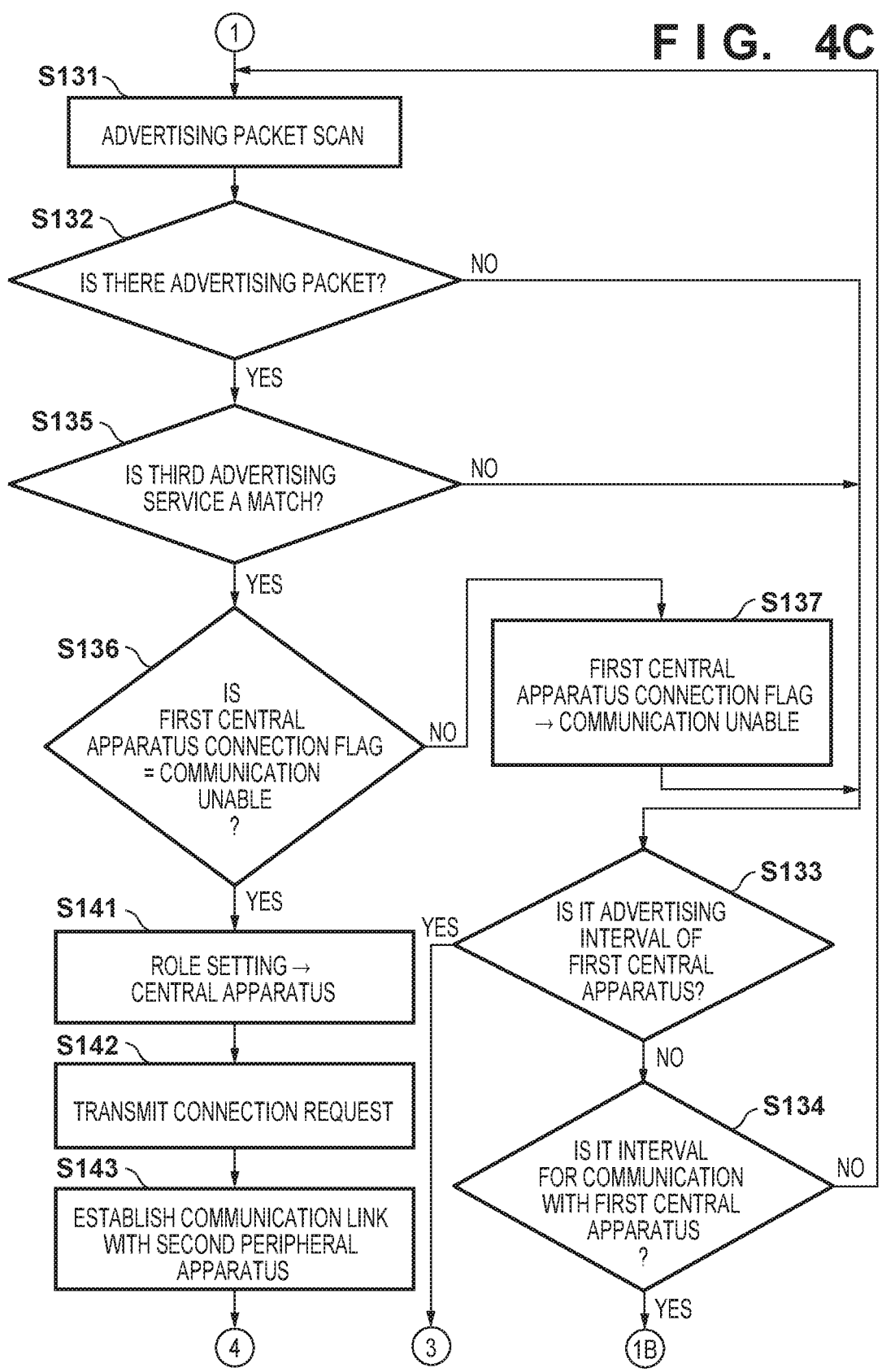

FIGS. 4A to 4C illustrate a series of operations involved in a process for changing a wireless connection (a connection changing process) carried out by the printing apparatus 601 according to the present embodiment. Note that unless otherwise specified, the individual processes in this process are realized by the PTR control unit A655 of the printing apparatus 601 loading programs stored in its internal ROM into its internal RAM and executing the programs. The operations in this process are started upon an AC voltage being input to the PTR AC/DC conversion circuit 602 of the printing apparatus 601 from the exterior.

In the present embodiment, the communication apparatus 801 operates as a central role apparatus (a first central apparatus), and the image capturing apparatus 701 operates as a peripheral role apparatus (a second peripheral apparatus). The printing apparatus 601 changes its part (role) from a peripheral role to a central role, and operates as a first peripheral apparatus and a second central apparatus in those respective situations.

In S101, the PTR control unit A655 determines whether some of the functions of the printing apparatus 601 are normal. If the PTR control unit A655 determines that some of the functions are not normal, the process moves to S102. In S102, the transmission of the advertising packets from the PTR wireless communication unit A612 is stopped, and the flowchart ends. On the other hand, if the PTR control unit A655 determines that some of the functions are normal, the process moves to S103.

Figure 9A:
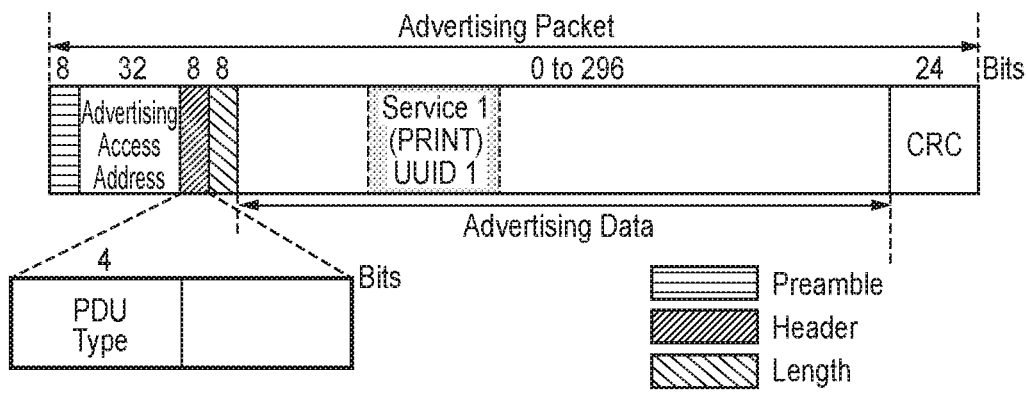
FIGS. 9A, 9B, and 9C are examples of data in an advertising packet according to the first embodiment.

In S103, the PTR control unit A655 sets the role of the PTR wireless communication unit A612 to the peripheral role. The printing apparatus 601 operates as a peripheral role apparatus as a result of the PTR control unit A655 setting the role of the PTR wireless communication unit A612 to the peripheral role. In S104, the PTR control unit A655 causes a first advertising packet (information indicating the presence of the self apparatus) to be transmitted from the PTR wireless communication unit A612 to an external apparatus. An example of the data in the transmitted advertising packet will be described later. Note that the transmission of the first advertising packet in S104 is carried out until the PTR control unit A655 receives a connection request from the central role apparatus in a time period (an advertising interval) pre-set in the printing apparatus 601. As illustrated in FIG. 9A, for example, the first advertising packet transmitted in S104 includes a UUID 1, which specifies a service that can be executed by the printing apparatus 601, in the data of the advertising packet. "UUID" is an acronym for "Universally Unique IDentifier". The service specified by the UUID can be set to a variety of services, which will be described separately later. The example of the advertising packet illustrated in FIG. 9A indicates that a Service 1 can be executed using the UUID 1. Service 1 is a printing service that prints onto the printing medium using the PTR printing unit 610 of the printing apparatus 601, for example.

In S105, the PTR control unit A655 determines whether there is a connection request from the first central apparatus to the PTR wireless communication unit A612. The PTR control unit A655 moves to S106 if, on the basis of a notification from the PTR wireless communication unit A612, there is a connection request from the first central apparatus, and to S131 if there is no connection request. In S106, the PTR control unit A655 establishes a BLE communication link with the first central apparatus, and in S107, carries out BLE communication with the first central apparatus. Note that the BLE communication in S107 is carried out intermittently at predetermined time periods (communication intervals) set with the first central apparatus.

Note that the advertising packet transmitted from the peripheral role apparatus in S104 (i.e., the printing apparatus 601 is scanned by the first central apparatus, which is a central role apparatus. The first central apparatus makes a connection request to the printing apparatus 601 if the UUID specifying the service, included in the advertising packet, is valid in combination with the self apparatus. Then, a BLE connection is established with the first central apparatus and the various services are executed. FIG. 11A illustrates an example of a database in a GATT server storing Services and Characteristics of the PTR wireless communication unit A612 of the printing apparatus 601. The BLE communication between the printing apparatus 601 and the first central apparatus is executed by reads and writes made to the database in the GATT server, illustrated in FIG. 11A. Note that FIG. 11A illustrates an example of the database in a GATT server for a case where the printing apparatus 601 includes the UUID 1 specifying the printing service in the advertising packet. For example, one type of Service is stored, such as "Service 1: UUIDs of multiple Characteristics corresponding to UUID 1, and VALUEs corresponding to the UUIDs".

At this time, "print able/unable flag", "SSID", "PASSWORD", "device name", "supported printing protocol 1", "supported printing protocol 2", "print status", "central connection flag", and "WLAN status" can be given as examples of the Characteristic VALUEs of Service 1. Note that the Characteristic VALUE will be denoted simple as "VALUE" in the following descriptions.

In S108, the PTR control unit A655 determines whether there is a connection termination notification from the first central apparatus to the PTR wireless communication unit A612. The PTR control unit A655 moves to S109 if there is a connection termination notification from the first central apparatus, and to S111 if there is no connection termination notification from the first central apparatus. In S109, the PTR control unit A655 terminates (disconnects) the BLE communication link with the first central apparatus. PTR control unit A655 then moves to S110.

In S110, the PTR control unit A655 determines whether the "central connection flag" of the VALUEs of the printing service is "communication unable" in the GATT server database of the PTR wireless communication unit A612. If the "central connection flag", which corresponds to a connection flag for the first central apparatus, is "communication unable", the PTR control unit A655 moves to S131. On the other hand, if the "central connection flag" is not "communication unable", the PTR control unit A655 returns to S101.

In S111, the PTR control unit A655 determines whether there is a service execution instruction from the first central apparatus to the PTR wireless communication unit A612. The service in S111 is the printing service, in which the PTR printing unit 610 of the printing apparatus 601 is used to print onto the printing medium, for example. If there is no service execution instruction from the first central apparatus to the PTR wireless communication unit A612, the PTR control unit A655 moves to S131. On the other hand, if there is a service execution instruction from the first central apparatus to the PTR wireless communication unit A612, the PTR control unit A655 moves to S113.

In S113, the PTR control unit A655 turns the PTR constant voltage circuit B604 on, and turns the PTR control unit B605 serving as the main system on, in order to execute the printing service. Note that if the main system power is already on, the process for turning the main system power on in S113 is deactivated, and the process moves to the next step. The present embodiment describes an example in which the PTR control unit A655 has the main system power continuously off if there is an AC voltage input to the PTR AC/DC conversion circuit 602 from the exterior. Furthermore, the process of S113 is executed assuming that the main system power is turned on only when the printing service is to be executed. Note that if the apparatus configuration is such that the main system power is continuously on when there is an AC voltage input to the PTR AC/DC conversion circuit 602 from the exterior, the process of S113 may be deactivated and the process may move to the next step.

In S114, the PTR control unit B605 terminates the BLE communication link with the apparatus to which the service is being provided, and moves to S115. Note that the process of terminating the BLE communication link with the apparatus in S114 is assumed to be carried out when WLAN and BLE are not permitted to operate simultaneously in the printing apparatus 601. Accordingly, the process of S114 need not be executed if WLAN and BLE are permitted to operate simultaneously in the printing apparatus 601. The present embodiment describes an example in which the printing apparatus 601 is a system in which WLAN and BLE are permitted to operate simultaneously. Accordingly, the PTR control unit B605 skips the process of S114.

In S115, the PTR control unit B605 carries out a WLAN handover with the apparatus to which the service is being provided. Specifically, the PTR wireless communication unit B622 is used to establish a WLAN communication link with the apparatus to which the service is being provided, using an SSID, connection password information, or the like shared over the BLE communication with the PTR wireless communication unit A612. In S116, the PTR control unit B605 receives the data from the apparatus to which the service is being provided through the PTR wireless communication unit B622, and in S117, the printing apparatus 601 executes the printing service.

In S118, the PTR control unit B605 terminates the WLAN communication link with the apparatus to which the service is being provided, established in S115. Furthermore, in S119, the PTR control unit B605 restores the BLE communication link with the apparatus to which the service is being provided, which was terminated in S114, and in S120 carries out BLE communication with the apparatus to which the service is being provided. As described above, if the system permits the simultaneous operation of WLAN and BLE, the PTR control unit B605 can skip the process of S119.

In S121, the PTR control unit B605 determines whether the printing service has ended. If it is determined that the printing service has not ended, the PTR control unit B605 returns to S120 and continues the BLE communication with the apparatus to which the service is being provided. Note that there are two types of services executed using a BLE communication link with the printing apparatus 601, namely a printing service which is carried out with the communication apparatus 801 serving as the first central apparatus, and a printing service carried out, via a print request service, with the image capturing apparatus 701 serving as the second peripheral apparatus. On the other hand, if it is determined that the printing service has ended, the PTR control unit B605 moves to S122. In S122, the PTR control unit A655 turns the PTR constant voltage circuit B604 off, and turns the PTR control unit B605, which is the main system, off as well.

In S123, the PTR control unit A655 determines whether the role of the PTR wireless communication unit A612 is set to the peripheral role. If it is determined that the role of the PTR wireless communication unit A612 is set to the peripheral role, the PTR control unit A655 returns to S107. On the other hand, if it is determined that the PTR wireless communication unit A612 is not set to the peripheral role, the process moves to S144.

The processes from S131 and on will be described next. S131 corresponds to a case where there is no connection request from the first central apparatus in S105, a case where there is no service execution instruction from that apparatus in S111, or a case where the connection flag of the first central apparatus indicates "connection unable" in S110. In other words, this is a state where the printing apparatus 601 is not connected to the communication apparatus 801 serving as the first central apparatus, a state where the printing service is not being executed, i.e., a state between instances of providing the printing service, where the resources for providing the service are available. In this case, as will be described below, the printing apparatus 601 behaves as a central role apparatus to other peripheral role apparatuses (e.g., the image capturing apparatus 701). In this step, first, the PTR control unit A655 scans the advertising packets from the other peripheral role apparatuses.

The PTR control unit A655 moves to S133 if in S132 there are no advertising packets from other peripheral role apparatuses, and moves to S135 if there is an advertising packet from another peripheral role apparatus. In S133, it is determined whether it is the advertising interval of the first central apparatus. The PTR control unit A655 moves to S134 if it is not the advertising interval of the first central apparatus, and returns to S104 if it is an interval of BLE communication with the first central apparatus. In S134, it is determined whether it is an interval of BLE communication with the first central apparatus. If it is not an interval of BLE communication with the first central apparatus, the PTR control unit A655 returns to S131. On the other hand, if it is an interval of BLE communication with the first central apparatus, the PTR control unit A655 returns to S107.

Figure 9B:
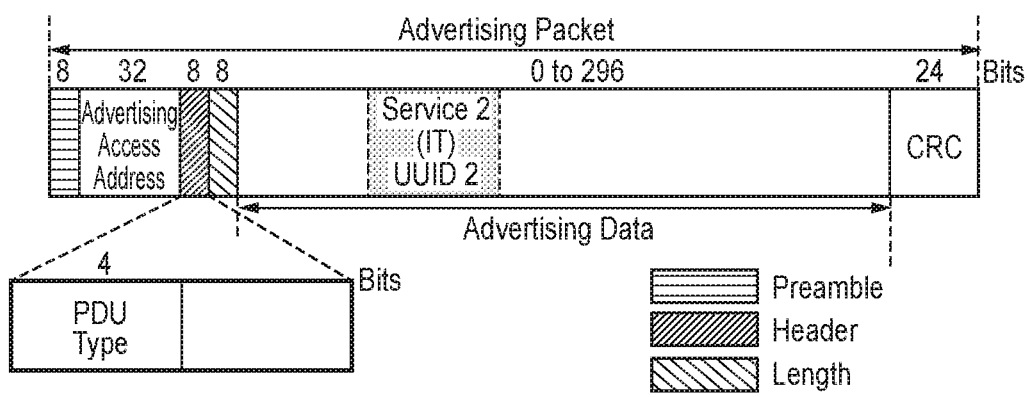
Figure 9C:
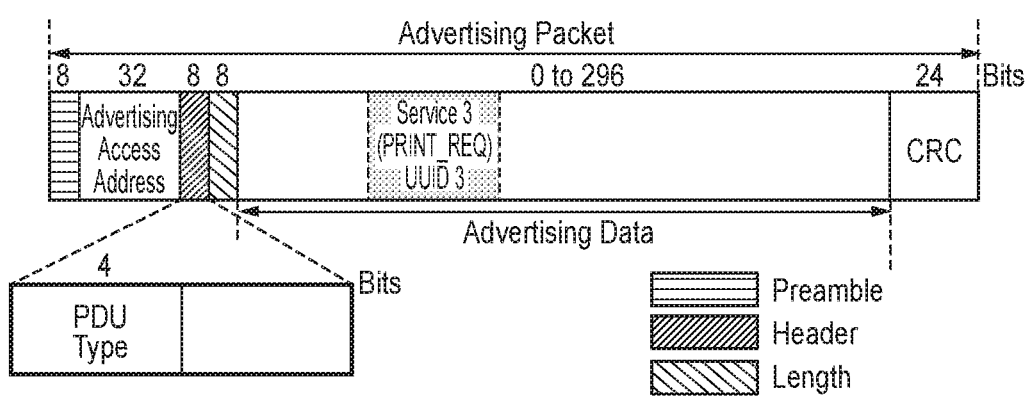

In S135, the printing apparatus 601 determines whether the UUID specifying a service, included in the advertising packet transmitted from a peripheral apparatus (e.g., the image capturing apparatus 701), is valid in combination with the self apparatus. An advertising packet determined by the PTR control unit A655 to be valid refers to a third advertising packet including a UUID that specifies a service that can be executed by the printing apparatus 601 and that requests that service to be executed, as indicated in FIG. 9C. Various services can be considered as the Service specified by the UUID. The example of the advertising packet illustrated in FIG. 9C indicates that a Service 3 can be executed using a UUID 3. Service 3 is a print request service for requesting the execution of the printing service, which prints onto the printing medium using the PTR printing unit 610 of the printing apparatus 601. If the third advertising packet does not indicate a service that is valid in combination with the self apparatus, the PTR control unit A655 moves to S133. On the other hand, if the third advertising packet does indicate a service that is valid in combination with the self apparatus, the process moves to S136.

In S136, the PTR control unit A655 determines whether the "central connection flag" of the VALUEs of Service 1, corresponding to the printing service, is "communication unable" in the GATT server database of the PTR wireless communication unit A612. If the central connection flag is "communication unable", the PTR control unit A655 moves to S141. In other words, if the central connection flag is not "communication unable", the PTR control unit A655 moves to S137. In S137, the PTR control unit A655 sets the "central connection flag" of the VALUEs of Service 1, corresponding to the printing service, to "communication unable" in the GATT server database of the PTR wireless communication unit A612. The process then moves to S133.

In S141, the PTR control unit A655 sets the role of the PTR wireless communication unit A612 to the central role. The printing apparatus 601 operates as the second central apparatus in BLE as a result of the PTR control unit A655 setting the role of the PTR wireless communication unit A612 to the central role. In S142, the PTR control unit A655 makes a connection request to the peripheral apparatus that transmitted the third advertising packet (the image capturing apparatus 701, which is the second peripheral apparatus). In S143, the PTR control unit A655 establishes a BLE communication link with the image capturing apparatus 701, which is the second peripheral apparatus, and furthermore carries out BLE communication with the second peripheral apparatus in S144. Note that the BLE communication in S144 is carried out intermittently at communication intervals set with the second peripheral apparatus.

Figure 10A:
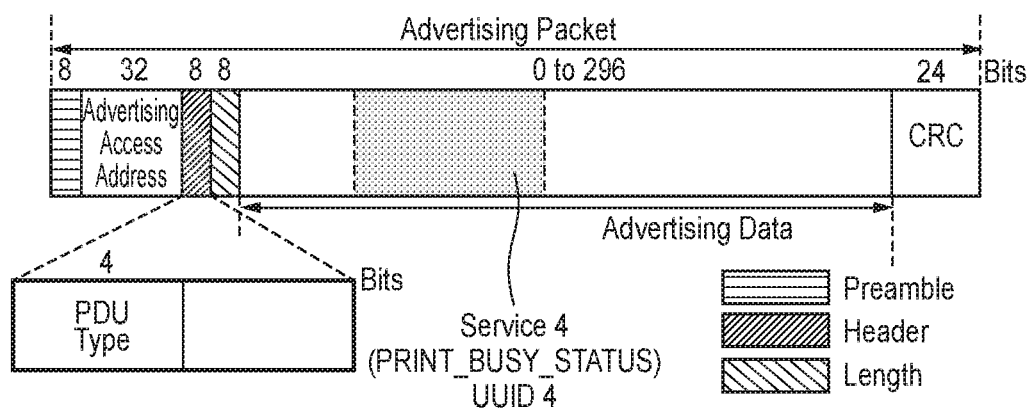
FIGS. 10A and 10B are examples of data in a broadcast packet according to the first embodiment.

In S145, the PTR control unit A655 broadcasts a fourth advertising packet from the PTR wireless communication unit A612. Note that the broadcasting of the fourth advertising packet in S145 is carried out intermittently at predetermined time periods (an advertising interval) set by the PTR control unit A655. The broadcast advertising packet according to the present embodiment refers to the fourth advertising packet, which includes a UUID 4 specifying a Service of the printing apparatus 601 in the data of the advertising packet, as illustrated in FIG. 10A. Various services can be considered as the Service specified by the UUID, and an example thereof will be given below. The example of the broadcast advertising packet indicated in FIG. 10A is an example of an advertising packet that cannot make a connection request (indicating that a connection cannot be made to an external apparatus), and the UUID 4 indicates a state of Service 4. Service 4 is a print busy status service, indicating that the PTR printing unit 610 of the printing apparatus 601 is in a busy state. To express a broadcast advertising packet that cannot make a connection request, in this advertising packet, four bits [3:0] in the 8-bit "PDU (Protocol Data Unit) Type" of the header are set to "0010".

Note that the broadcast advertising packet transmitted from the printing apparatus 601 is scanned by the first central apparatus serving as a central role apparatus (i.e., the communication apparatus 801). The first central apparatus determines whether the UUID specifying the service, included in the advertising packet transmitted by the printing apparatus 601, is valid in combination with the self apparatus. At this time, the first central apparatus can determine the print busy status service, which indicates that the PTR printing unit 610 of the printing apparatus 601 is in a busy state, and thus no BLE connection request is made to the printing apparatus 601. By using the broadcast advertising packet transmission of S145, the printing apparatus 601 can notify the central role apparatus of the print busy status service. The central role apparatus can then control the self apparatus so as to be incapable of executing the printing service with the printing apparatus 601.

In S146, the PTR control unit A655 determines whether the "central connection flag" of the VALUEs of Service 3 is "communication unable" in the GATT server database of the second peripheral apparatus that carried out communication in S144. Note that the VALUEs of Service 3 are VALUEs corresponding to the print request service, as described above. The values in the GATT server database of the image capturing apparatus 701 will be described later with reference to FIG. 11. If the "central connection flag" of the second peripheral apparatus is "communication unable", the PTR control unit A655 moves to S150. On the other hand, if the "central connection flag" is not "communication unable", the process moves to S147.

In S150, the PTR control unit A655 terminates the BLE communication link with the second peripheral apparatus (i.e., the image capturing apparatus 701). In S151, the printing apparatus 601 sets the "central connection flag" of the VALUEs of Service 1, corresponding to the printing service, to "communication able" in the GATT server database of the PTR wireless communication unit A612. The process then returns to S101.

In S147, the PTR control unit A655 determines whether a "print request flag" of the VALUEs of Service 3 is "YES" in the GATT server database of the second peripheral apparatus that carried out communication in S144. If the "print request flag", which is a print execution instruction flag of the second peripheral apparatus, is "YES", the PTR control unit A655 determines that there is a printing service execution instruction from the image capturing apparatus 701, and moves to S113. In other words, through the above-described processing of S113 to S123, the printing service is executed for the second peripheral apparatus through a handover to the faster WLAN. On the other hand, if the "print request flag", which is the above-described print execution instruction flag, is "NO", the PTR control unit A655 determines that there is no instruction to execute the printing service from the image capturing apparatus 701, and returns to S144. When the process of S102 then ends, the PTR control unit A655 terminates this series of operations.

Figure 5A:
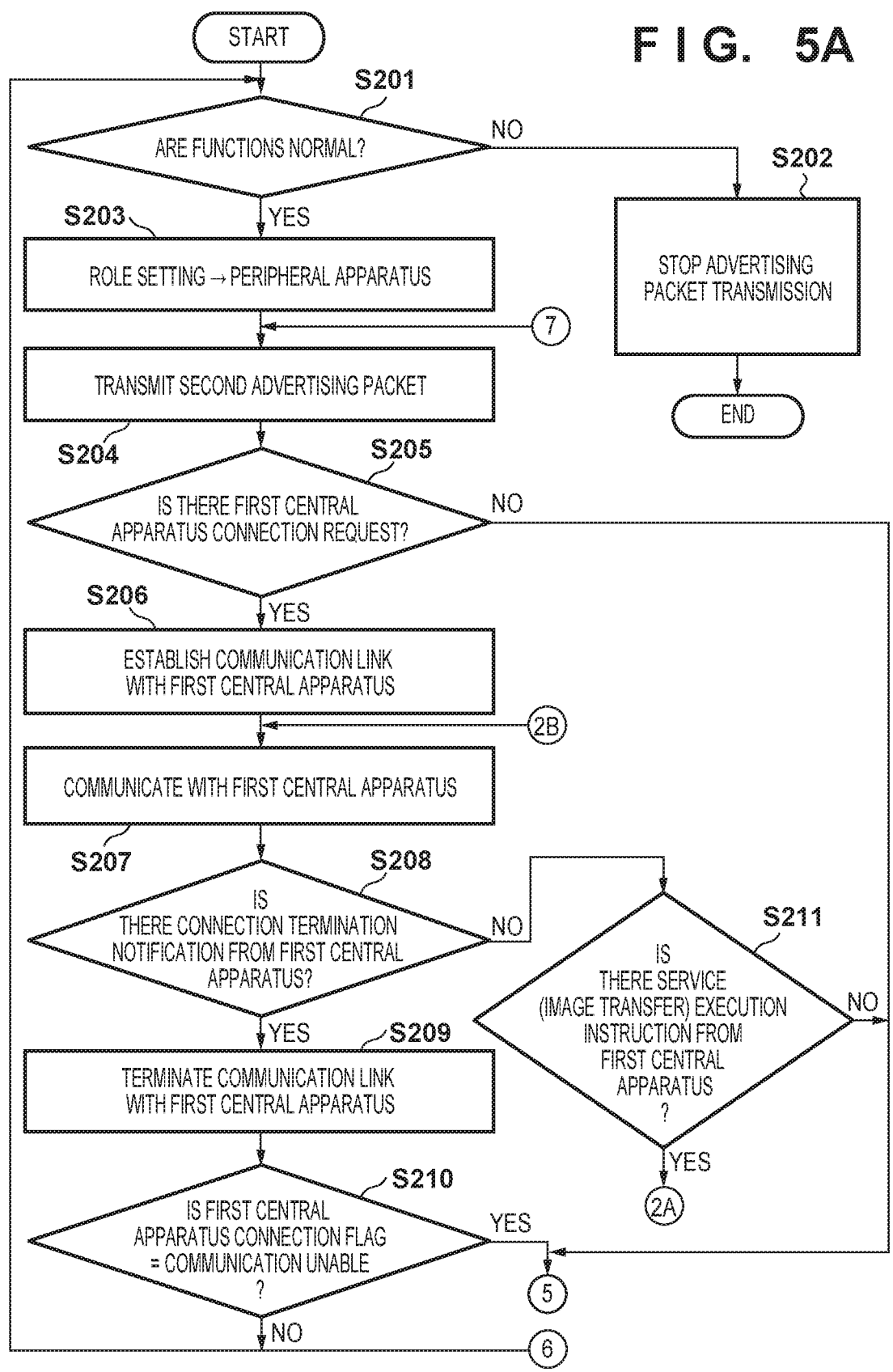
FIGS. 5A, 5B, and 5C are flowcharts illustrating a sequence of operations in a connection changing process of the image capturing apparatus according to the first embodiment.
Figure 5B:
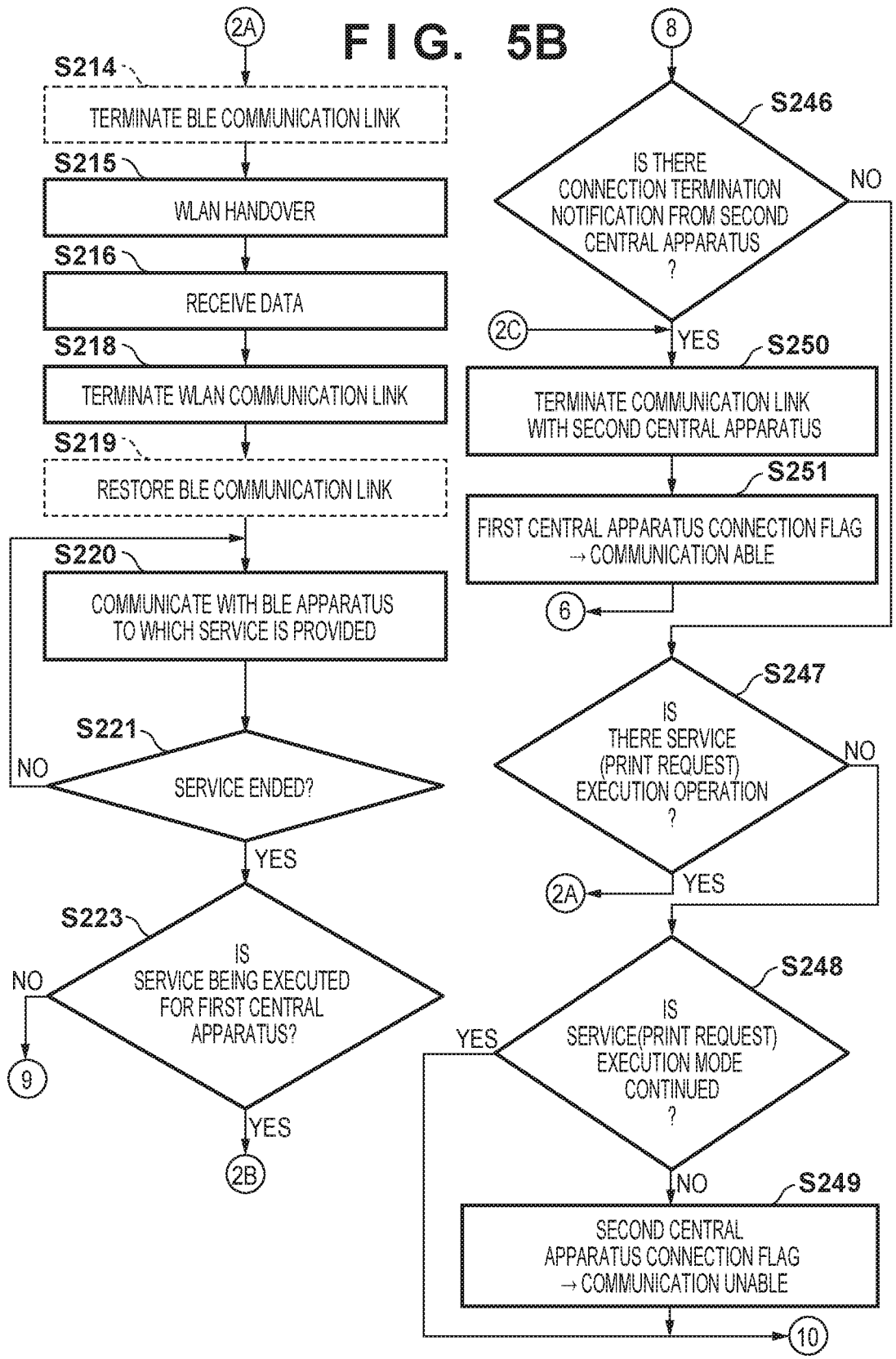
Figure 5C:
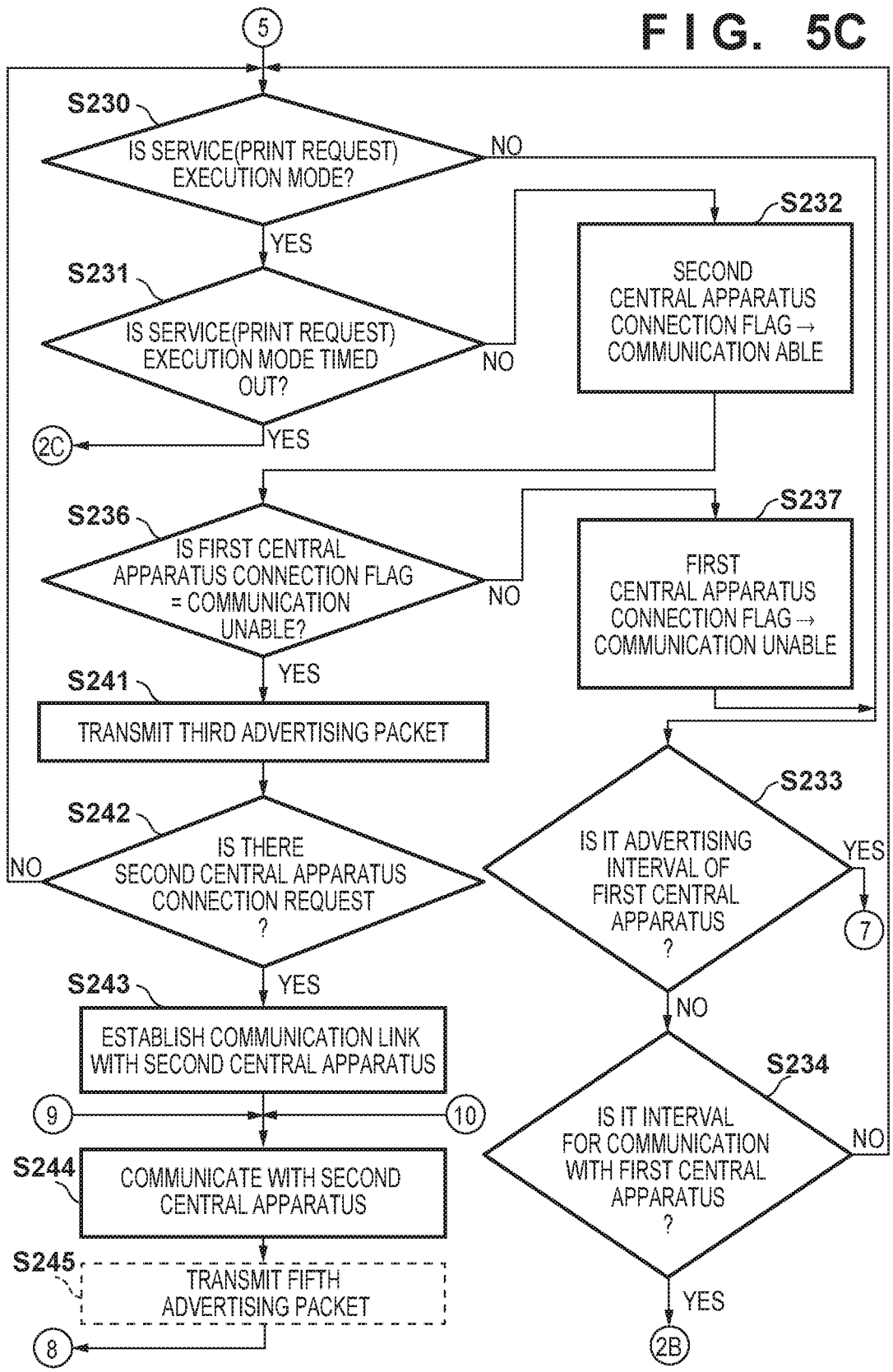

Series of Operations in Connection Changing Process by Image Capturing Apparatus Next, a series of operations involved in a process in which the second peripheral apparatus (the image capturing apparatus 701) connects to the first central apparatus (the communication apparatus 801) or the printing apparatus 601 behaving as the second central apparatus (this is also called a "connection changing process") will be described with reference to FIGS. 5A to 5C. Note that unless otherwise specified, the individual processes in this process are realized by the DSC control unit A755 of the image capturing apparatus 701 loading programs stored in its internal ROM into its internal RAM and executing the programs. Additionally, the operations of this process are started in response to the DSC battery 702 being connected to the image capturing apparatus 701.

In S201, the DSC control unit A755 determines whether some of the functions of the image capturing apparatus 701 are normal. If the image capturing apparatus 701 determines that some of the functions are not normal, the process moves to S202. In S202, the transmission of the advertising packets from the DSC wireless communication unit A712 is stopped, and the flowchart ends. On the other hand, if it is determined that some of the functions are normal, the DSC control unit A755 moves to S203, and in S203, sets the role of the DSC wireless communication unit A712 to the peripheral role. The DSC control unit A755 operates as a BLE peripheral role apparatus by setting the role of the DSC wireless communication unit A712 to the peripheral role.

In S204, the DSC control unit A755 transmits a second advertising packet from the DSC wireless communication unit A712. Note that the image capturing apparatus 701 transmits the second advertising packet in S204 at predetermined time periods (advertising intervals). The advertising packet transmitted in S204 is illustrated in FIG. 9B. This packet (the second advertising packet) includes a UUID 2, which specifies a Service that can be executed by the image capturing apparatus 701, in the data of the advertising packet. Various services can be considered as the Service specified by the UUID, and an example thereof will be given below. The example of the advertising packet illustrated in FIG. 9B indicates that a Service 2 can be executed using the UUID 2. In the present embodiment, Service 2 is an image transfer service that transfers image data captured by the DSC image capturing unit 710 of the image capturing apparatus 701, image data recorded into the flash memory inserted into the DSC memory card slot 709, and the like.

Note that the transmitted advertising packet is scanned by the first central apparatus (the communication apparatus 801), which is a central role apparatus. The first central apparatus makes a connection request to the image capturing apparatus 701 if the UUID specifying the service, included in the advertising packet transmitted by the image capturing apparatus 701, is valid in combination with the self apparatus.

In S205, the DSC control unit A755 determines whether there is a connection request from the first central apparatus to the DSC wireless communication unit A712. If there is no connection request from the first central apparatus, the DSC control unit A755 moves to S230. On the other hand, if there is a connection request from the first central apparatus, the process moves to S206. In S206, the DSC control unit A755 establishes a BLE communication link with the first central apparatus, and in S207, carries out BLE communication with the first central apparatus. Note that the BLE communication in S207 is carried out intermittently at communication intervals set with the first central apparatus.

FIG. 11B illustrates an example of a database in a GATT server storing Services and Characteristics of the DSC wireless communication unit A712 of the image capturing apparatus 701. The BLE communication between the image capturing apparatus 701 and the first central apparatus (the communication apparatus 801) is executed through reads and writes to the GATT server database illustrated in FIG. 11B. FIG. 11B is an example of a GATT server database for a case where the image capturing apparatus 701 includes the UUID 2 specifying the image transfer service in the advertising packet. This database stores the following two types of Services, for example.

Service 2: UUIDs of multiple Characteristics corresponding to UUID 2, and VALUEs corresponding to the UUIDs Service 3: UUIDs of multiple Characteristics corresponding to UUID 3, and VALUEs corresponding to the UUIDs Here, Service 2 is the above-described image transfer service, for example. The VALUEs of Service 2 include, for example, "image transfer capable/incapable flag". "SSID", "PASSWORD". "device name", "central connection flag", and "WLAN status". Service 3 is, for example, a print request service, which will be described later. The VALUEs of Service 3 include, for example, "print request flag", "SSID", "PASSWORD", "device name", "supported printing protocol 1", "supported printing protocol 2", "print status", "central connection flag", and "WLAN status".

The first central apparatus makes reads and writes in a region of Service 2, corresponding to the image transfer service, in the GATT server database of the DSC wireless communication unit A712, for example.

In S208, the DSC control unit A755 determines whether there is a connection termination notification from the first central apparatus to the DSC wireless communication unit A712. The DSC control unit A755 moves to S209 if there is a connection termination notification from the first central apparatus, and to S211 if there is no connection termination notification from the first central apparatus. In S209, the DSC control unit A755 terminates the BLE communication link with the first central apparatus, and moves to S210.

In S210, the DSC control unit A755 determines whether the "central connection flag" of the VALUEs of Service 2 is "communication unable" in the GATT server database of the DSC wireless communication unit A712. The VALUEs of Service 2 are VALUEs corresponding to the image transfer service. If the "central connection flag" of the first central apparatus is "communication unable", the DSC control unit A755 moves to S230. On the other hand, if the "central connection flag" is not "communication unable", the process returns to S201.

In S211, the DSC control unit A755 determines whether there is a service execution instruction from the first central apparatus to the DSC wireless communication unit A712. The service in S211 is an image transfer service that transfers image data captured by the DSC image capturing unit 710 of the image capturing apparatus 701, image data recorded into the flash memory inserted into the DSC memory card slot 709, and the like. If there is no service execution instruction from the first central apparatus to the DSC wireless communication unit A712, the DSC control unit A755 moves to S230. On the other hand, if there is a service execution instruction from the first central apparatus to the DSC wireless communication unit A712, the process moves to S214.

In the processes from S214 on, the image capturing apparatus 701 executes the service by making a handover to a high-speed WLAN. Specifically, in S214, the DSC control unit A755 terminates the BLE communication link with the apparatus to which the service is being provided, and moves to S215. Although the process of terminating the BLE communication link with the apparatus in S214 is carried out in a system that does not permit the simultaneous operation of WLAN and BLE, which will be described later, it should be noted that the process of S214 need not be carried out if the system permits the simultaneous operation of WLAN and BLE. In the present embodiment, the system is assumed to permit the simultaneous operation of WLAN and BLE, and thus the image capturing apparatus 701 skips the process of S214.

In S215, the DSC control unit A755 makes a handover to WLAN for the apparatus to which the service is being provided. Specifically, the DSC wireless communication unit B722 is used to establish a WLAN communication link with the apparatus to which the service is being provided, using an SSID, connection password information, or the like shared over the BLE communication with the DSC wireless communication unit A712. In S216, the DSC control unit A755 transmits the data to the apparatus to which the service is being provided, through the DSC wireless communication unit B722.

In S218, the DSC control unit A755 terminates the WLAN communication link with the apparatus to which the service is being provided, established in S215, and restores the BLE communication link with the apparatus to which the service is being provided in S219. Then, in S220, BLE communication is carried out with the apparatus to which the service is being provided. As described above, in the present embodiment, the image capturing apparatus 701 permits the simultaneous operation of WLAN and BLE, and thus the process of S219 is not necessary.

In S221, the DSC control unit A755 determines whether the service being executed has ended. If it is determined that the service being executed has not ended, the DSC control unit A755 returns to S220 and carries out BLE communication with the apparatus to which the service is being provided. Note that two types of services are present as services provided through a BLE communication link by the image capturing apparatus 701. These are the image transfer service, for the communication apparatus 801 serving as the first central apparatus, and a printing service for the printing apparatus 601 serving as the second central apparatus, provided through the print request service.

In S223, the DSC control unit A755 determines whether the service for the first central apparatus is being executed. If it is determined that the service for the first central apparatus is being provided, the DSC control unit A755 returns to S207. On the other hand, if it is determined that the service for the first central apparatus is not being provided, the DSC control unit A755 moves to S244.

The processes from S230 and on will be described next. This step is executed when there is no connection request from the first central apparatus in S205, when there is no service execution instruction from the first central apparatus in S211, or when the connection flag for the first central apparatus is "communication unable". In S230, the DSC control unit A755 determines whether a print request service execution mode has been activated by the user operating the DSC operation input unit 711. The DSC control unit A755 moves to S233 if the print request service execution mode has not been activated, and to S231 if the print request service execution mode has been activated.

In S233, the DSC control unit A755 determines whether it is the advertising interval of the first central apparatus. The process moves to S234 if it is not the advertising interval of the first central apparatus, and returns to S204 if it is an interval of BLE communication with the first central apparatus. In S234, the DSC control unit A755 determines whether it is an interval of BLE communication with the first central apparatus. If it is not an interval of BLE communication with the first central apparatus, the DSC control unit A755 returns to S230. If in S234 it is an interval of BLE communication with the first central apparatus, the image capturing apparatus 701 returns to S207.

In S231, the DSC control unit A755 determines whether the print request service execution mode has timed out. The mode is determined to have timed out if, for example, the user has not made any operations for a set amount of time after the print request service execution mode was activated by the user operating the DSC operation input unit 711. The DSC control unit A755 moves to S250 if it is determined that the print request service execution mode has timed out, and to S232 if it is determined that the print request service execution mode has not timed out.

In S232, the DSC control unit A755 sets the "central connection flag" of the VALUEs of Service 3 to "communication able" in the GATT server database of the DSC wireless communication unit A712, illustrated in FIG. 11B. Note that the VALUEs of Service 3 are VALUEs corresponding to the print request service. In other words, the DSC control unit A755 sets the image capturing apparatus 701 to be capable of connecting to a central role apparatus with respect to the print request service.

In S236, the DSC control unit A755 determines whether the "central connection flag" of the VALUEs of Service 2 is "communication unable" in the GATT server database of the DSC wireless communication unit A712. Note that the VALUEs of Service 2 are VALUEs corresponding to the image transfer service. If the "central connection flag", which corresponds to a connection flag for the first central apparatus, is "communication unable", the DSC control unit A755 moves to S241. On the other hand, if the "central connection flag", which corresponds to a connection flag for the first central apparatus, is not "communication unable", the process moves to S237. In S237, the DSC control unit A755 sets the "central connection flag" of the VALUEs of Service 2 to "communication unable" in the GATT server database of the DSC wireless communication unit A712, and then moves to S233.

In S241, the DSC control unit A755 transmits the third advertising packet from the DSC wireless communication unit A712. In other words, a process for connecting to the printing apparatus 601, which acts (or may be acting) as the second central apparatus, is started. Note that the image capturing apparatus 701 transmits the third advertising packet in S241 at predetermined time periods (advertising intervals). The transmitted advertising packet (the third advertising packet) includes a UUID 3, which specifies a Service that can be executed by the image capturing apparatus 701, in the data of the advertising packet, as illustrated in FIG. 9C. Various services can be considered as the Service specified by the UUID, and an example thereof will be given below. The example of the advertising packet illustrated in FIG. 9C indicates that a Service 3 can be executed using a UUID 3. The Service 3 is a print request service that requests that the second central apparatus print image data captured by the DSC image capturing unit 710 of the image capturing apparatus 701, image data recorded into the flash memory inserted into the DSC memory card slot 709, and the like.

Note that the third advertising packet transmitted by the image capturing apparatus 701 is scanned by the printing apparatus 601, which behaves as the second central apparatus between instances of the printing service. The second central apparatus makes a connection request to the image capturing apparatus 701 if the UUID specifying the service, included in the third advertising packet, is valid in combination with the self apparatus. FIG. 11B illustrates an example of a GATT server storing Services and Characteristics of the DSC wireless communication unit A712 of the image capturing apparatus 701. The BLE communication between the image capturing apparatus 701 and the second central apparatus is executed through reads and writes to the GATT server database illustrated in FIG. 11B. The image capturing apparatus 701 makes reads and writes in a region of Service 3, corresponding to the print request service, in the GATT server database of the DSC wireless communication unit A712.

In S242, the DSC control unit A755 determines whether there is a connection request from the second central apparatus to the DSC wireless communication unit A712. The DSC control unit A755 returns to S230 if there is no connection request from the second central apparatus, and to S243 if there is a connection request from the second central apparatus.

In S243, the DSC control unit A755 establishes a BLE communication link with the second central apparatus, and in S244, carries out BLE communication with the second central apparatus. Note that the BLE communication in S244 is carried out intermittently at communication intervals set with the second central apparatus.

Figure 10B:
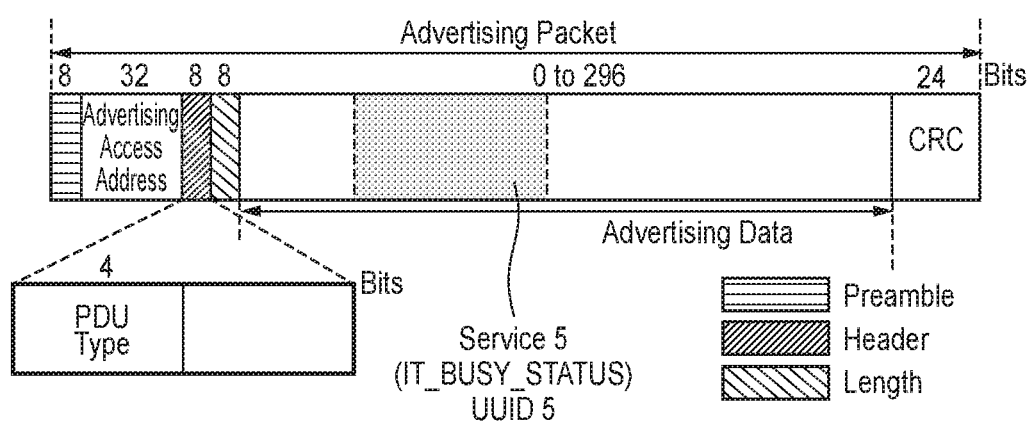

In S245, the DSC control unit A755 broadcasts a fifth advertising packet from the DSC wireless communication unit A712. Note that the fifth advertising packet is broadcast at predetermined time periods (advertising intervals) set by the image capturing apparatus 701. The transmitted broadcast advertising packet (the fifth advertising packet) includes a UUID 5, which specifies a Service of the image capturing apparatus 701, in the data of the advertising packet, as illustrated in FIG. 10B. Various services can be considered as the Service specified by the UUID, and an example thereof will be given below. The example of the broadcast advertising packet indicated in FIG. 10B is an example of an advertising packet that cannot make a connection request (indicating that a connection cannot be made to an external apparatus), and the UUID 5 indicates a state of Service 5. Service 5 is an image transfer busy status service, indicating that the image capturing apparatus 701 is in a busy state. To express a broadcast advertising packet that cannot make a connection request, in the fifth advertising packet illustrated in FIG. 10B, four bits [3:0] in the 8-bit "PDU Type" of the header are set to "0010". Note that the broadcast advertising packet transmitted by the image capturing apparatus 701, which is a peripheral role apparatus, is scanned by the first central apparatus (the communication apparatus 801), which is a central role apparatus. In the first central apparatus, the UUID specifying the service, included in the advertising packet transmitted by the image capturing apparatus 701, is valid in combination with the self apparatus. However, the image transfer busy status service, which indicates that the image capturing apparatus 701 is in a busy state, can be determined, and thus the first central apparatus does not make a BLE connection request to the image capturing apparatus 701. Thus by transmitting the broadcast advertising packet in S245, the central apparatus can be notified that the image transfer is a service having a busy status. The central apparatus can then control the self apparatus so as not to execute the image transfer service with the image capturing apparatus 701. Note that in the present embodiment, the image capturing apparatus 701 may or may not carry out the broadcast advertising packet transmission of S245.

In S246, the DSC control unit A755 determines whether there is a connection termination notification from the second central apparatus to the DSC wireless communication unit A712. The DSC control unit A755 moves to S250 if there is a connection termination notification from the second central apparatus, and to S247 if there is no connection termination notification from the second central apparatus. In S250, the DSC control unit A755 terminates the BLE communication link with the second central apparatus, and moves to S251.

In S251, the DSC control unit A755 sets the "central connection flag" of the VALUEs of Service 2 to "communication able" in the GATT server database of the DSC wireless communication unit A712, and then returns to S201. Note that the VALUEs of Service 2 are VALUEs corresponding to the image transfer service.

In S247, the DSC control unit A755 determines whether the execution of the print request service has been instructed through a user operating the DSC operation input unit 711. If the execution of the print request service has been instructed through a user operation, the process moves to S214 to make a handover to WLAN and execute the service. On the other hand, if the execution of the print request service has not been instructed through a user operation, the process moves to S248. In S248, the DSC control unit A755 determines whether the print request service execution mode is being continued through a user operation. The process returns to S244 if the print request service execution mode is being continued by the user. However, the process moves to S249 if the print request service execution mode is not being continued by the user.

In S249, the DSC control unit A755 sets the "central connection flag" of the VALUEs of Service 3, corresponding to the print request service, to "communication unable" in the GATT server database of the DSC wireless communication unit A712. The process then returns to S244. If the transmission of the advertising packet is then stopped in S202, the DSC control unit A755 ends the series of operations involved in this process.

Series of Operations in Connection Changing Process by Communication Apparatus

Figure 6B:
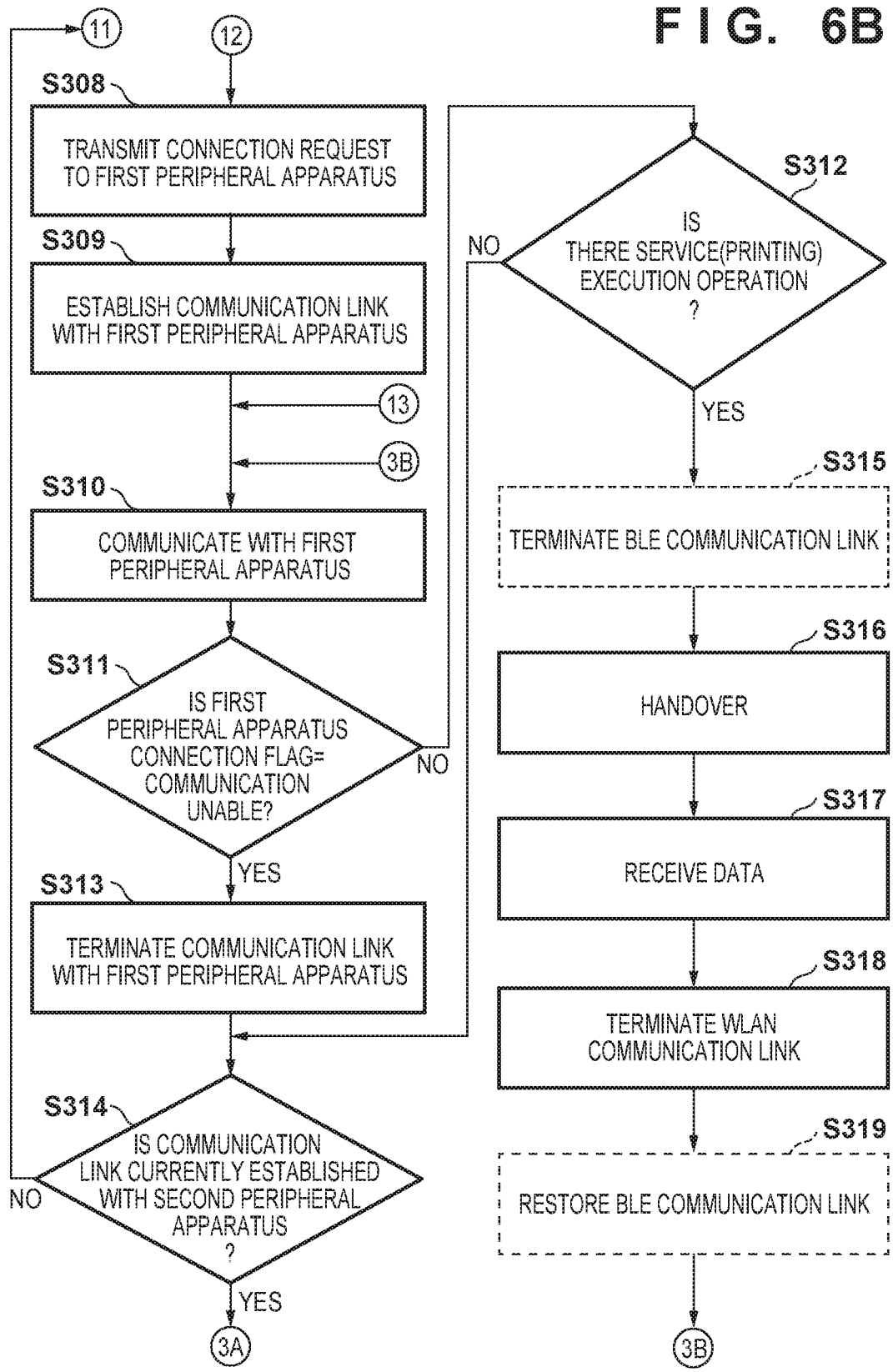
Figure 6C:
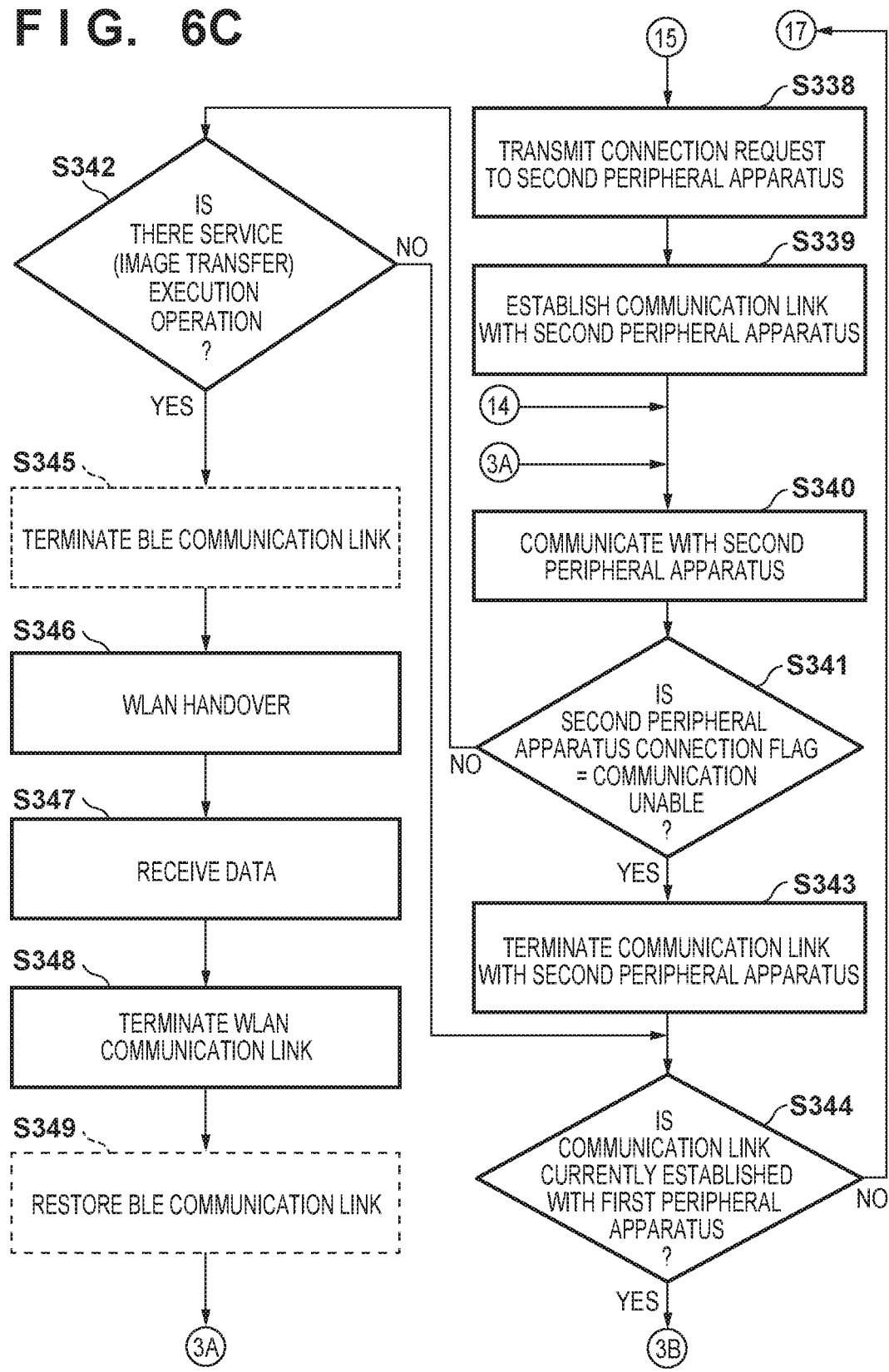
Figures 2, 7A:
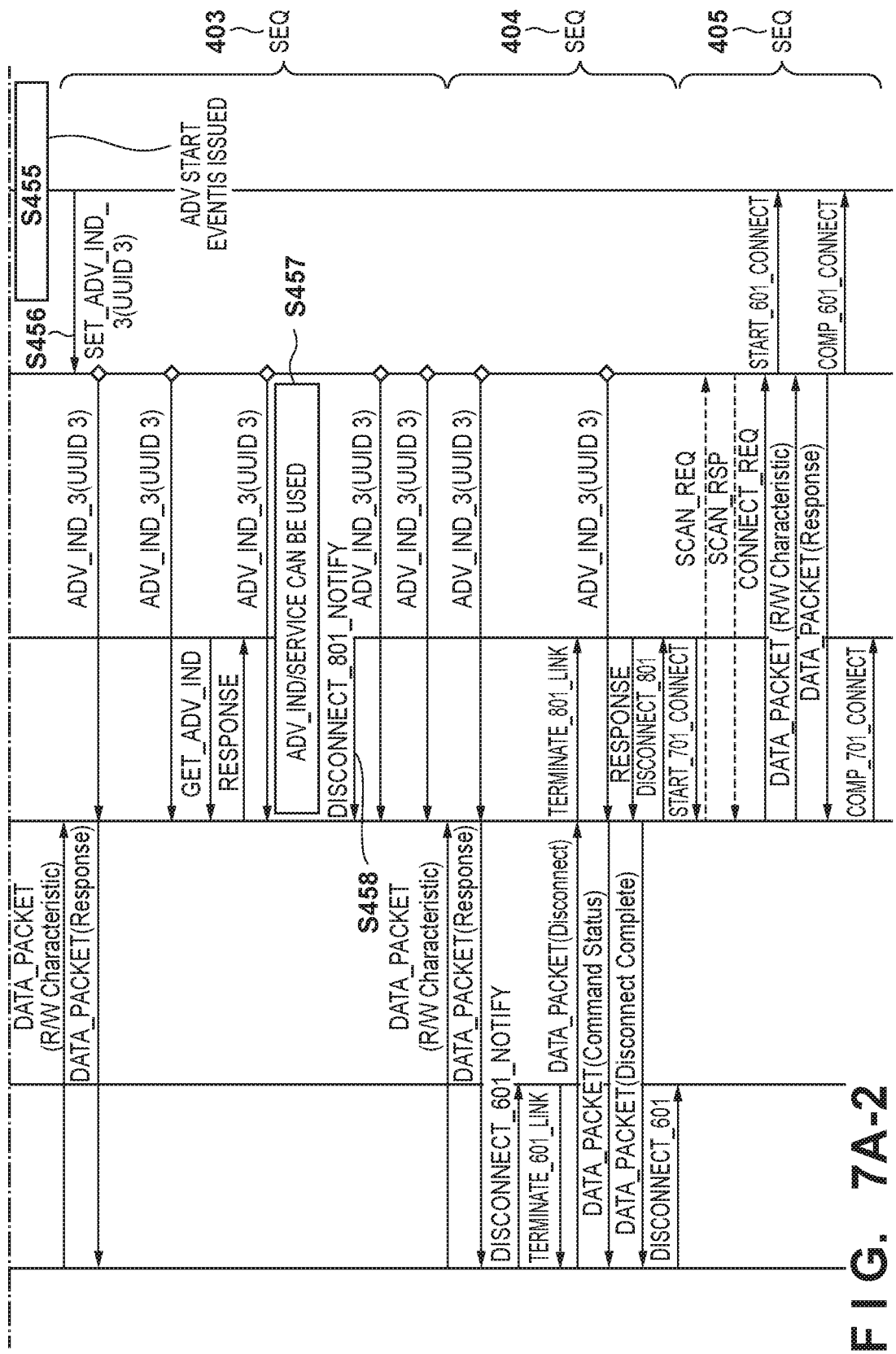

Next, operations in a connection changing process carried out by the communication apparatus 801, which is the first central apparatus, will be described with reference to FIGS. 6A to 6C. Note that unless otherwise specified, this process is realized by the OTH control unit A855 of the communication apparatus 801 loading programs stored in its internal ROM into its internal RAM and executing the programs. Additionally, the operations of this process are started in response to the OTH battery 802 being connected to the communication apparatus 801.

In S301, the OTH control unit A855 determines whether some of the functions of the communication apparatus 801 are normal. If the OTH control unit A855 determines that some of the functions are not normal, the process moves to S302. In S302, the scanning of the advertising packets is stopped, and the flowchart ends. On the other hand, if it is determined that some of the functions are normal, the process moves to S303. In S303, the OTH wireless communication unit A812 sets the role to the central role. The OTH control unit A855 operates as a BLE central role apparatus by setting the role of the OTH wireless communication unit A812 to the central role.

In S304, the OTH control unit A855 scans the advertising packets from other peripheral role apparatuses. In S305, the OTH control unit A855 returns to S304 if there are no advertising packets from other peripheral role apparatuses. On the other hand, if there is an advertising packet from another peripheral role apparatus, the OTH control unit A855 moves to S306.

In S306, the OTH control unit A855 determines whether the advertising packet from the other peripheral role apparatus is an advertising packet indicating that a connection is possible. The process returns to S304 if the advertising packet from the other peripheral role apparatus is not an advertising packet indicating that a connection is possible. On the other hand, the process moves to S307 if the advertising packet from the other peripheral role apparatus is an advertising packet indicating that a connection is possible.

In S307, the OTH control unit A855 determines whether there is data, in the advertising packet, matching the UUID 1, which indicates that Service 1 (a printing service that prints on a printing medium) can be executed. It is determined whether the UUID specifying the service, included in the advertising packet transmitted by the peripheral role apparatus, is valid in combination with the self apparatus. An advertising packet determined to be valid (the first advertising packet) includes the UUID 1, which specifies a printing service (Service) that can be executed by the printing apparatus 601 serving as the first peripheral apparatus. If there is no data matching the UUID 1 in the data of the advertising packet, the OTH control unit A855 moves to S330. If there is data matching the UUID 1 in the data of the advertising packet, the process moves to S308.

In S308, the OTH control unit A855 makes a connection request to the peripheral role apparatus that transmitted the first advertising packet. In S309, the OTH control unit A855 establishes a BLE communication link with the printing apparatus 601 serving as the first peripheral apparatus, and carries out BLE communication with the first peripheral apparatus in S310. Note that the BLE communication in S310 is carried out intermittently at communication intervals set with the first peripheral role apparatus.

In S311, the OTH control unit A855 determines whether the "central connection flag" of the VALUEs of Service 1 is "communication unable" in the GATT server database of the first peripheral apparatus. Note that the VALUEs of Service 1 are VALUEs corresponding to the printing service. If the "central connection flag", which corresponds to a connection flag of the printing apparatus 601 serving as the first peripheral apparatus, is "communication unable", the OTH control unit A855 moves to S313. On the other hand, if the "central connection flag", which corresponds to a connection flag of the printing apparatus 601 serving as the first peripheral apparatus, is not "communication unable", the OTH control unit A855 moves to S312. In S313, the OTH control unit A855 terminates the BLE communication link with the printing apparatus 601 serving as the first peripheral apparatus, and moves to S314.

In S312, the OTH control unit A855 determines whether the execution of the printing service has been instructed by the user operating the OTH operation input unit 811. If the execution of the printing service has been instructed through a user operation, the process moves to S315. On the other hand, if the execution of the printing service has not been instructed through a user operation, the process moves to S314. In S314, the OTH control unit A855 determines whether a BLE communication link is currently established with the second peripheral apparatus. If it is determined that a BLE communication link is currently established with the second peripheral apparatus, the process moves to S340, whereas if it is determined that a BLE communication link is not currently established with the second peripheral apparatus, the process returns to S301.

In S315, the OTH control unit A855 terminates the BLE communication link with the apparatus with which the BLE communication link is currently established, and moves to S316. Although the process of terminating the BLE communication link with the apparatus in S315 is carried out when the simultaneous operation of WLAN and BLE is not permitted, it should be noted that the process of S315 need not be carried out when the simultaneous operation of WLAN and BLE is permitted. Note that in the present embodiment, the system is assumed to permit the simultaneous operation of WLAN and BLE, and thus the communication apparatus 801 skips the process of S315.

In S316, the OTH control unit A855 carries out a WLAN handover with the apparatus to which the service is being provided. Specifically, the OTH wireless communication unit B822 is used to establish a WLAN communication link with the apparatus to which the service is being provided, using an SSID, connection password information, or the like shared over the BLE communication with the OTH wireless communication unit A812. In S317, the OTH control unit A855 transmits the data to the first peripheral apparatus through the OTH wireless communication unit B822. In S318, the OTH control unit A855 terminates the WLAN communication link with the first peripheral apparatus established in S316, and in S319, restores the BLE communication link with the apparatus terminated in S315 and returns to S310. In the present embodiment, it is assumed that the simultaneous operation of WLAN and BLE is permitted, and thus the OTH control unit A855 skips the process of S319.

On the other hand, in S330, the OTH control unit A855 determines whether a BLE communication link is currently established with the first peripheral apparatus. If it is determined that a BLE communication link is currently established with the first peripheral apparatus, the process moves to S310, whereas if it is determined that a BLE communication link is not currently established with the first peripheral apparatus, the process moves to S331. In S331, the OTH control unit A855 determines whether a BLE communication link is currently established with the second peripheral apparatus. The OTH control unit A855 moves the process to S340 if it is determined in S331 that a BLE communication link is currently established with the second peripheral apparatus, and moves the process to S332 if it is determined that a BLE communication link is not currently established with the second peripheral apparatus.

In S332, the OTH control unit A855 determines whether the UUID specifying the service, included in the advertising packet transmitted by the peripheral apparatus, is valid in combination with the self apparatus. The advertising packet determined to be valid by the communication apparatus 801 is the above-described second advertising packet, and includes the UUID 2 specifying the image transfer service. The OTH control unit A855 returns to S304 if there is no data matching the UUID 2 in the data of the advertising packet, and moves to S338 if there is data matching the UUID 2 in the data of the advertising packet.

In S338, the OTH control unit A855 makes a connection request to the second peripheral apparatus that transmitted the second advertising packet (i.e., the image capturing apparatus 701). Then, in S339, a BLE communication link is established with the image capturing apparatus 701 serving as the second peripheral apparatus, and in S340, BLE communication is carried out with the second peripheral apparatus. Note that the BLE communication in S340 is carried out intermittently at communication intervals set with the second peripheral apparatus.

In S341, the OTH control unit A855 determines whether the "central connection flag" of the VALUEs of Service 2 is "communication unable" in the GATT server database of the second peripheral apparatus that carried out communication in S340. If the "central connection flag", which corresponds to a connection flag of the second peripheral apparatus, is "communication unable", the OTH control unit A855 moves to S343. On the other hand, if the "central connection flag", which corresponds to a connection flag for the second peripheral apparatus, is not "communication unable", the process moves to S342. In S343, the OTH control unit A855 terminates the BLE communication link with the printing apparatus 601 serving as the first peripheral apparatus, and moves to S344.

In S342, the OTH control unit A855 determines whether the execution of the image transfer service has been instructed by the user operating the OTH operation input unit 811. If in S342 the execution of the image transfer service has been instructed through a user operation, the process moves to S345, whereas if the execution of the image transfer service has not been instructed through a user operation, the process moves to S344. In S344, the OTH control unit A855 determines whether a BLE communication link is currently established with the first peripheral apparatus. If it is determined that a BLE communication link is currently established with the first peripheral apparatus, the process moves to S310, whereas if it is determined that a BLE communication link is not currently established with the first peripheral apparatus, the process returns to S301.

In S345, the OTH control unit A855 terminates the BLE communication link with the apparatus with which the BLE communication link is currently established, and moves to S346. Although the process of terminating the BLE communication link with the apparatus in S345 is carried out when the simultaneous operation of WLAN and BLE is not permitted, it should be noted that the process of S345 need not be carried out when the system permits the simultaneous operation of WLAN and BLE. As described above, in the present embodiment, the system is assumed to permit the simultaneous operation of WLAN and BLE, and thus the communication apparatus 801 skips the process of S345.

In S346, the OTH control unit A855 carries out a WLAN handover with the apparatus to which the service is being provided. As described above, the OTH wireless communication unit B822 is used to establish a WLAN communication link with the apparatus to which the service is being provided, using an SSID, connection password information, or the like shared over the BLE communication with the OTH wireless communication unit A812. In S347, the OTH control unit A855 receives the data from the second peripheral apparatus through the OTH wireless communication unit B822. Furthermore, in S348, the OTH control unit A855 terminates the WLAN communication link with the second peripheral apparatus established in S346, restores the BLE communication link again in S349, and returns to S340. However, because the simultaneous operation of WLAN and BLE is permitted, the communication apparatus 801 can skip the process of S349 in the present embodiment. When the OTH control unit A855 then executes the process of S302, the series of operations ends.

Sequence in which Printing Apparatus and Image Capturing Apparatus Connect

Figure 12A:
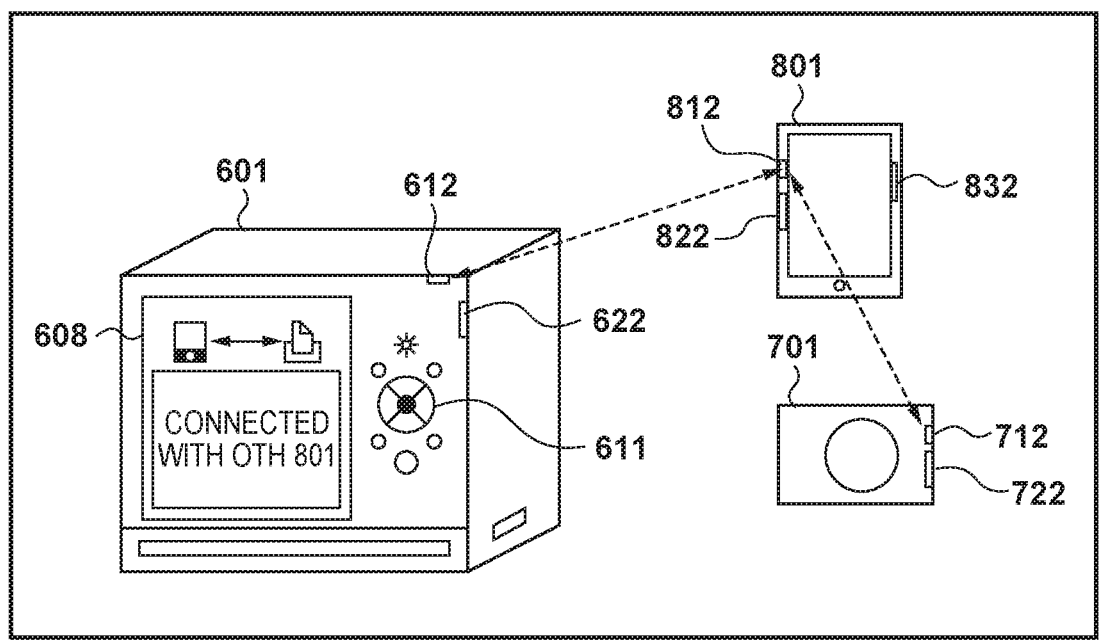
FIGS. 12A, 12B, 12C, and 12D are diagrams illustrating an example of the arrangement of the printing apparatus, the image capturing apparatus, and the communication apparatus according to the first embodiment.

Next, a sequence through which the printing apparatus 601 and the image capturing apparatus 701 establish a wireless communication connection, when the printing apparatus 601, the image capturing apparatus 701, and the communication apparatus 801 carry out the connection changing process illustrated in FIGS. 4A to 6C, will be described with reference to FIGS. 7A-1 to 7B-3. In the following descriptions of the sequence, an example of the arrangements and connection circumstances of the printing apparatus 601, the image capturing apparatus 701, and the communication apparatus 801 will be described with reference to FIGS. 12A and 12B. Additionally, a typical BLE communication sequence will be omitted from the following descriptions of the sequence. At the start of the sequence, the communication apparatus 801 is operating as a central role apparatus, and the printing apparatus 601 and the image capturing apparatus 701 are operating as peripheral role apparatuses. Additionally, the sequence is started from a state where BLE connections are established between the communication apparatus 801 and the printing apparatus 601, and between the communication apparatus 801 and the image capturing apparatus 701. As illustrated in FIG. 12A, these three apparatuses are within a BLE communication range at the start of the sequence.

In SEQ 401, the OTH wireless communication unit A812 transmits a DATA_PACKET (R/W Characteristic) to the PTR wireless communication unit A612, and receives a DATA_PACKET (Response). The PTR control unit A655 scans the advertising packet with a GET_ADV_IND command using the PTR wireless communication unit A612, and the PTR wireless communication unit A612 returns a result of the scan to the PTR control unit A655 as a RESPONSE.

In S451, the PTR control unit A655 acquires the values of the advertising packet, confirms the content, and determines whether the service can be used. Specifically, it is confirmed whether the advertising packet can be received, or that the UUID 3 corresponding to the print request service is not included in the advertising packet. Thereafter the PTR control unit A655 scans the advertising packet during the communication interval (like the central role apparatus), and waits for an advertising packet, including the UUID corresponding to a service that is valid in combination with the self apparatus, to be received. On the other hand, the OTH wireless communication unit A812 transmits a DATA_PACKET to the DSC wireless communication unit A712, and receives a DATA_PACKET as a response thereto.

In S452, the DSC control unit A755 enters the print request service execution mode in response to a user operation. In S453, the DSC control unit A755 transmits a DISCONNECT_801_NOTIFY command to the DSC wireless communication unit A712. In response to the command in S453, the "central connection flag" of the VALUEs of Service 2, which corresponds to the image transfer service, is set to "communication unable" in the GATT server database of the DSC wireless communication unit A712. Then, the "central connection flag", which is a connection flag for the communication apparatus 801 and the image capturing apparatus 701, is communicated to the communication apparatus 801 at the timing of the next BLE communication between the communication apparatus 801 and the image capturing apparatus 701. Additionally, in S454, the PTR control unit A655 acquires and confirms the values in the advertising packet. Specifically, it is confirmed whether the advertising packet can be received, or that the UUID 3 corresponding to the print request service of the image capturing apparatus 701 is not included in the advertising packet. In other words, it is determined whether the service can be used.

In SEQ 402, the OTH wireless communication unit A812 transmits a DATA_PACKET to the DSC wireless communication unit A712, and receives a DATA_PACKET as a response thereto. The OTH wireless communication unit A812 transmits a DISCONNECT_701_NOTIFY command to the OTH control unit A855. The OTH control unit A855 then confirms that the "central connection flag" of the VALUEs of Service 2, which corresponds to the image transfer service, is "communication unable" in the received DATA_PACKET. On the basis of the connection flag, the OTH control unit A855 sends a TERMINATE_701_LINK command to the OTH wireless communication unit A812, which terminates the BLE communication link between the OTH wireless communication unit A812 and the DSC wireless communication unit A712. Then, the OTH wireless communication unit A812 notifies the OTH control unit A855 of the termination of the BLE communication link with a DISCONNECT_701 command. Furthermore, the DSC wireless communication unit A712 notifies the DSC control unit A755 of the termination of the BLE communication link with a DISCONNECT_801 command.

In SEQ 403, the DSC control unit A755 issues an advertisement start event, including the UUID 3 of Service 3 corresponding to the print request service, in S455. In S456, the DSC control unit A755 transmits a SET_ADV_IND_3 command to the DSC wireless communication unit A712. Then, the DSC wireless communication unit A712 transmits an advertising packet ADV_IND_3, including the UUID 3 of Service 3 corresponding to the print request service, to the printing apparatus 601. Thereafter, the advertisement to the central role apparatus is repeated in accordance with the advertising interval. At this time, the PTR control unit A655 scans the advertising packet with a GET_ADV_IND command using the PTR wireless communication unit A612, and acquires the result of the scan as a RESPONSE from the PTR wireless communication unit A612. In S457, the PTR control unit A655 acquires the values of the advertising packet, and confirms that the UUID 3 corresponding to the print request service of the image capturing apparatus 701 is included in that advertising packet. When it is confirmed that the UUID 3 is included, it is determined that the service can be used. Furthermore, in S458, upon confirming that the desired service can be used, the PTR control unit A655 transmits the DISCONNECT_801_NOTIFY command to the PTR wireless communication unit A612. In response to the command in S453, the "central connection flag" of the VALUEs of Service 1, which corresponds to the printing service, is set to "communication unable" in the GATT server database of the PTR wireless communication unit A612. The "central connection flag", which is a connection flag for the communication apparatus 801 and the printing apparatus 601, is communicated to the communication apparatus 801 at the timing of the next BLE communication between the communication apparatus 801 and the printing apparatus 601.

In SEQ 404, the OTH wireless communication unit A812 transmits a DATA_PACKET to the PTR wireless communication unit A612, and receives a DATA_PACKET as a response thereto. The OTH wireless communication unit A812 transmits a DISCONNECT_601_NOTIFY command to the OTH control unit A855. The OTH control unit A855 then confirms that the "central connection flag" of the VALUEs of Service 1, which corresponds to the image transfer service, is "communication unable" in the received DATA_PACKET.

On the basis of the connection flag, the OTH control unit A855 sends a TERMINATE_601_LINK command to the OTH wireless communication unit A812, which terminates the BLE communication link between the communication apparatus 801 and the printing apparatus 601. Then, the OTH wireless communication unit A812 notifies the OTH control unit A855 of the termination of the BLE communication link with a DISCONNECT_601 command. The PTR wireless communication unit A612 notifies the PTR control unit A655 of the termination of the BLE communication link with the DISCONNECT_801 command.

In SEQ 405, when the PTR control unit A655 transmits a START_701_CONNECT command to the PTR wireless communication unit A612, a BLE communication link is established between the printing apparatus 601 and the image capturing apparatus 701. The PTR wireless communication unit A612 notifies the PTR control unit A655 of the establishment of the BLE communication link with a COMP_701_CONNECT command. The DSC wireless communication unit A712 notifies the DSC control unit A755 of the establishment of the BLE communication link with a COMP_601_CONNECT command. Then, the PTR wireless communication unit A612 transmits a DATA_PACKET to the DSC wireless communication unit A712 of the image capturing apparatus 701, and receives a DATA_PACKET as a response thereto. Thereafter, the printing apparatus 601 operates as a central role apparatus and the image capturing apparatus 701 operates as a peripheral apparatus, and the apparatuses carry out BLE communication according to the communication interval.

Figure 12B:
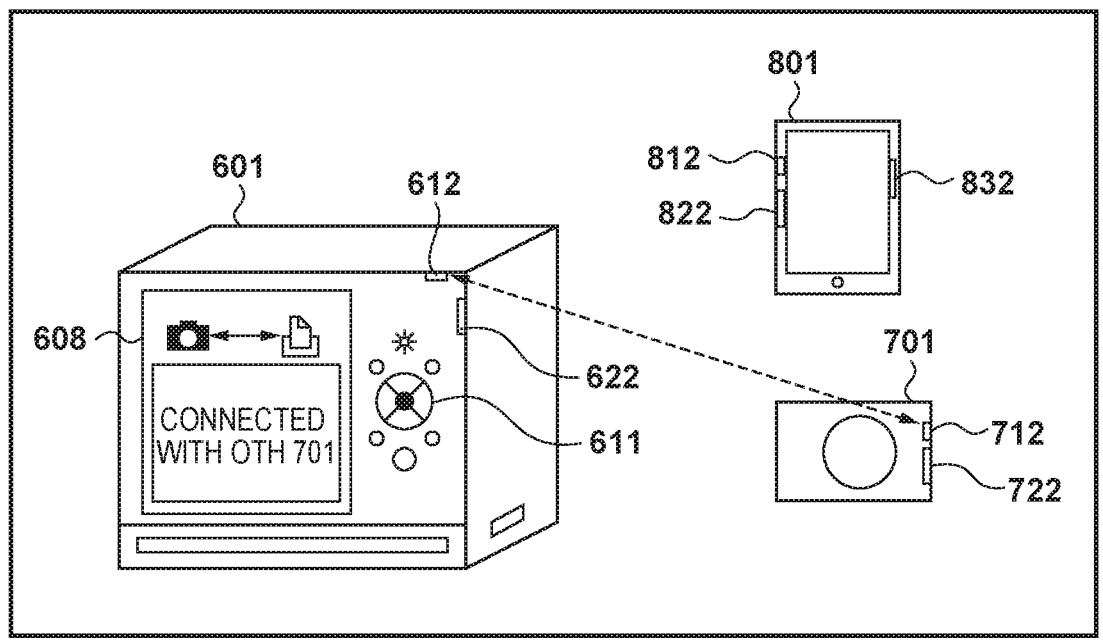

When the sequence up to SEQ 405 ends, the printing apparatus 601 has a currently-established BLE communication link with the image capturing apparatus 701, as illustrated in FIG. 12B (the three apparatuses being present in the BLE communication range has not changed from FIG. 12A). This is a state in which the communication apparatus 801 has terminated the BLE communication links with the printing apparatus 601 and the image capturing apparatus 701.

Next, in SEQ 406, the DSC control unit A755 accepts an instruction to execute the print request service through a user operation in S459. In S460, the DSC control unit A755 transmits an EXE_PRINT_NOTIFY command to the DSC wireless communication unit A712. In response to the command in S460, the "print request flag" of the VALUEs of Service 3, which corresponds to the print request service, is set to "YES" in the GATT server database of the DSC wireless communication unit A712. The "print request flag", which is a flag for instructing the printing service to be executed, is communicated to the printing apparatus 601 at the timing of the next BLE communication between the printing apparatus 601 and the image capturing apparatus 701.

Note that the printing apparatus 601, which has terminated the BLE link with the communication apparatus 801, may transmit a broadcast advertising packet ADV_NONCONN_IND_4, including the UUID 4 of Service 4, indicating that the printing service is in a busy state. Additionally, the image capturing apparatus 701, which has terminated the BLE link with the communication apparatus 801, may transmit a broadcast advertising packet ADV_NONCONN_IND_5, including the above-described UUID 5 of Service 5. Note that these broadcast advertising packets are advertising packets indicating that a connection request cannot be made, and thus the central role apparatus cannot make a connection request. Accordingly, when the broadcast advertising packets are to be transmitted, the printing apparatus 601 or the image capturing apparatus 701 transmits the broadcast advertising packets in accordance with the advertising interval.

In the section of SEQ 421 (on the left in FIGS. 7B-1 and 7B-2), the OTH control unit A855 scans the advertising packets in response to the GET_ADV_IND command using the OTH wireless communication unit A812. The result of the scan is returned as a RESPONSE to the OTH control unit A855. The OTH control unit A855 acquires the values of the advertising packet in response to the command. Then, it is confirmed whether the advertising packet can be received, or that the UUID 1 corresponding to the printing service of the printing apparatus 601, the UUID 2 corresponding to the image transfer service of the image capturing apparatus 701, or the like is not included in the advertising packet. Thereafter, the communication apparatus 801 scans the advertising packets in accordance with a scanning interval, and waits for an advertising packet, including the UUID corresponding to a service that is valid in combination with the self apparatus, to be received. When the values of the above-described broadcast advertising packet have been acquired, the communication apparatus 801 can determine that the printing apparatus 601 or the image capturing apparatus 701 is in a busy state. Accordingly, the self apparatus can be controlled so as not to make a connection request to the printing apparatus 601 or the image capturing apparatus 701.

In SEQ 407, the PTR wireless communication unit A612 confirms that the "print request flag" of the VALUEs of Service 3 is "YES" in the DATA_PACKET received in the sequence of SEQ 406. In S461, the PTR wireless communication unit A612 transmits the EXE_PRINT_NOTIFY command, for executing the print, to the PTR control unit A655. In S462, the PTR control unit A655 turns the PTR constant voltage circuit B604 on by issuing a main system power on event, and turns on (starts up) the PTR control unit B605, which is the main system. When, in S463, the PTR control unit B605 issues a WLAN startup event and turns the PTR wireless communication unit B622 on, the establishment of a WLAN communication link with the apparatus to which the printing service is being provided is started. The PTR wireless communication unit A612 transmits a DATA_PACKET to the DSC wireless communication unit A712, and receives a DATA_PACKET as a response thereto. As a result, the "WLAN status" of the VALUEs of Service 3, which corresponds to the print request service, is set to "START_WLAN" (WLAN start). In S464, the DSC wireless communication unit A712 transmits a START_WLAN_HANDOVER command to the DSC control unit A755. Upon doing so, the DSC control unit A755 confirms that the "WLAN status" in the VALUEs of Service 3 is "START_WLAN" (WLAN start).

In SEQ 408, the DSC control unit A755 issues the WLAN startup event, turns the DSC wireless communication unit B722 on, and starts the establishment of a WLAN communication link with the apparatus to which the print request service is being provided, in S465. Here, when the WLAN communication link is established between the PTR wireless communication unit B622 and the DSC wireless communication unit B722, data can be exchanged over the WLAN. The image capturing apparatus 701 transmits print target image data through the DSC wireless communication unit B722, and the printing apparatus 601 receives that data through the PTR wireless communication unit B622. In S466, if the exchange of the print target image data has ended, the DSC control unit A755 issues a WLAN end event. The WLAN communication link between the DSC wireless communication unit B722 and the PTR wireless communication unit B622 is terminated, and the DSC wireless communication unit B722 is turned off. In S467, the DSC control unit A755 transmits a DISCONNECT_WLAN command to the DSC wireless communication unit A712. In response to the command in S467, the "WLAN status" of the VALUEs of Service 3 is set to "DISCONNECT_WLAN" in the GATT server database of the DSC wireless communication unit A712. The PTR wireless communication unit A612 transmits a DATA_PACKET to the DSC wireless communication unit A712, and receives a DATA_PACKET as a response thereto. Furthermore, in S468, the PTR wireless communication unit A612 of the printing apparatus 601 transmits the DISCONNECT_WLAN command to the PTR control unit A655. The PTR control unit A655 then confirms that the "WLAN status" of the VALUEs of Service 3, which corresponds to the print request service, is "DISCONNECT_WLAN" (WLAN end) in the received DATA_PACKET. In S469, the PTR control unit B605 issues a WLAN end event and turns the PTR wireless communication unit B622 off.

In SEQ 409, if the exchange of the print target image data has ended in the sequence of SEQ 408, the PTR wireless communication unit A612 transmits a DATA_PACKET to the DSC wireless communication unit A712, and receives a DATA_PACKET as a response thereto. If, in the GATT server database of the DSC wireless communication unit A712, the "print status" of the VALUEs of Service 3, which corresponds to the print request service, indicates that the printing apparatus 601 is printing, the status is set to "printing". If the printing has ended, the "print status" is set to "printing complete".

In SEQ 410, the DSC control unit A755 ends the print request service execution mode in response to a user operation in S470. Then, in S471, the DSC control unit A755 transmits the DISCONNECT_601_NOTIFY command to the DSC wireless communication unit A712. In response to the command in S471, the "central connection flag" of the VALUEs of Service 3, which corresponds to the image transfer service, is set to "communication unable" in the GATT server database of the DSC wireless communication unit A712.

In SEQ 411, the PTR wireless communication unit A612 transmits a DATA_PACKET to the DSC wireless communication unit A712, and receives a DATA_PACKET as a response thereto. The PTR wireless communication unit A612 transmits the DISCONNECT_701_NOTIFY command to the PTR control unit A655. The PTR control unit A655 then confirms that the "central connection flag" of the VALUEs of Service 3, which corresponds to the print request service, is "communication unable" in the received DATA_PACKET. On the basis of the connection flag, the PTR control unit A655 transmits the TERMINATE_701_LINK command to the PTR wireless communication unit A612, which terminates the BLE communication link between the printing apparatus 601 and the image capturing apparatus 701. The PTR wireless communication unit A612 notifies the PTR control unit A655 of the termination of the BLE communication link with the DISCONNECT_701 command. The DSC wireless communication unit A712 notifies the DSC control unit A755 of the termination of the BLE communication link with a DISCONNECT_601 command.

In SEQ 412, in S472, the PTR control unit A655 turns the PTR constant voltage circuit B604 off by issuing a main system power off event, and turns off the PTR control unit B605, which is the main system. In S473, the PTR control unit A655 issues an advertisement restoration event, including the UUID 1 of Service 1 corresponding to the printing service. In S474, the PTR control unit A655 transmits a SET_ADV_IND_1 command to the PTR wireless communication unit A612. The PTR wireless communication unit A612 transmits an advertising packet ADV_IND_1, including the UUID 1 of Service 1 corresponding to the printing service, and carries out advertisements to the central role apparatus thereafter in accordance with the advertising interval. In S475, the DSC control unit A755 issues an advertisement start event including the UUID 2 of Service 2 corresponding to the image transfer service. Then, in S476, the DSC control unit A755 transmits a SET_ADV_IND_2 command to the DSC wireless communication unit A712. The DSC wireless communication unit A712 transmits an advertising packet ADV_IND_2 including the UUID 2 of Service 2 corresponding to the image transfer service. Thereafter, the advertisement to the central role apparatus is carried out in accordance with the advertising interval.

In SEQ 413, the PTR control unit A655 acquires the values of the received advertising packet in S477. Then, it is confirmed whether the advertising packet can be received, or that the UUID 3 corresponding to the print request service of the image capturing apparatus 701 is not included in the advertising packet. In S478, it is confirmed that the advertising packet does not include the UUID 3 corresponding to the print request service of the image capturing apparatus 701, as in S477.

Thereafter, the printing apparatus 601 scans the advertising packets during the advertising interval, and waits for an advertising packet, including the UUID corresponding to a service that is valid in combination with the self apparatus, to be received.

Figure 8A:
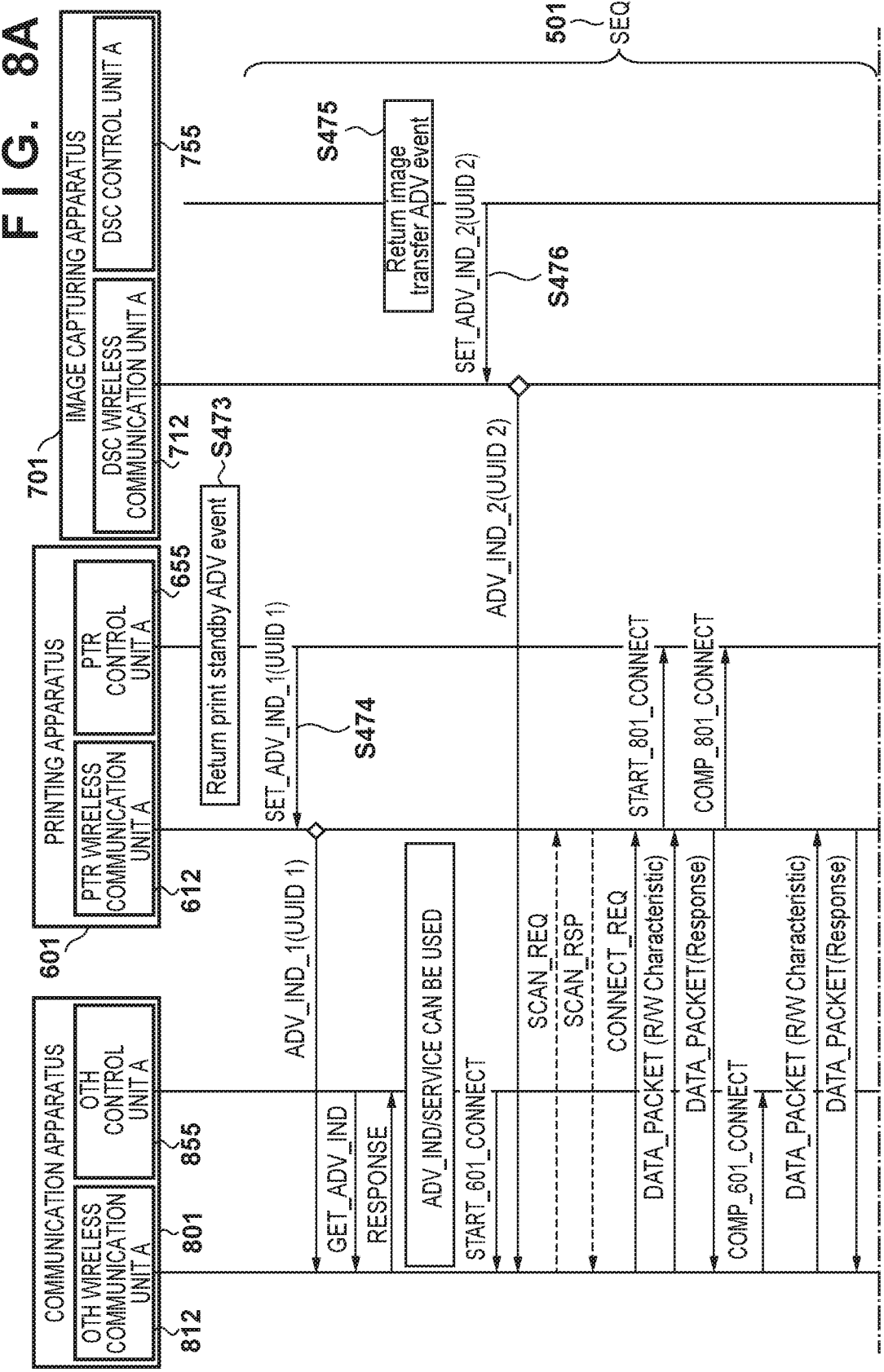
Figure 8B:
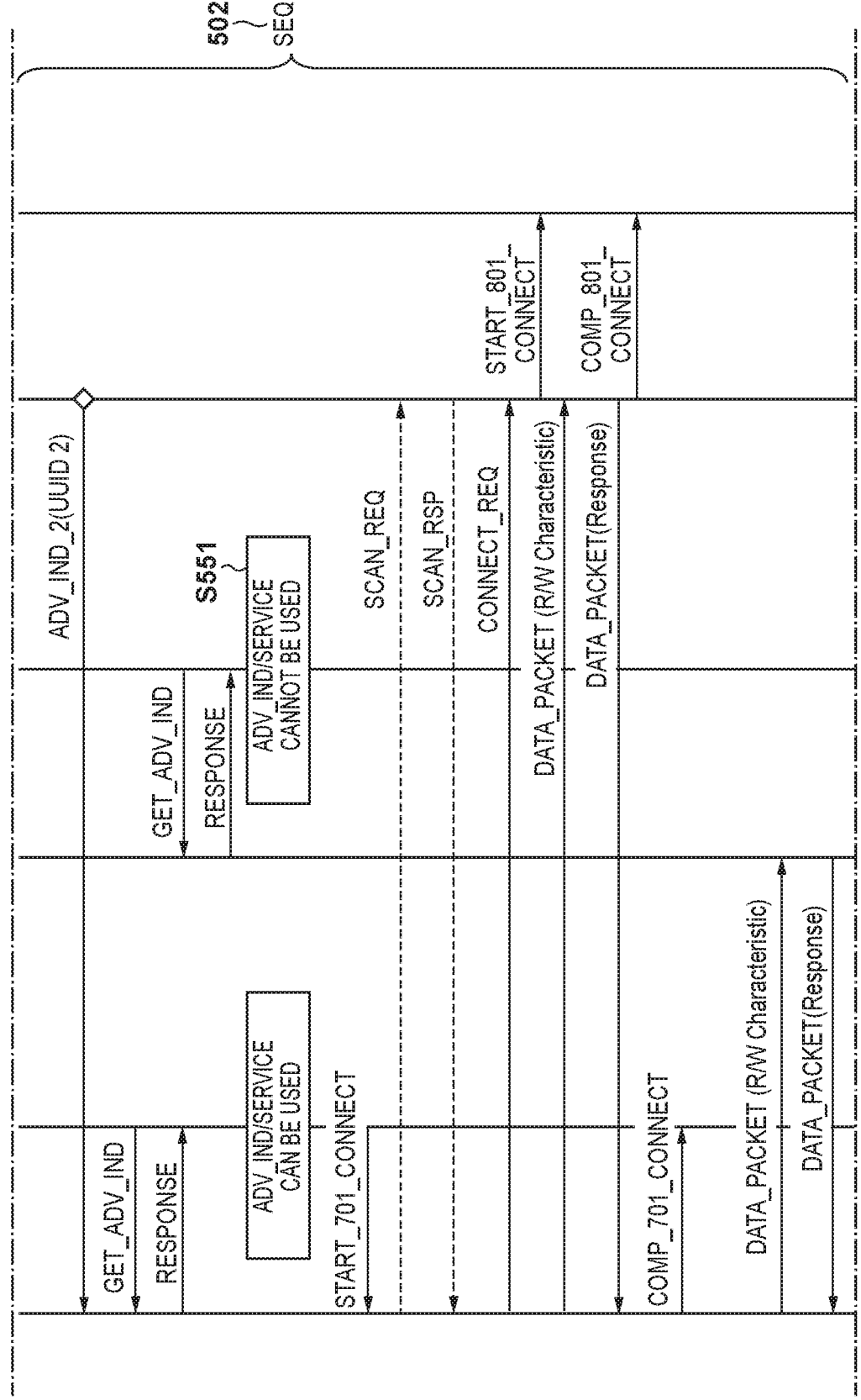

Sequence in which Image Capturing Apparatus and Printing Apparatus Connect to Communication Apparatus Next, a sequence in which the printing apparatus 601 and the image capturing apparatus 701 establish BLE communication links with the communication apparatus 801, which serves as a BLE central role apparatus, will be described with reference to FIGS. 8A to 8C.

In SEQ 501, the PTR wireless communication unit A612 transmits the advertising packet ADV_IND_1, including the UUID 1 of Service 1 corresponding to the printing service, in accordance with the advertising interval, in S473 and S474. On the other hand, in S475 and S476, the DSC wireless communication unit A712 transmits the advertising packet ADV_IND_2, including the UUID 2 of Service 2 corresponding to the image transfer service, in accordance with the advertising interval. The OTH control unit A855 scans the advertising packets in response to the GET_ADV_IND command using the OTH wireless communication unit A812. The OTH wireless communication unit A812 returns the result of the scan as a RESPONSE to the OTH control unit A855. Additionally, the OTH control unit A855 acquires the values of the advertising packet, and confirms that the UUID 1 corresponding to the printing service of the printing apparatus 601 is included in the advertising packet. The OTH control unit A855 sends a START_601_CONNECT command to the OTH wireless communication unit A812, and starts the establishment of a BLE communication link between the communication apparatus 801 and the printing apparatus 601. When the communication link is established, the OTH wireless communication unit A812 notifies the OTH control unit A855 of the establishment of the BLE communication link with the COMP_601_CONNECT command. The PTR wireless communication unit A612 notifies the PTR control unit A655 of the establishment of the BLE communication link with a COMP_801_CONNECT command. Then, the OTH wireless communication unit A812 transmits a DATA_PACKET to the PTR wireless communication unit A612, and receives a DATA_PACKET as a response thereto. Thereafter, the BLE communication link is continued in accordance with the communication interval, with the communication apparatus 801 serving as the central role apparatus and the printing apparatus 601 serving as a peripheral role apparatus.

In SEQ 502, the OTH control unit A855 scans the advertising packets in response to the GET_ADV_IND command using the OTH wireless communication unit A812. Then, the OTH wireless communication unit A812 returns the result of the scan as a RESPONSE to the OTH control unit A855. The OTH control unit A855 acquires the values of the advertising packet, and confirms that the UUID 2 corresponding to the image transfer service of the image capturing apparatus 701 is included in the advertising packet. When it is confirmed that the UUID 2 is included, it is determined that the service can be used. The OTH control unit A855 sends the START_701_CONNECT command to the OTH wireless communication unit A812, and establishes a BLE communication link between the communication apparatus 801 and the image capturing apparatus 701. The OTH wireless communication unit A812 then notifies the OTH control unit A855 of the establishment of the BLE communication link with the COMP_701_CONNECT command. The DSC wireless communication unit A712 notifies the DSC control unit A755 of the establishment of the BLE communication link with a COMP_801_CONNECT command. The OTH wireless communication unit A812 transmits a DATA_PACKET to the DSC wireless communication unit A712, and receives a DATA_PACKET as a response thereto. Note that the BLE communication is carried out in accordance with the communication interval, with the communication apparatus 801 operating as the central role apparatus and the image capturing apparatus 701 operating as a peripheral role apparatus.

In S551, the PTR control unit A655 acquires the values of the advertising packet, and confirms whether the advertising packet can be received, or that the UUID 3 corresponding to the print request service of the image capturing apparatus 701 is not included in the advertising packet. Thereafter, the printing apparatus 601 scans the advertising packets during the interval of BLE communication, and waits for an advertising packet, including the UUID corresponding to a service that is valid in combination with the self apparatus, to be received.

In SEQ 503, the OTH wireless communication unit A812 transmits a DATA_PACKET to the PTR wireless communication unit A612, and receives a DATA_PACKET as a response thereto. The PTR control unit A655 scans the advertising packet in response to the GET_ADV_IND command using the PTR wireless communication unit A612, and returns the result of the scan as a RESPONSE to the PTR control unit A655. In S552, the PTR control unit A655 acquires the values of the advertising packet, and confirms whether the advertising packet can be received, or that the UUID 3 corresponding to the print request service of the image capturing apparatus 701 is not included in the advertising packet. Then, the OTH wireless communication unit A812 transmits a DATA_PACKET to the DSC wireless communication unit A712, and receives a DATA_PACKET as a response thereto. The sequence ends thereafter. When the sequence of FIGS. 8A to 8C is executed, BLE communication is established between the communication apparatus 801 and the printing apparatus 601, and between the communication apparatus 801 and the image capturing apparatus 701, and the sequence can therefore return to the sequence indicated in FIG. 7A-1.

As described thus far, according to the present embodiment, even if the printing apparatus 601 is currently connected, as a peripheral, to the communication apparatus 801 through BLE, the printing apparatus 601 can behave as a central role apparatus in between times when connection is in effect (e.g., when the printing service is not being executed). As a result, BLE communication can be established between the printing apparatus 601 and the image capturing apparatus 701, which were operating as peripheral apparatuses, and thus the desired service can be executed. In other words, in communication in which apparatuses having different roles are connected, an apparatus can easily connect to another apparatus operating in the same role as the self apparatus.

Second Embodiment

The first embodiment describes an example of operations for establishing BLE communication between the printing apparatus 601 and the image capturing apparatus 701, which both play the role of peripheral, while the printing apparatus 601 and the image capturing apparatus 701 are carrying out BLE communication with the central role apparatus. The second embodiment will describe an example of operations in which BLE communication is established between the printing apparatus 601 and the image capturing apparatus 701, which play the role of peripheral, from a state in which the printing apparatus 601 and the image capturing apparatus 701 are transmitting advertising packets and BLE communication is not yet established between the printing apparatus 601 and the image capturing apparatus 701. Note that the examples of the functional configurations of the apparatuses according to the present embodiment are the same, but parts of the sequences differ. As such, in the following, identical configurations and identical steps will be assigned the same reference signs and redundant descriptions will be skipped, with attention focused on the differences.

Sequence in which Printing Apparatus and Image Capturing Apparatus Connect

Figure 12C:
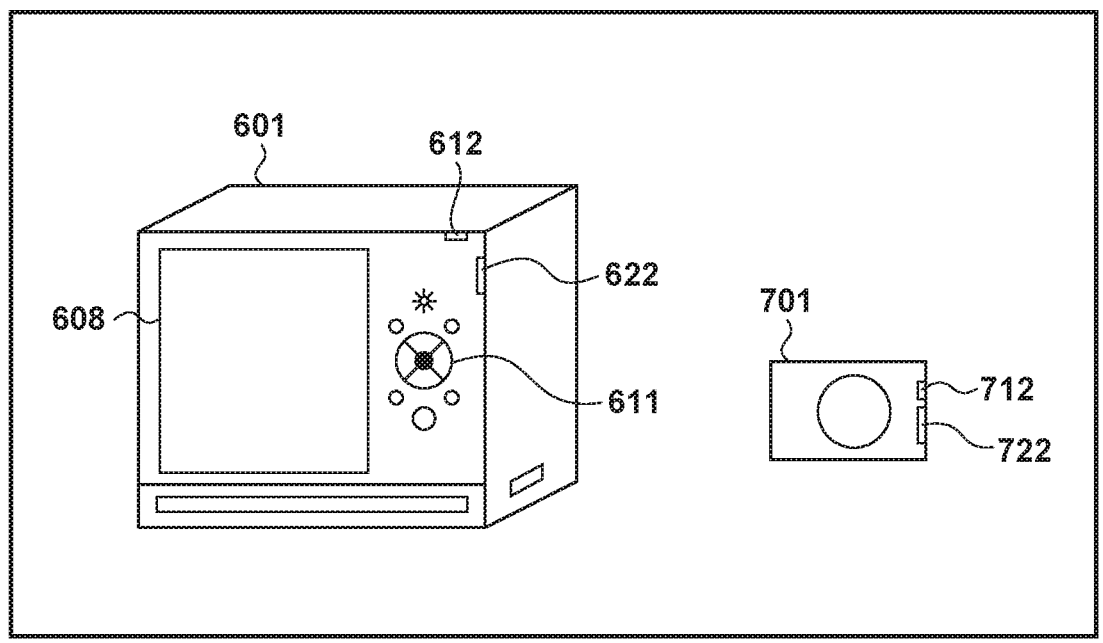

A sequence through which a wireless communication connection is established between the printing apparatus 601 and the image capturing apparatus 701 will be described with reference to FIGS. 13A-1 to 13B-3. In the following descriptions of the sequence, an example of the arrangements and connection circumstances of the printing apparatus 601, the image capturing apparatus 701, and the communication apparatus 801 will be described with reference to FIGS. 12C and 12D. At the start of the sequence, the communication apparatus 801 is not present; the printing apparatus 601 and the image capturing apparatus 701 are operating as peripheral role apparatuses between which BLE communication is not established, and are transmitting advertising packets. Note that at the start, the printing apparatus 601 and the image capturing apparatus 701 are present in the BLE communication range, but the communication apparatus 801 is not present in the BLE communication range, as illustrated in FIG. 12C.

In SEQ 1301, the PTR wireless communication unit A612 transmits the advertising packet ADV_IND_1, including the UUID 1 of Service 1 corresponding to the printing service, in accordance with the advertising interval. Additionally, the DSC wireless communication unit A712 transmits the advertising packet ADV_IND_2, including the UUID 2 of Service 2 corresponding to the image transfer service, in accordance with the advertising interval. In S1351, the PTR control unit A655 acquires the values of the advertising packet, and confirms whether the advertising packet can be received, or that the UUID 3 corresponding to the print request service of the image capturing apparatus 701 is not included in the advertising packet. In other words, it is determined that the print request service cannot be used. Thereafter, the printing apparatus 601 scans the advertising packets during the advertising interval, and waits for an advertising packet, including the UUID corresponding to a service that is valid in combination with the self apparatus, to be received. In S1352, the DSC control unit A755 enters the print request service execution mode in response to a user operation.

In SEQ 1303, the DSC control unit A755 issues an advertisement start event, including the UUID 3 of Service 3 corresponding to the print request service, in S1355. In S1356, the DSC control unit A755 transmits the SET_ADV_IND_3 command to the DSC wireless communication unit A712. The DSC wireless communication unit A712 transmits the advertising packet ADV_IND_3 including the UUID 3 of Service 3 corresponding to the print request service. Thereafter, the advertisement to the central role apparatus is carried out in accordance with the advertising interval. The PTR control unit A655 scans the advertising packet with a GET_ADV_IND command using the PTR wireless communication unit A612, and the PTR wireless communication unit A612 returns a result of the scan to the PTR control unit A655 as a RESPONSE. In S1357, the PTR control unit A655 acquires the values of the advertising packet, and confirms that the UUID 3 corresponding to the print request service of the image capturing apparatus 701 is included in that advertising packet. As a result, the PTR control unit A655 can determine that the print request service can be used.

Figure 12D:
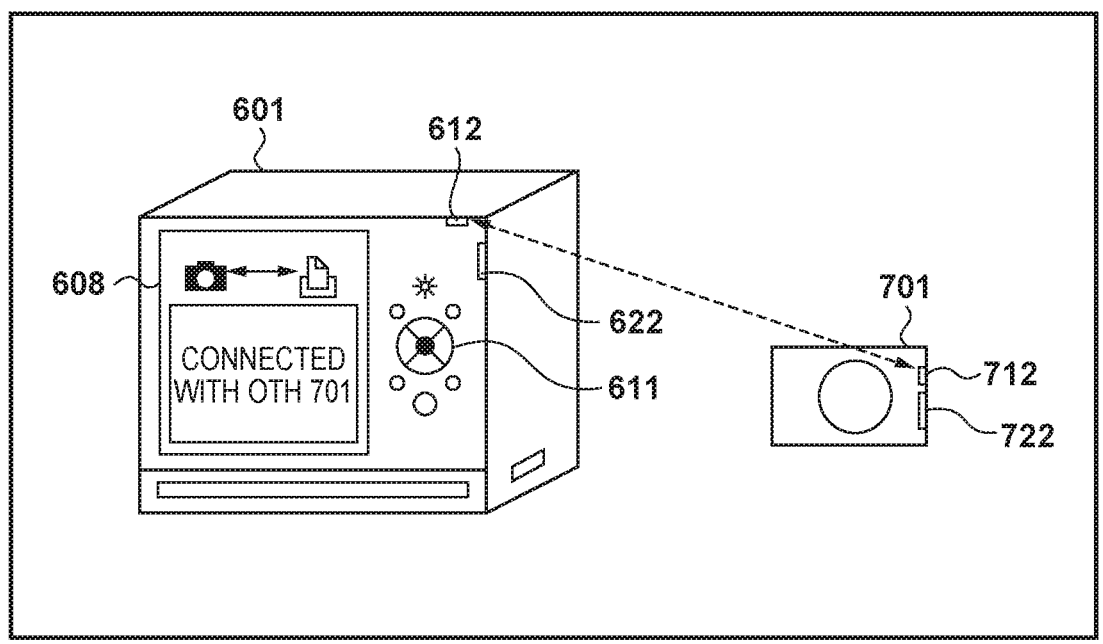

In SEQ 1305, the PTR control unit A655 transmits the START_701_CONNECT command to the PTR wireless communication unit A612. A BLE communication link is then established between the printing apparatus 601 and the image capturing apparatus 701. The PTR wireless communication unit A612 notifies the PTR control unit A655 of the establishment of the BLE communication link with a COMP_701_CONNECT command. Additionally, the DSC wireless communication unit A712 notifies the DSC control unit A755 of the establishment of the BLE communication link with a COMP_601_CONNECT command. The PTR wireless communication unit A612 transmits a DATA_PACKET to the DSC wireless communication unit A712 of the image capturing apparatus 701, and receives a DATA_PACKET as a response thereto. Thereafter, BLE communication is carried out, with the printing apparatus 601 serving as a BLE central role apparatus and the image capturing apparatus 701 serving as a BLE peripheral role apparatus, in accordance with the communication interval. When the sequence up to SEQ 1305 ends, the printing apparatus 601 has a currently-established BLE communication link with the image capturing apparatus 701, as illustrated in FIG. 12D (these apparatuses being present in the BLE communication range has not changed from FIG. 12C).

The following sequence from SEQ 1306 to SEQ 1313 is the same as the operations from SEQ 406 to SEQ 413, described in the first embodiment, with the operations of the communication apparatus 801 omitted. Descriptions thereof will accordingly be omitted. Once the sequence indicated in FIGS. 13A-1 to 13B-3 ends, the printing apparatus 601 and the image capturing apparatus 701 are in a state of transmitting the advertising packets, and it is thus possible to return to the same state as when the sequence started in FIG. 13A-1.

According to the present embodiment described above, the printing apparatus 601 behaves as a central role apparatus (scanning the advertising packets) in between times carrying out the process for operating as a peripheral role. As a result, BLE communication can be established between the printing apparatus 601 and the image capturing apparatus 701, which were operating as peripheral apparatuses, and thus the desired service can be executed.

Third Embodiment

The first and second embodiments describe examples in which the printing apparatus 601 behaves as a central role apparatus in order to establish BLE communication between the printing apparatus 601 and the image capturing apparatus 701, which were operating as peripheral apparatuses. The third embodiment will describe an example in which the image capturing apparatus 701 behaves as a central role apparatus in order to establish BLE communication between the printing apparatus 601 and the image capturing apparatus 701, which were operating as peripheral apparatuses. Note that the examples of the functional configurations of the apparatuses according to the present embodiment are the same as in the above-described embodiments, but the series of operations involved in the connection changing process carried out by the printing apparatus 601 and the image capturing apparatus 701, and parts of the sequences, differ. As such, identical configurations and identical steps will be assigned the same reference signs and redundant descriptions will be skipped, with attention focused on the differences.

Series of Operations in Connection Changing Process by Printing Apparatus

Figure 14A:
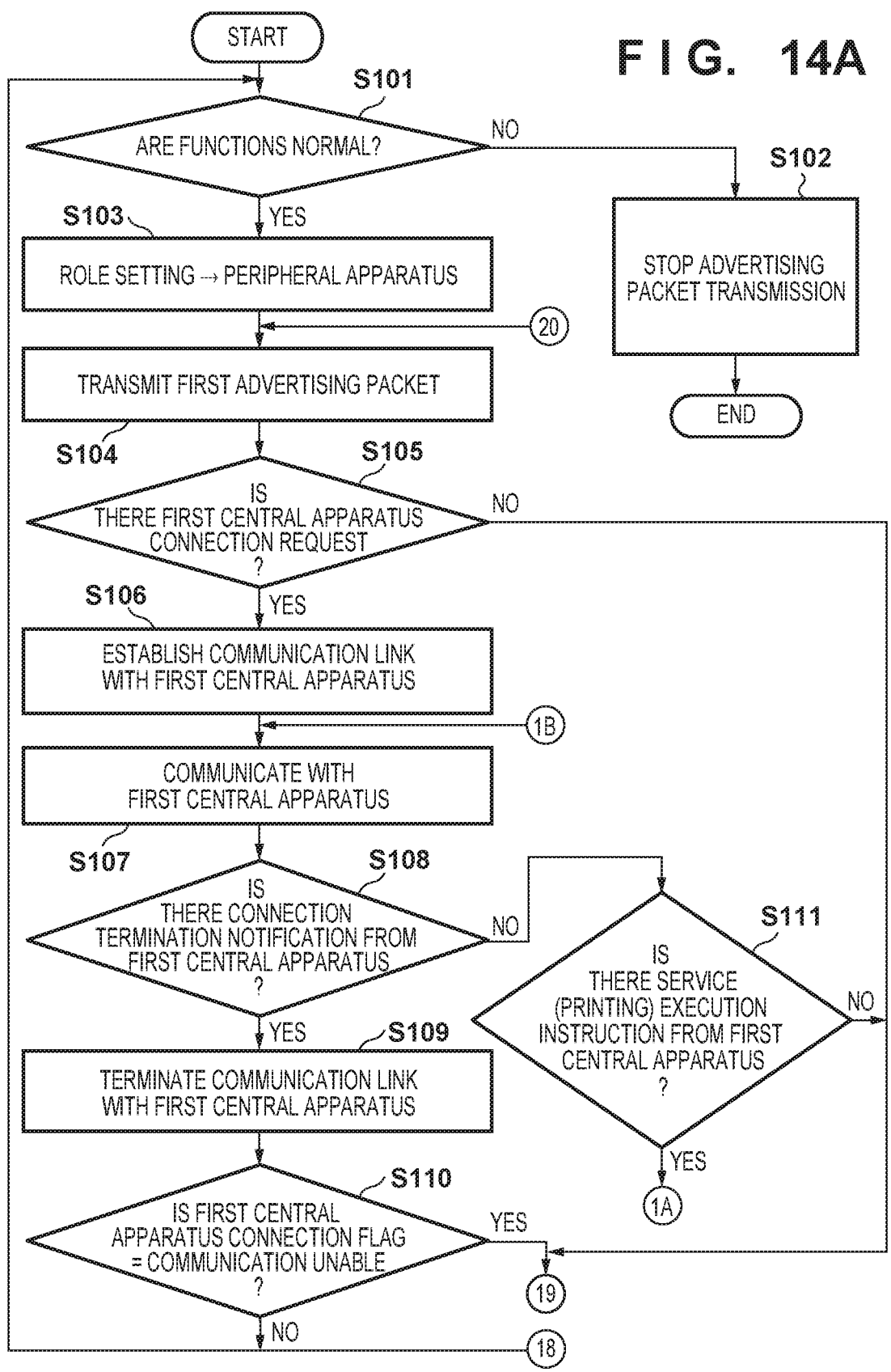
Figure 14B:
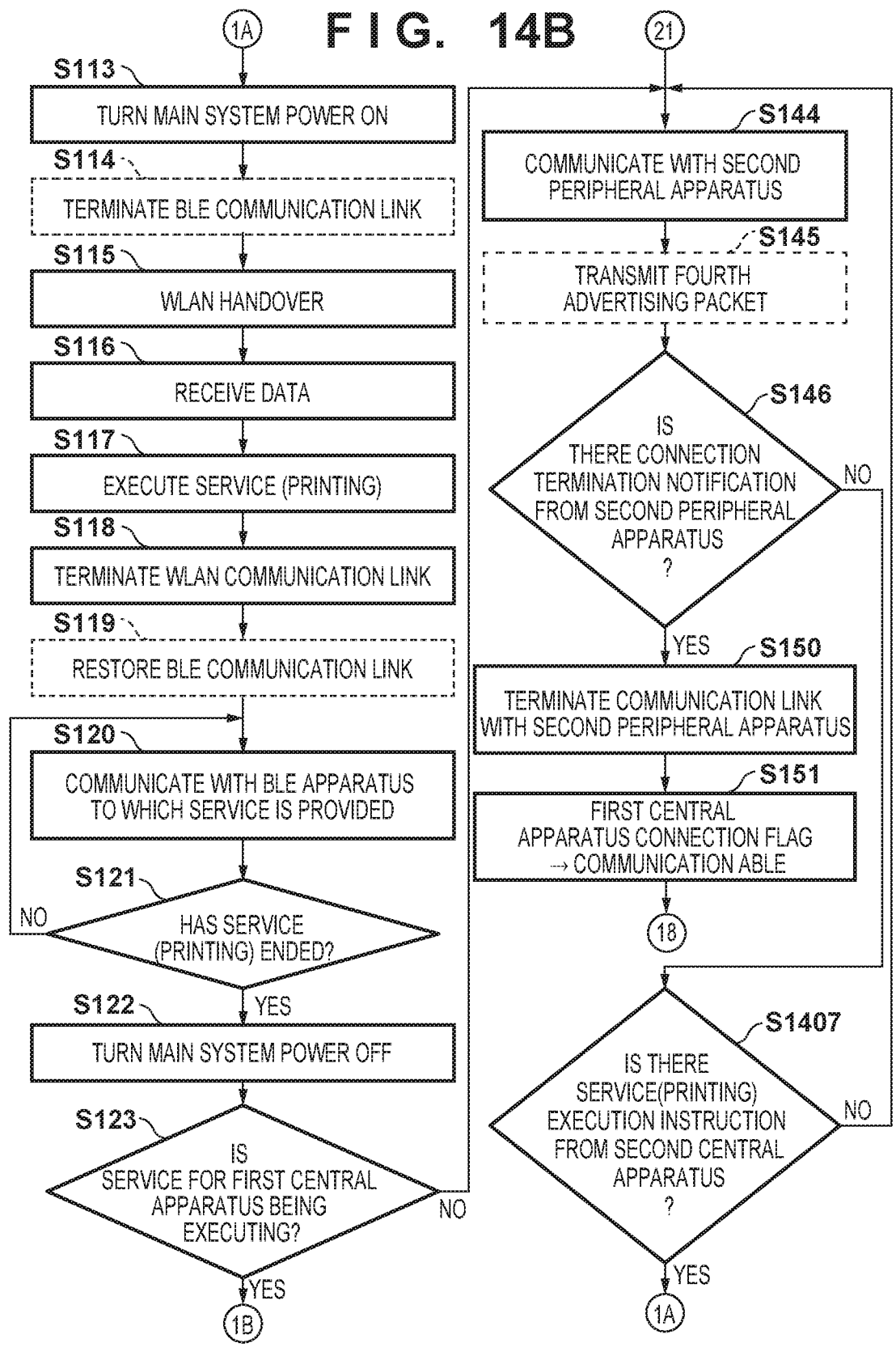

FIGS. 14A to 14C illustrate a series of operations involved in a process for changing a wireless connection (a connection changing process) carried out by the printing apparatus 601 according to the present embodiment. Note that unless otherwise specified, the individual processes in this process are realized by the PTR control unit A655 of the printing apparatus 601 loading programs stored in its internal ROM into its internal RAM and executing the programs. The operations in this process are started upon an AC voltage being input to the PTR AC/DC conversion circuit 602 of the printing apparatus 601 from the exterior.

In the present embodiment, the communication apparatus 801 operates as a central role apparatus (the first central apparatus), and the printing apparatus 601 operates as a peripheral role apparatus (the second peripheral apparatus). The image capturing apparatus 701 changes its part (role) from a peripheral role to a central role, and operates as the first peripheral apparatus and the second central apparatus in those respective situations.

The PTR control unit A655 transmits the first advertising packet by carrying out the processes of S101 to S104, in the same manner as in the first embodiment. The advertising packet is as illustrated in FIG. 9A, and Service 1 is a printing service for printing onto a printing medium using the PTR printing unit 610 of the printing apparatus 601 (this will also be called a "first printing service" in this embodiment).

FIG. 16A illustrates an example of the GATT server database storing Services and Characteristics of the PTR wireless communication unit A612 of the printing apparatus 601 according to the present embodiment. The BLE communication between the printing apparatus 601 and the first central apparatus is executed by reads and writes made to the database in the GATT server, illustrated in FIG. 16A. Note that FIG. 16A illustrates an example of the database in a GATT server for a case where the printing apparatus 601 includes the UUID 1 specifying the printing service in the advertising packet. In this example, at least two types of services are stored, indicated below. For example, Service 1 includes UUIDs of multiple Characteristics corresponding to UUID 1, and VALUEs corresponding to the UUIDs. Here, "print able/unable flag", "SSID", "PASSWORD", "device name", "supported printing protocol 1", "supported printing protocol 2", "print status", "central connection flag", and "WLAN status" can be given as examples of the Characteristic VALUEs of Service 1. Additionally, Service 3 includes UUIDs of multiple Characteristics corresponding to UUID 3, and VALUEs corresponding to the UUIDs. The Service 3 according to the present embodiment is, for example, a second printing service, and the Characteristic VALUEs of Service 3 have the same items as those of Service 1, for example.

The GATT server database of the PTR wireless communication unit A612 of the printing apparatus 601 may be configured to store UUIDs of multiple Characteristics corresponding to other UUIDs, and VALUEs corresponding to each of those UUIDs, as well. For example, the GATT server database of the PTR wireless communication unit A612 of the printing apparatus 601 may also store the following two types of Services, for example, in order to permit BLE link connections with multiple apparatuses and execute the printing service. Service 6 includes UUIDs of multiple Characteristics corresponding to a UUID 6, and VALUEs corresponding to the UUIDs. The Service 6 is, for example, a third printing service, and the Characteristic VALUEs of Service 6 have the same items as Service 1. Additionally, Service 7 includes UUIDs of multiple Characteristics corresponding to a UUID 7, and VALUEs corresponding to the UUIDs. The Service 7 is, for example, a fourth printing service, and has the same Characteristic VALUEs as Service 1.

Note that the present embodiment will describe an example in which the partner apparatuses to which the printing apparatus 601 provides the printing service are two apparatuses, namely the communication apparatus 801 and the image capturing apparatus 701. Accordingly, the GATT server database of the PTR wireless communication unit A612 of the printing apparatus 601 uses only the regions of Service 1 and Service 3. The Characteristic VALUE will be denoted simple as "VALUE" in the following descriptions.

After the process of S104, the PTR control unit A655 executes the processes of S105 to S109, in the same manner as in the first embodiment. In S110, the PTR control unit A655 determines whether the "central connection flag" of the VALUEs in the GATT server database of the PTR wireless communication unit A612 is "communication unable". Note that the Characteristic VALUE of Service 1 is a Characteristic VALUE corresponding to the first printing service. If the "central connection flag", which corresponds to a connection flag for the first central apparatus, is "communication unable", the PTR control unit A655 moves to S1400. On the other hand, if the "central connection flag" is not "communication unable", the PTR control unit A655 returns to S101.

In S111, the PTR control unit A655 determines whether there is a service execution instruction from the first central apparatus to the PTR wireless communication unit A612. The service in S111 is the first printing service, in which the PTR printing unit 610 of the printing apparatus 601 is used to print onto the printing medium, for example. If there is no service execution instruction from the first central apparatus to the PTR wireless communication unit A612, the PTR control unit A655 moves to S1400. On the other hand, if there is a service execution instruction from the first central apparatus to the PTR wireless communication unit A612, the PTR control unit A655 moves to S113.

The PTR control unit A655 executes the processes of S113 to S121, in the same manner as in the first embodiment. In S121, the PTR control unit B605 determines whether the printing service has ended. If it is determined that the printing service has not ended, the PTR control unit B605 returns to S120 and continues the BLE communication with the apparatus to which the service is being provided. Note that there are two types of services executed using a BLE communication link with the printing apparatus 601, namely the first printing service which is carried out with the communication apparatus 801 serving as the first central apparatus, and the second printing service carried out with the image capturing apparatus 701 serving as the second central apparatus. On the other hand, if it is determined that the printing service has ended, the PTR control unit B605 moves to S122. In S122, the PTR control unit A655 turns the PTR constant voltage circuit B604 off, and turns the PTR control unit B605, which is the main system, off as well.

In S123, the PTR control unit A655 determines whether the service for the first central apparatus is being executed. If it is determined that the service for the first central apparatus is being executed, the PTR control unit A655 returns to S107. On the other hand, if it is determined that the service for the first central apparatus is not being executed, the process moves to S144.

The processes from S1400 and on will be described next. If in S1400 it is determined that a BLE communication link is already established with the second central apparatus (i.e., the image capturing apparatus 701), the PTR control unit A655 moves to S144. On the other hand, if it is determined that a BLE communication link is not already established with the second central apparatus, the process moves to S1401. In S401, the PTR control unit A655 transmits the third advertising packet from the PTR wireless communication unit A612. Note that the transmission of the third advertising packet in S1401 is carried out in the above-described advertising interval until there is a connection request from the central role apparatus. The advertising packet transmitted in S1401 is the third advertising packet, illustrated in FIG. 9C, which includes the UUID 3 specifying the service that can be executed by the printing apparatus 601 in the data of the advertising packet. Various services can be considered as the Service specified by the UUID, and an example thereof will be given below. The example of the advertising packet illustrated in FIG. 9C indicates that a Service 3 can be executed using a UUID 3. Service 3 is the second printing service that prints onto the printing medium using the PTR printing unit 610 of the printing apparatus 601. The second printing service is different from the first printing service in terms of the central apparatus that sends the data to be printed to the printing apparatus 601. In the present embodiment, the first printing service is provided to the first central apparatus, and the second printing service is provided to the second central apparatus.

In S1402, the PTR control unit A655 determines whether there is a connection request from the second central apparatus to the PTR wireless communication unit A612. The process moves to S1403 if there is no connection request from the second central apparatus, and moves to S1405 if there is a connection request from the second central apparatus. In S1403, it is determined whether it is the advertising interval of the first central apparatus. The PTR control unit A655 moves to S1404 if it is not the advertising interval of the first central apparatus, and returns to S104 if it is an interval of BLE communication with the first central apparatus. In S1404, it is determined whether it is an interval of BLE communication with the first central apparatus. If it is not an interval of BLE communication with the first central apparatus, the PTR control unit A655 moves to S144. On the other hand, if it is an interval of BLE communication with the first central apparatus, the PTR control unit A655 returns to S107.

In S1405, the PTR control unit A655 establishes a BLE communication link with the second central apparatus. In S1406, the PTR control unit A655 sets the "central connection flag" of the VALUEs of Service 1 to "communication unable" in the GAIT server database of the PTR wireless communication unit A612, and then moves to S1404.

In S144, the PTR control unit A655 carries out BLE communication with the second central apparatus. Note that the BLE communication in S144 is carried out intermittently at communication intervals set with the second peripheral apparatus. In S145, the PTR control unit A655 broadcasts the fourth advertising packet from the PTR wireless communication unit A612, in the same manner as in the above-described embodiments.

In S146, the PTR control unit A655 determines whether there is a connection termination notification from the second central apparatus to the PTR wireless communication unit A612. If there is a connection termination notification from the second central apparatus, the process moves to S150. On the other hand, if there is no connection termination notification from the second central apparatus, the process moves to S1407. In S150, the PTR control unit A655 terminates the BLE communication link with the second central apparatus. In S151, the printing apparatus 601 sets the "central connection flag" of the VALUEs of Service 1, corresponding to the first printing service, to "communication able" in the GATT server database of the PTR wireless communication unit A612. The process then returns to S101.

In S1407, the PTR control unit A655 determines whether there is a service execution instruction from the second central apparatus to the PTR wireless communication unit A612. Note that the service in this step is the second printing service that prints onto the printing medium using the PTR printing unit 610 of the printing apparatus 601. If there is a service execution instruction from the second central apparatus, the PTR control unit A655 moves to S113. In other words, through the above-described processing of S113 to S123, the printing service is executed for the second central apparatus through a handover to the faster WLAN. On the other hand, if there is no service execution instruction, the PTR control unit A655 determines that there is no instruction to execute the printing service from the image capturing apparatus 701, and returns to S144. When the process of S102 then ends, the PTR control unit A655 terminates this series of operations.

Figure 15A:
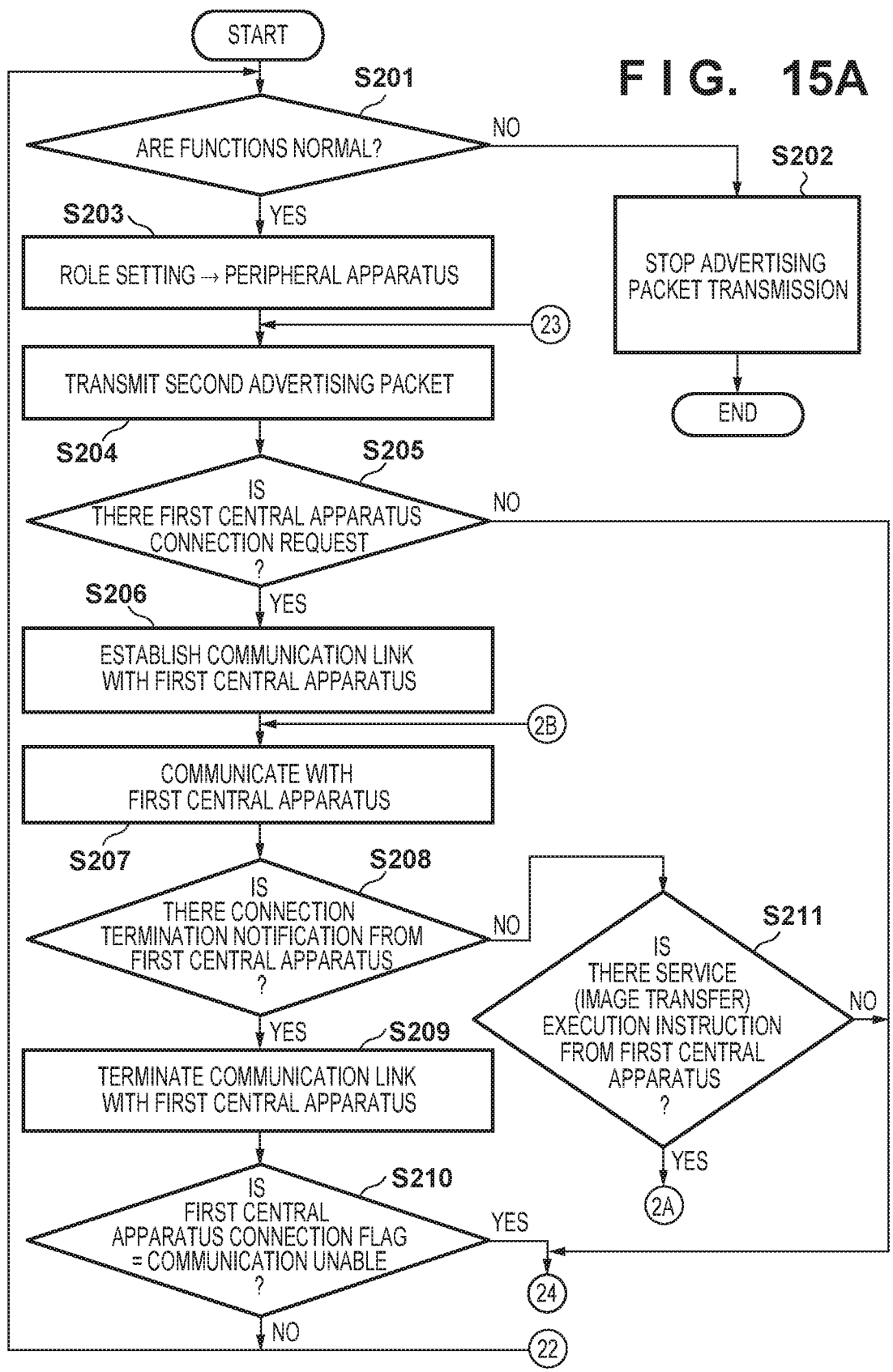
FIGS. 15A, 15B, and 15C are flowcharts illustrating a sequence of operations in a connection changing process of an image capturing apparatus according to the third embodiment.
Figure 15B:
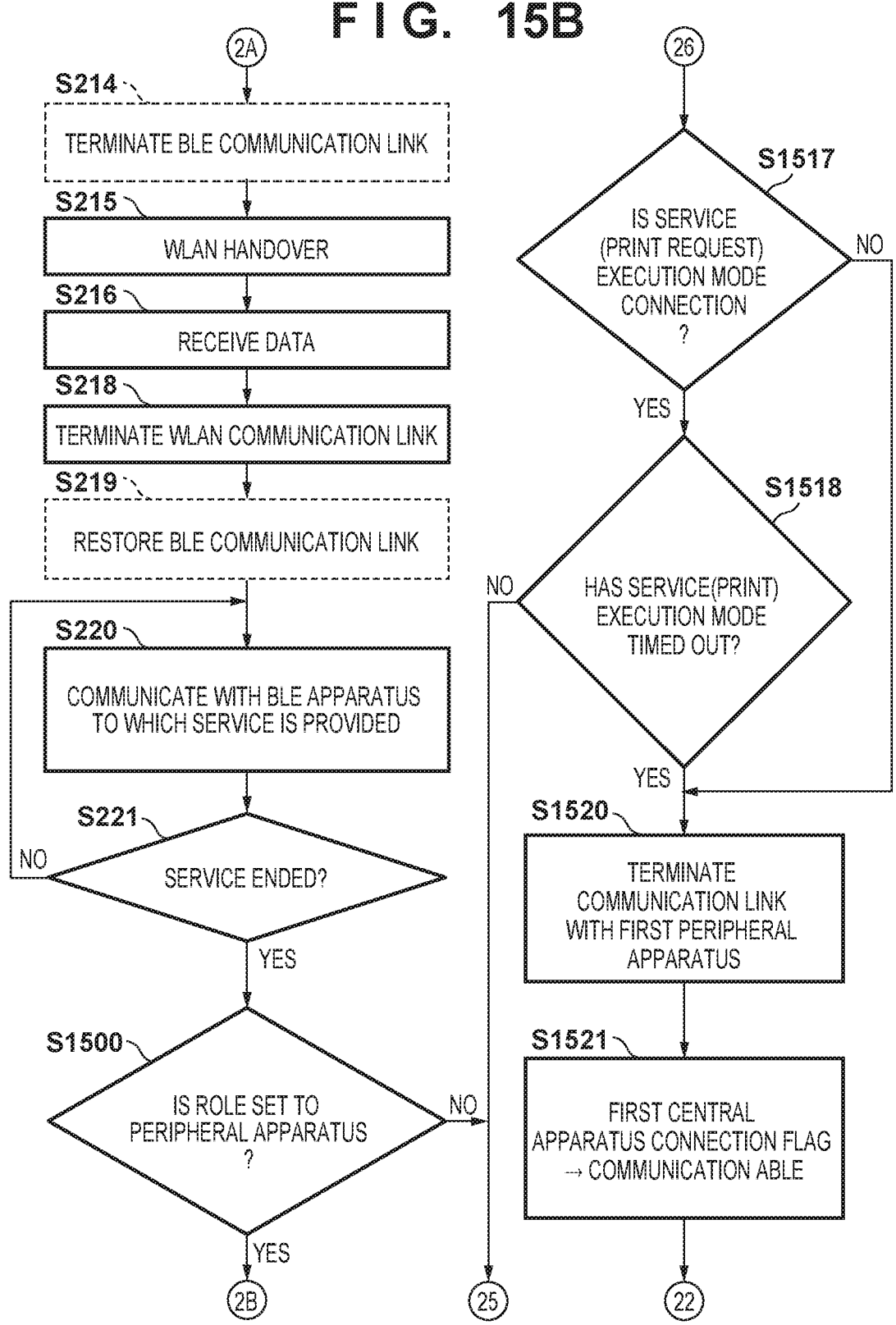
Figure 15C:
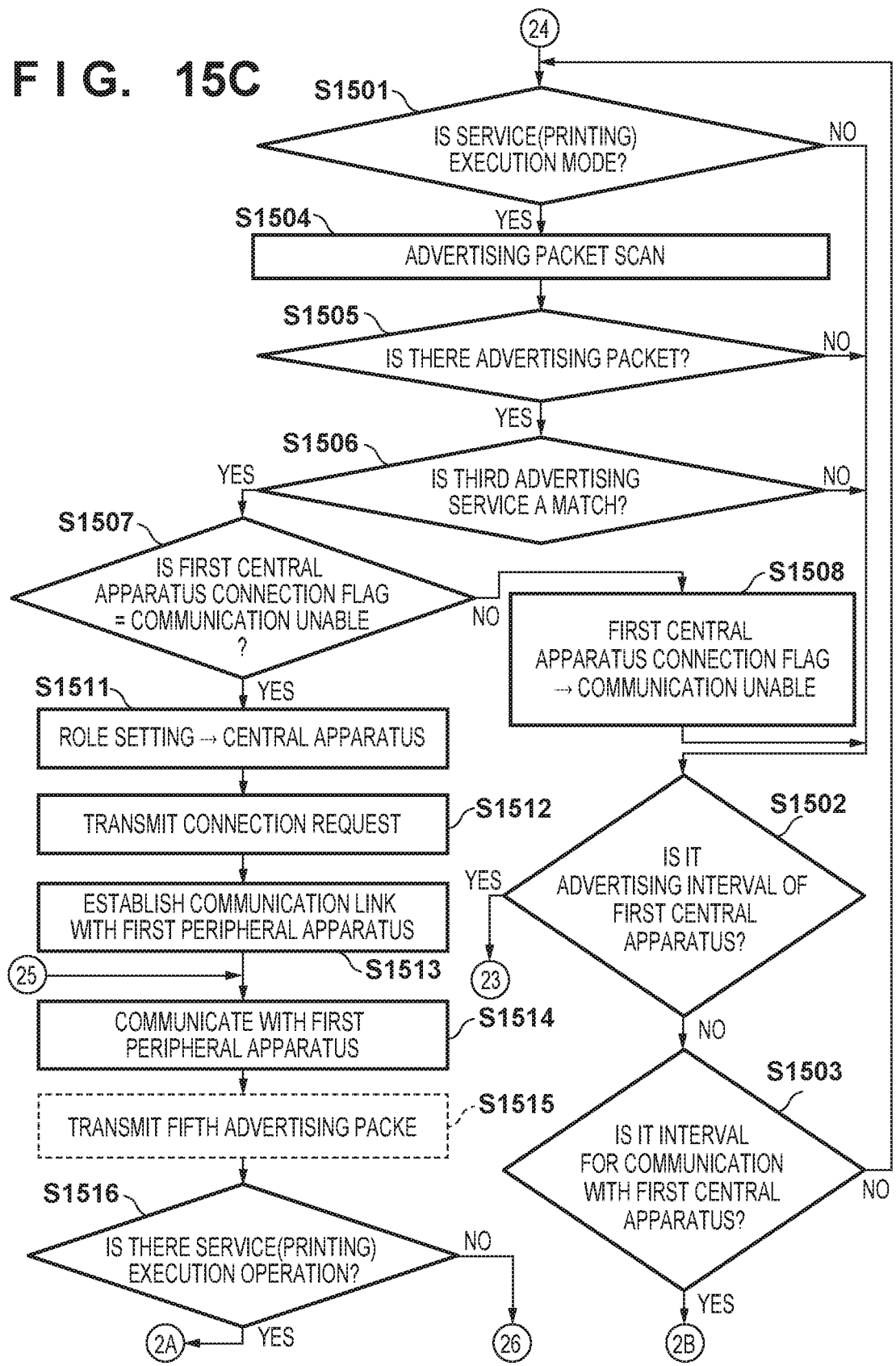

Series of Operations in Connection Changing Process by Image Capturing Apparatus Next, a series of operations involved in a process in which the second peripheral apparatus (the image capturing apparatus 701) connects to the first central apparatus (the communication apparatus 801) or the printing apparatus 601 behaving as the first peripheral apparatus (this is also called a "connection changing process") will be described with reference to FIGS. 15A to 15C. Note that unless otherwise specified, the individual processes in this process are realized by the DSC control unit A755 of the image capturing apparatus 701 loading programs stored in its internal ROM into its internal RAM and executing the programs. Additionally, the operations of this process are started in response to the DSC battery 702 being connected to the image capturing apparatus 701.

First, the DSC control unit A755 executes the processes of S201 to S211, in the same manner as in the first embodiment. However, if in S205 there is no connection request from the first central apparatus, and if in S210 the "central connection flag", which is the connection flag with the first central apparatus, is "communication unable", the process moves to S1501. Additionally, if in S211 there is a service execution instruction from the first central apparatus to the DSC wireless communication unit A712, the process moves to S214.

In the processes from S214 on, the image capturing apparatus 701 executes the service by making a handover to a high-speed WLAN. The DSC control unit A755 carries out the processes of S214 to S220, and carries out BLE communication with the apparatus to which the service is being provided, in the same manner as in the first embodiment. In S221, the DSC control unit A755 determines whether the service being provided has ended. If it is determined that the service being provided has not ended, the DSC control unit A755 returns to S220 and carries out BLE communication with the apparatus to which the service is being provided. Note that two types of services are present as services provided through a BLE communication link by the image capturing apparatus 701. The first is the image transfer service provided to the communication apparatus 801, which is the first central apparatus. The second is the second printing service provided from the printing apparatus 601, which is the first peripheral apparatus.

In S1500, the DSC control unit A755 determines whether the role of the DSC wireless communication unit A712 is set to the peripheral role. If it is determined that the role of the DSC wireless communication unit A712 is set to the peripheral role, the DSC control unit A755 returns to S207. In all other cases, the process moves to S1514.

The processes from S1501 and on will be described next. In S1501, the DSC control unit A755 determines whether a print request service execution mode has been activated by the user operating the DSC operation input unit 711. The DSC control unit A755 moves to S1502 if the print request service execution mode has not been activated, and to S1504 if the print request service execution mode has been activated.

In S1502, the DSC control unit A755 determines whether it is the advertising interval of the first central apparatus. The process moves to S1503 if it is not the advertising interval of the first central apparatus, and returns to S204 if it is an interval of BLE communication with the first central apparatus. In S1503, the DSC control unit A755 determines whether it is an interval of BLE communication with the first central apparatus. If it is not an interval of BLE communication with the first central apparatus, the DSC control unit A755 returns to S1501. If in S1503 it is an interval of BLE communication with the first central apparatus, the DSC control unit A755 returns to S207.

In S1504, the DSC control unit A755 scans the advertising packets from other peripheral apparatuses, and in S1505, determines whether there is an advertising packet from another peripheral apparatus. If there is no advertising packet from another peripheral apparatus, the DSC control unit A755 moves to S1502. On the other hand, if there is an advertising packet from another peripheral apparatus, the process moves to S1506. In S1506, the DSC control unit A755 determines whether the UUID specifying the service, included in the advertising packet transmitted by the other peripheral apparatus, is valid in combination with the self apparatus. An advertising packet determined to be valid is the third advertising packet including the UUID 3, which specifies the second printing service (Service) that can be executed by the first peripheral apparatus (the printing apparatus 601).

In S1507, the DSC control unit A755 determines whether the "central connection flag" of the VALUEs of Service 2 is "communication unable" in the GATT server database of the DSC wireless communication unit A712. The VALUEs of Service 2 correspond to the image transfer service (FIG. 16B). If the "central connection flag", which corresponds to a connection flag for the first central apparatus, is "communication unable", the DSC control unit A755 moves to S1511. On the other hand, if the "central connection flag", which corresponds to a connection flag for the first central apparatus, is not "communication unable", the process moves to S1508. In S1508, the DSC control unit A755 sets the "central connection flag" of the VALUEs of Service 2 to "communication unable" in the GATT server database of the DSC wireless communication unit A712, and then moves to S1502.

In S1511, the DSC control unit A755 sets the role of the DSC wireless communication unit A712 to the central role. The image capturing apparatus 701 operates as the second central apparatus in BLE as a result of the DSC control unit A755 setting the role of the DSC wireless communication unit A712 to the central role. In S1512, the DSC control unit A755 makes a connection request to the peripheral apparatus that transmitted the third advertising packet (the printing apparatus 601, which is the second peripheral apparatus). In S1513, the DSC control unit A755 establishes a BLE communication link with the printing apparatus 601, which is the second peripheral apparatus, and furthermore carries out BLE communication with the second peripheral apparatus in S1514. Note that the BLE communication in S1514 is carried out intermittently at communication intervals set with the second peripheral apparatus.

In S1515, the DSC control unit A755 broadcasts a fifth advertising packet from the DSC wireless communication unit A712. Note that the broadcasting of the fifth advertising packet in S1515 is carried out intermittently at predetermined time periods (the advertising interval) set by the DSC control unit A755. The broadcast advertising packet according to the present embodiment is the packet described above with reference to FIG. 10B.

Note that the broadcast advertising packet transmitted from the image capturing apparatus 701, which is the second central role apparatus, is scanned by the first central apparatus serving as a central role apparatus (i.e., the communication apparatus 801). The first central apparatus determines whether the UUID specifying the service, included in the advertising packet transmitted by the image capturing apparatus 701, is valid in combination with the self apparatus. At this time, the image transfer busy status service, which indicates that the image capturing apparatus 701 is in a busy state, can be determined, and thus the first central apparatus does not make a BLE connection request to the image capturing apparatus 701. By using the broadcast advertising packet transmission of S1515, the image capturing apparatus 701 can notify the central role apparatus of the image transfer busy status service. The central role apparatus can then control the self apparatus so as not to execute the image transfer service with the image capturing apparatus 701. Note that the image capturing apparatus 701 need not transmit the broadcast advertising packet in S1515.

If in S1516 the execution of the printing service has been instructed through a user operation, the DSC control unit A755 moves to S214. On the other hand, if the execution of the print request service has not been instructed through a user operation, the process moves to S1517. In S1517, the DSC control unit A755 determines whether a printing service execution mode is being continued through a user operation. The DSC control unit A755 moves to S1518 if the printing service execution mode is being continued by the user, and moves to S1520 if the printing service execution mode is not being continued by the user. In S1518, the DSC control unit A755 determines whether the printing service execution mode has timed out. The DSC control unit A755 determines that the mode has timed out if, for example, the user has not made any operations for a set amount of time after the printing service execution mode was activated through a user operation. The process moves to S1520 if it is determined that the printing service execution mode has timed out, and returns to S1514 if it is determined that the printing service execution mode has not timed out.

In S1520, the DSC control unit A755 terminates the BLE communication link with the printing apparatus 601 serving as the first peripheral apparatus, and moves to S1521. In S1521, the DSC control unit A755 sets the "central connection flag" of the VALUEs of Service 2 to "communication able" in the GATT server database of the DSC wireless communication unit A712, and then returns to S201. If the transmission of the advertising packet is then stopped in S202, the DSC control unit A755 ends the series of operations involved in this process.

Sequence in which Printing Apparatus and Image Capturing Apparatus Connect

Next, a sequence through which the printing apparatus 601 and the image capturing apparatus 701 establish a wireless communication connection, when the printing apparatus 601, the image capturing apparatus 701, and the communication apparatus 801 carry out the connection changing process illustrated in FIGS. 6A to 6C, 14A to 14C, and 15A to 15C, will be described with reference to FIGS. 17A-1 to 17B-3. Note that at the start of the sequence, the communication apparatus 801 is operating as a central role apparatus, and the printing apparatus 601 and the image capturing apparatus 701 are operating as peripheral role apparatuses. Additionally, the sequence is started from a state where BLE connections are established between the communication apparatus 801 and the printing apparatus 601, and between the communication apparatus 801 and the image capturing apparatus 701. As illustrated in FIG. 12A, these three apparatuses are within a BLE communication range at the start of the sequence.

In SEQ 1701, the OTH wireless communication unit A812 transmits a DATA_PACKET to the PTR wireless communication unit A612, and receives a DATA_PACKET as a response thereto. In S1751, the PTR control unit A655 sends the SET_ADV_IND_3 command to the PTR wireless communication unit A612. The PTR wireless communication unit A612 transmits the advertising packet ADV_IND_3 including the UUID 3 of Service 3 corresponding to the second printing service. Thereafter, the advertisement to the central apparatus is carried out in accordance with the advertising interval. The OTH wireless communication unit A812 transmits a DATA_PACKET to the DSC wireless communication unit A712, and receives a DATA_PACKET as a response thereto.

In S1752, the DSC control unit A755 enters the printing service execution mode in response to a user operation. The DSC control unit A755 scans the advertising packets in response to the GET_ADV_IND command using the DSC wireless communication unit A712, and the DSC wireless communication unit A712 returns the result of the scan as a RESPONSE to the DSC control unit A755. In S1753, the DSC control unit A755 acquires the values of the advertising packet, and confirms whether the advertising packet can be received, or that the UUID 3 corresponding to the second printing service is not included in the advertising packet (i.e., cannot be used). Thereafter, the DSC control unit A755 scans the advertising packets during the communication interval, and waits for an advertising packet, including the UUID corresponding to a service that is valid in combination with the self apparatus, to be received. On the basis of S1754 and the like being repeated, the PTR wireless communication unit A612 transmits the advertising packet ADV_IND_3 including the UUID 3 of the Service 3 corresponding to the second printing service.

In SEQ 1702, the DSC control unit A755 scans the advertising packets in response to the GET_ADV_IND command using the DSC wireless communication unit A712. The DSC wireless communication unit A712 returns the result of the scan as a RESPONSE to the DSC control unit A755. In S1755, the DSC control unit A755 acquires the values of the advertising packet, and confirms that the UUID 3 corresponding to the second printing service is included in the advertising packet.

In S1756, upon confirming that the desired service can be used, the DSC control unit A755 sends the DISCONNECT_801_NOTIFY command to the DSC wireless communication unit A712. In response to the command in S1756, the "central connection flag" of the VALUEs of Service 2, which corresponds to the image transfer service, is set to "communication unable" in the GATT server database of the DSC wireless communication unit A712. Then, the "central connection flag", which is a connection flag for the communication apparatus 801 and the image capturing apparatus 701, is communicated to the communication apparatus 801 at the timing of the next BLE communication between the communication apparatus 801 and the image capturing apparatus 701. The OTH wireless communication unit A812 transmits a DATA_PACKET to the DSC wireless communication unit A712, and receives a DATA_PACKET as a response thereto. The OTH wireless communication unit A812 transmits the DISCONNECT_701_NOTIFY command to the OTH control unit A855. The OTH control unit A855 then confirms that the "central connection flag" of the VALUEs of Service 2, which corresponds to the image transfer service, is "communication unable" in the received DATA_PACKET. On the basis of the connection flag, the OTH control unit A855 sends the TERMINATE_701_LINK command to the OTH wireless communication unit A812, which terminates the BLE communication link between the communication apparatus 801 and the image capturing apparatus 701. The OTH wireless communication unit A812 notifies the OTH control unit A855 of the termination of the BLE communication link with the DISCONNECT_701 command. Additionally, the DSC wireless communication unit A712 notifies the DSC control unit A755 of the termination of the BLE communication link with the DISCONNECT_801 command.

In SEQ 1703, the PTR wireless communication unit A612 transmits the advertising packet ADV_IND_3, including the UUID 3 of Service 3 corresponding to the second printing service. The DSC control unit A755 scans the advertising packets in response to the GET_ADV_IND command using the DSC wireless communication unit A712, and the DSC wireless communication unit A712 returns the result of the scan as a RESPONSE to the DSC control unit A755. In S1758, the DSC control unit A755 acquires the values of the advertising packet, and confirms that the UUID 3 corresponding to the second printing service is included in the advertising packet.

In S1759, the DSC control unit A755 transmits the START_601_CONNECT command to the DSC wireless communication unit A712, and causes BLE communication to be established between the communication apparatus 801 and the printing apparatus 601. The DSC wireless communication unit A712 then notifies the DSC control unit A755 of the establishment of the BLE communication link with the COMP_601_CONNECT command. The PTR wireless communication unit A612 notifies the PTR control unit A655 of the establishment of the BLE communication link with the COMP_701_CONNECT command. The DSC wireless communication unit A712 transmits a DATA_PACKET to the PTR wireless communication unit A612, and receives a DATA_PACKET as a response thereto. Thereafter, BLE communication is carried out, with the image capturing apparatus 701 serving as a BLE central role apparatus and the printing apparatus 601 serving as a BLE peripheral role apparatus, in accordance with the communication interval.

In SEQ 1704, the PTR control unit A655 transmits the DISCONNECT_801_NOTIFY command to the PTR wireless communication unit A612 in S1760. In response to the command in S1760, the "central connection flag" of the VALUEs of Service 1, which corresponds to the first printing service, is set to "communication unable" in the GAIT server database of the PTR wireless communication unit A612. The "central connection flag", which is a connection flag for the communication apparatus 801 and the printing apparatus 601, is communicated to the communication apparatus 801 at the timing of the next BLE communication between the communication apparatus 801 and the printing apparatus 601.

The OTH wireless communication unit A812 transmits a DATA_PACKET to the PTR wireless communication unit A612, and receives a DATA_PACKET as a response thereto. The OTH wireless communication unit A812 transmits the DISCONNECT_601_NOTIFY command to the OTH control unit A855. Then, the OTH control unit A855 confirms that the "central connection flag" of the VALUEs of Service 1, which corresponds to the first printing service, is "communication unable" in the received DATA_PACKET. On the basis of the connection flag, the OTH control unit A855 sends the TERMINATE_601_LINK command to the OTH wireless communication unit A812, which terminates the BLE communication link between the communication apparatus 801 and the printing apparatus 601. Then, the OTH wireless communication unit A812 notifies the OTH control unit A855 of the termination of the BLE communication link with the DISCONNECT_601 command. The PTR wireless communication unit A612 notifies the PTR control unit A655 of the termination of the BLE communication link with the DISCONNECT_801 command. When the sequence up to SEQ 1704 ends, the image capturing apparatus 701 has a currently-established BLE communication link with the printing apparatus 601, as illustrated in FIG. 12B. The resulting state is one in which the communication apparatus 801 has terminated the BLE communication links with the printing apparatus 601 and the image capturing apparatus 701.

In SEQ 1705, the DSC wireless communication unit A712 transmits a DATA_PACKET to the PTR wireless communication unit A612 of the printing apparatus 601, and receives a DATA_PACKET as a response thereto. The printing apparatus 601, which has had the BLE link with the communication apparatus 801 terminated, may transmit the broadcast advertising packet ADV_NONCONN_IND_4, including the UUID 4 of Service 4, during the interval of BLE communication with the image capturing apparatus 701. As described above, the UUID 4 of Service 4 indicates that the printing service is in a busy state. Additionally, the image capturing apparatus 701 may transmit the broadcast advertising packet ADV_NONCONN_IND_5, including the UUID 5 of Service 5, during the interval of BLE communication with the printing apparatus 601. The UUID 5 of Service 5 indicates that the image capturing apparatus 701 is in a busy state.

Note that the broadcast advertising packet is an advertising packet indicating that a connection request cannot be made, and thus the central role apparatus cannot make a connection request. When the broadcast advertising packets are to be transmitted, the printing apparatus 601 or the image capturing apparatus 701 transmits the broadcast advertising packets in accordance with the advertising interval.

In S1761, the DSC control unit A755 instructs the execution of the print request service in response to a user operation. In S1762, the DSC control unit A755 sends the EXE_PRINT_NOTIFY command to the DSC wireless communication unit A712. The DSC wireless communication unit A712 transmits a DATA_PACKET to the PTR wireless communication unit A612, and receives a DATA_PACKET as a response thereto. The "print status" of the VALUEs of Service 3, which corresponds to the second printing service, is set to "print request" in the GATT server database of the PTR wireless communication unit A612.

On the other hand, the OTH control unit A855, for which the BLE link with the printing apparatus 601 and the image capturing apparatus 701 has been terminated, scans the advertising packets in response to the GET_ADV_IND command using the OTH wireless communication unit A812. The result of the scan is returned as a RESPONSE to the OTH control unit A855. The OTH control unit A855 acquires the values of the advertising packet. Then, it is confirmed whether the advertising packet can be received, or that the UUID 1 corresponding to the first printing service of the printing apparatus 601, the UUID 2 corresponding to the image transfer service of the image capturing apparatus 701, or the like is not included in the advertising packet. Thereafter, the communication apparatus 801 scans the advertising packets in accordance with a scanning interval, and waits for an advertising packet, including the UUID corresponding to a service that is valid in combination with the self apparatus, to be received. When the values of the above-described broadcast advertising packet have been acquired, the communication apparatus 801 can determine that the printing apparatus 601 or the image capturing apparatus 701 is in a busy state. Accordingly, the self apparatus can be controlled so as not to make a connection request to the printing apparatus 601 or the image capturing apparatus 701.

In SEQ 1706, the PTR wireless communication unit A612 confirms that the "print status" of the VALUEs of Service 3 is "print request" in the DATA_PACKET received in the sequence of SEQ 1705. Note that the VALUEs of Service 3 are VALUEs corresponding to the second printing service. Then, in S1763, the PTR wireless communication unit A612 sends the EXE_PRINT_NOTIFY command to the PTR control unit A655. In S1764, the PTR control unit A655 turns the PTR constant voltage circuit B604 on by the PTR control unit A655 issuing a main system power on event, and turns on the PTR control unit B605, which is the main system. In S1765, the PTR control unit B605 issues a WLAN startup event, turns the PTR wireless communication unit B622 on, and starts the establishment of a WLAN communication link with the apparatus to which the printing service is being provided. The DSC wireless communication unit A712 transmits a DATA_PACKET to the PTR wireless communication unit A612, and receives a DATA_PACKET as a response thereto. In S1766, the DSC wireless communication unit A712 transmits the START_WLAN_HANDOVER command to the DSC control unit A755. The DSC control unit A755 then confirms that the "WLAN status" of the VALUEs of Service 3, which corresponds to the second printing service, is "START_WLAN" in the received DATA_PACKET.

In SEQ 1707, the DSC control unit A755 issues the WLAN startup event, turns the DSC wireless communication unit B722 on, and starts the establishment of a WLAN communication link with the apparatus to which the printing service is being provided, in S1767. Here, when the WLAN communication link is established between the PTR wireless communication unit B622 and the DSC wireless communication unit B722, data can be exchanged over the WLAN. The image capturing apparatus 701 transmits print target image data through the DSC wireless communication unit B722, and the PTR wireless communication unit B622 of the printing apparatus 601 receives the print target image data.

In S1768, if the exchange of the print target image data has ended, the DSC control unit A755 issues a WLAN end event. The WLAN communication link between the DSC wireless communication unit B722 and the PTR wireless communication unit B622 is terminated, and the DSC wireless communication unit B722 is turned off. Then, in S1769, the DSC control unit A755 transmits the DISCONNECT_WLAN command to the DSC wireless communication unit A712. The DSC wireless communication unit A712 transmits a DATA_PACKET to the PTR wireless communication unit A612, and receives a DATA_PACKET as a response thereto. The "WLAN status" of the VALUEs of Service 3, which corresponds to the second printing service, is set to "DISCONNECT_WLAN" in the GATT server database of the PTR wireless communication unit A612.

The DSC wireless communication unit A712 transmits a DATA_PACKET to the PTR wireless communication unit A612, and receives a DATA_PACKET as a response thereto. In S1770, the PTR wireless communication unit A612 sends the DISCONNECT_WLAN command to the PTR control unit A655. The PTR control unit A655 then confirms that the "WLAN status" of the VALUEs of Service 3, which corresponds to the second printing service, is "DISCONNECT_WLAN" in the received DATA_PACKET. In S1771, the PTR control unit B605 issues a WLAN end event and turns the PTR wireless communication unit B622 off.

In SEQ 1708, if the exchange of the printing target image data has ended, the DSC wireless communication unit A712 transmits a DATA_PACKET to the PTR wireless communication unit A612, and receives a DATA_PACKET as a response thereto. The "print status" of the VALUEs of Service 3, which corresponds to the second printing service, is set to "printing" in the GATT server database of the PTR wireless communication unit A612, indicating that the printing apparatus 601 is currently printing. Once the printing has ended, the "print status" is set to "printing complete".

In SEQ 1709, the DSC control unit A755 ends the printing service execution mode in response to a user operation in S1771. Then, in S1772, the DSC control unit A755 sends the TERMINATE_601_LINK command to the DSC wireless communication unit A712. As a result, the BLE communication link between the communication apparatus 801 and the printing apparatus 601 is terminated. Then, the DSC wireless communication unit A712 notifies the DSC control unit A755 of the termination of the BLE communication link with the DISCONNECT_601 command. Additionally, the PTR wireless communication unit A612 notifies the PTR control unit A655 of the termination of the BLE communication link with the DISCONNECT_701 command.

In SEQ 1710, in S1773, the PTR control unit A655 turns off the PTR control unit B605, which is the main system, by issuing a main system power off event and turning the PTR constant voltage circuit B604 off. In S1774, the PTR control unit A655 issues an advertisement restoration event, including the UUID 1 of Service 1 corresponding to the first printing service. In S1775, the PTR control unit A655 sends the SET_ADV_IND_1 command to the PTR wireless communication unit A612. The PTR wireless communication unit A612 transmits the advertising packet ADV_IND_1 including the UUID 1 of Service 1 corresponding to the first printing service. Thereafter, the advertisement to the central apparatus is carried out in accordance with the advertising interval. In S1776, the PTR control unit A655 sends the SET_ADV_IND_3 command to the PTR wireless communication unit A612. The PTR wireless communication unit A612 transmits the advertising packet ADV_IND_3 including the UUID 3 of Service 3 corresponding to the second printing service. Thereafter, the advertisement to the central apparatus is carried out in accordance with the advertising interval.

On the other hand, in S1777, the DSC control unit A755 issues an advertisement start event including the UUID 2 of Service 2 corresponding to the image transfer service. Then, in S1778, the DSC control unit A755 transmits the SET_ADV_IND_2 command to the DSC wireless communication unit A712. The DSC wireless communication unit A712 transmits an advertising packet ADV_IND_2 including the UUID 2 of Service 2 corresponding to the image transfer service. Thereafter, the advertisement to the central apparatus is carried out in accordance with the advertising interval.

In SEQ 1711, in S1779, the PTR control unit A655 transmits the SET_ADV_IND_1 command to the PTR wireless communication unit A612. The PTR wireless communication unit A612 transmits the advertising packet ADV_IND_1 including the UUID 1 of Service 1 corresponding to the first printing service. In S1780, the PTR control unit A655 sends the SET_ADV_IND_3 command to the PTR wireless communication unit A612. The PTR wireless communication unit A612 transmits the advertising packet ADV_IND_3 including the UUID 3 of Service 3 corresponding to the second printing service. Thereafter, the printing apparatus 601 transmits the advertising packet for the second printing service during the advertising interval of the first printing service, and waits for a connection request from the central apparatus.

Sequence in which Image Capturing Apparatus and Printing Apparatus Connect to Communication Apparatus Next, a sequence in which the printing apparatus 601 and the image capturing apparatus 701 establish BLE communication links with the communication apparatus 801, which serves as a BLE central role apparatus, will be described with reference to FIGS. 18A to 18C.

In SEQ 1801, the PTR wireless communication unit A612 transmits the advertising packet ADV_IND_1, including the UUID 1 of Service 1 corresponding to the first printing service, in accordance with the advertising interval, in S1779. In S1780, the PTR wireless communication unit A612 transmits the advertising packet ADV_IND_1, including the UUID 3 of Service 3 corresponding to the second printing service, in accordance with the advertising interval. Additionally, in S1778, the DSC wireless communication unit A712 transmits the advertising packet ADV_IND_2, including the UUID 2 of Service 2 corresponding to the image transfer service, in accordance with the advertising interval.

At this time, the OTH control unit A855 scans the advertising packets in response to the GET_ADV_IND command using the OTH wireless communication unit A812, and the OTH wireless communication unit A812 returns the result of the scan as a RESPONSE to the OTH control unit A855. The OTH control unit A855 acquires the values of the advertising packet, confirms that the UUID 1 corresponding to the first printing service of the printing apparatus 601 is included in the advertising packet, and confirms that that service can be used.

If the first printing service can be used, the OTH control unit A855 transmits the START_601_CONNECT command to the OTH wireless communication unit A812, and starts the establishment of a BLE communication link between the communication apparatus 801 and the printing apparatus 601. When the communication link is established, the OTH wireless communication unit A812 notifies the OTH control unit A855 of the establishment of the BLE communication link with the COMP_601_CONNECT command. Additionally, the PTR wireless communication unit A612 notifies the PTR control unit A655 of the establishment of the BLE communication link with the COMP_801_CONNECT command. The OTH wireless communication unit A812 transmits a DATA_PACKET to the PTR wireless communication unit A612, and receives a DATA_PACKET as a response thereto. Thereafter, the BLE communication link is maintained, with the communication apparatus 801 serving as a BLE central role apparatus and the printing apparatus 601 serving as a BLE peripheral role apparatus, in accordance with the communication interval.

In SEQ 1802, in S1851, the PTR control unit A655 transmits the SET_ADV_IND_3 command to the PTR wireless communication unit A612. The PTR wireless communication unit A612 transmits the advertising packet ADV_IND_3 including the UUID 3 of Service 3 corresponding to the second printing service. In this manner, the printing apparatus 601 transmits the advertising packet for the second printing service during the BLE communication interval, and waits for a connection request from another central apparatus.

On the other hand, the OTH control unit A855 scans the advertising packets in response to the GET_ADV_IND command using the OTH wireless communication unit A812. The OTH wireless communication unit A812 returns the result of the scan as a RESPONSE to the OTH control unit A855. The OTH control unit A855 acquires the values of the advertising packet, confirms that the UUID 2 corresponding to the image transfer service of the image capturing apparatus 701 is included in the advertising packet, and confirms that that service can be used.

If the image transfer service can be used, the OTH control unit A855 sends the START_701_CONNECT command to the OTH wireless communication unit A812, and starts the establishment of a BLE communication link between the communication apparatus 801 and the image capturing apparatus 701. When the communication link is established, the OTH wireless communication unit A812 notifies the OTH control unit A855 of the establishment of the BLE communication link with the COMP_701_CONNECT command. Additionally, the DSC wireless communication unit A712 notifies the DSC control unit A755 of the establishment of the BLE communication link with a COMP_801_CONNECT command. The OTH wireless communication unit A812 transmits a DATA_PACKET to the DSC wireless communication unit A712, and receives a DATA_PACKET as a response thereto. Thereafter, the BLE communication link is maintained, with the communication apparatus 801 serving as a BLE central role apparatus and the image capturing apparatus 701 serving as a BLE peripheral role apparatus, in accordance with the communication interval.

In SEQ 1803, in S1852 (and in S1853 and S1854 following thereafter), the PTR control unit A655 transmits the SET_ADV_IND_3 command to the PTR wireless communication unit A612. The PTR wireless communication unit A612 transmits the advertising packet ADV_IND_3 including the UUID 3 of Service 3 corresponding to the second printing service, but in the example illustrated in FIGS. 18A to 18C, there are no connection requests from other central apparatuses.

The communication apparatus 801 that has established BLE connections with the printing apparatus 601 and the image capturing apparatus 701 communicates with both of those apparatuses. In other words, the OTH wireless communication unit A812 transmits a DATA_PACKET to the DSC wireless communication unit A712, and receives a DATA_PACKET as a response thereto. Additionally, the OTH wireless communication unit A812 transmits a DATA_PACKET to the PTR wireless communication unit A612, and receives a DATA_PACKET as a response thereto. The communication apparatus 801 maintains the established BLE connection thereafter.

Figure 18B:
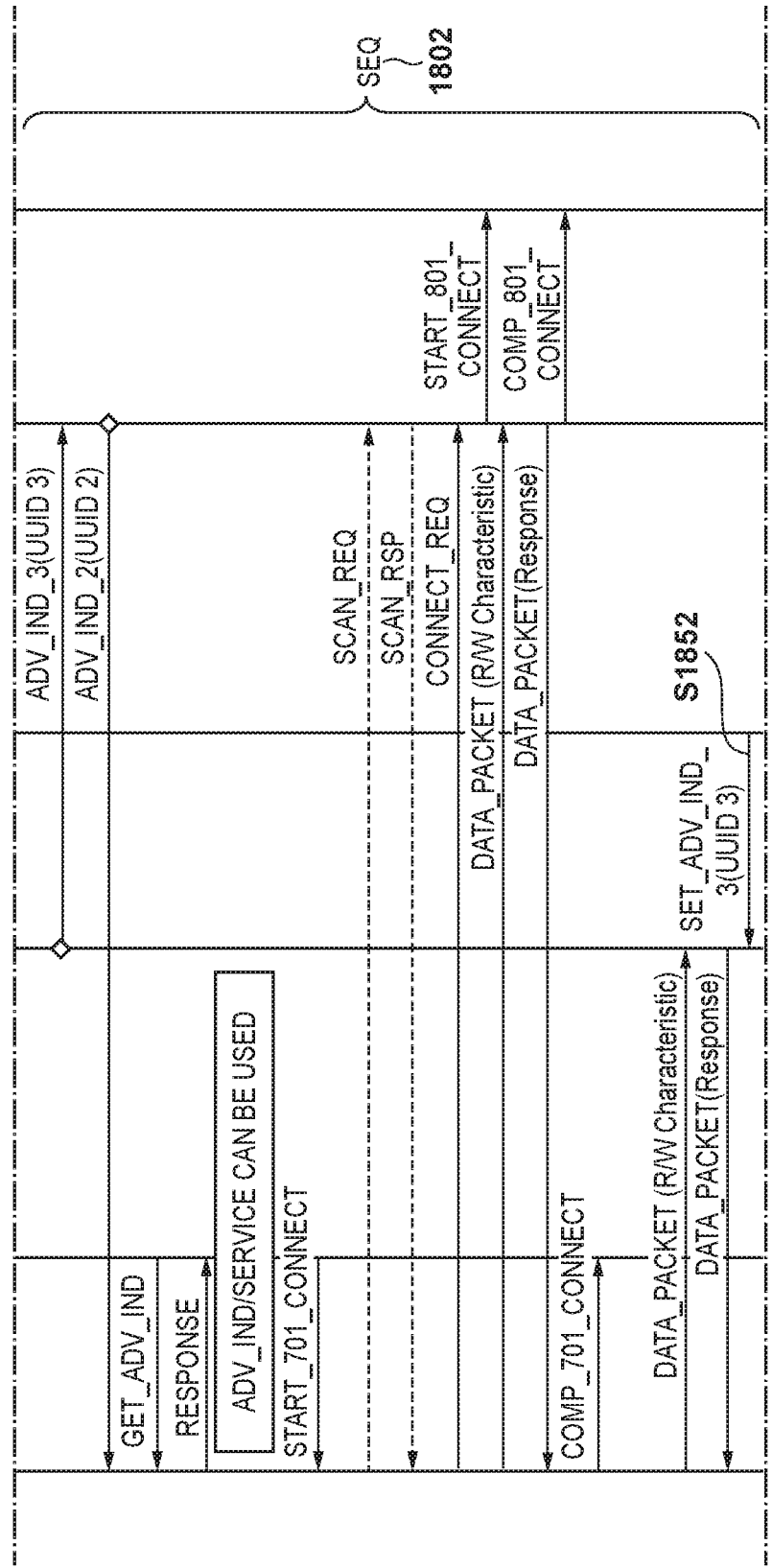

Once the sequence illustrated in FIGS. 18A to 18C ends, BLE communication is being carried out between the communication apparatus 801 and the printing apparatus 601, and between the communication apparatus 801 and the image capturing apparatus 701, which means it is possible to return to the sequence of FIG. 17A-1.

As described above, the image capturing apparatus 701 behaves as a central role apparatus (scanning the advertising packets) in between times carrying out the process for operating as a peripheral role. As a result, BLE communication can be established between the image capturing apparatus 701 and the printing apparatus 601, which were operating as peripheral apparatuses, and thus the desired service can be executed. In other words, in communication in which apparatuses having different roles are connected, an apparatus can easily connect to another apparatus operating in the same role as the self apparatus.

Fourth Embodiment

The third embodiment describes a case of operations in which, when the image capturing apparatus 701 and the printing apparatus 601, serving as peripherals, carry out BLE communication with a central role apparatus, the image capturing apparatus 701 changes its role and establishes BLE communication with the printing apparatus 601. The fourth embodiment will describe an example of operations in which BLE communication is established between the image capturing apparatus 701 and the printing apparatus 601, which play the role of peripherals, from a state in which the image capturing apparatus 701 and the printing apparatus 601 are transmitting advertising packets and BLE communication is not yet established between the image capturing apparatus 701 and the printing apparatus 601. Note that the functional configurations of the apparatuses according to the present embodiment are the same, but parts of the sequences differ. As such, in the following, identical configurations and identical steps will be assigned the same reference signs and redundant descriptions will be skipped, with attention focused on the differences.

Sequence in which Printing Apparatus and Image Capturing Apparatus Connect

A sequence through which the printing apparatus 601 and the image capturing apparatus 701 connect will be described with reference to FIGS. 19A-1 to 19B-3. In this example, the communication apparatus 801 is not present, and the operations start from a state in which the printing apparatus 601 and the image capturing apparatus 701 are transmitting advertising packets and a BLE communication link is not yet established between the printing apparatus 601 and the image capturing apparatus 701. Additionally, at the start of the sequence in FIG. 19A-1, the printing apparatus 601 and the image capturing apparatus 701 are present in the BLE communication range, whereas the communication apparatus 801 is not present in the BLE communication range, as illustrated in FIG. 12C.

In SEQ 1901, the PTR wireless communication unit A612 transmits the advertising packet ADV_IND_1, including the UUID 1 of Service 1 corresponding to the first printing service, in accordance with the advertising interval, in S1951. In S1952, the PTR wireless communication unit A612 transmits the advertising packet ADV_IND_1, including the UUID 3 of Service 3 corresponding to the second printing service, in accordance with the advertising interval. On the other hand, in the image capturing apparatus 701 too, the DSC wireless communication unit A712 transmits the advertising packet ADV_IND_2 including the UUID 2 of Service 2 corresponding to the image transfer service, in accordance with the advertising interval. Here, in S1953, the DSC control unit A755 enters the printing service execution mode in response to a user operation. In accordance with this mode being entered, the advertising packets are scanned in response to the GET_ADV_IND command using the DSC wireless communication unit A712. The DSC wireless communication unit A712 returns the result of the scan as a RESPONSE to the DSC control unit A755.

In S1954, the DSC control unit A755 acquires the values of the advertising packet, and confirms whether the advertising packet can be received, or that the UUID 3 corresponding to the second printing service is not included in the advertising packet. Thereafter, the image capturing apparatus 701 scans the advertising packets during the BLE communication interval, and waits for an advertising packet, including the UUID corresponding to a service that is valid in combination with the self apparatus, to be received.

On the other hand, in S1955, the PTR wireless communication unit A612 transmits the advertising packet ADV_IND_1 including the UUID 3 of Service 1 corresponding to the first printing service. Additionally, in S1956, the PTR wireless communication unit A612 of the printing apparatus 601 transmits the advertising packet ADV_IND_3 including the UUID 3 of Service 3 corresponding to the second printing service.

In SEQ 1903, the DSC control unit A755 scans the advertising packets in response to the GET_ADV_IND command using the DSC wireless communication unit A712. The DSC wireless communication unit A712 returns the result of the scan as a RESPONSE to the DSC control unit A755. In S1957, the DSC control unit A755 of the image capturing apparatus 701 acquires the values of the advertising packet, confirms that the UUID 3 corresponding to the second printing service is included in the advertising packet, and confirms that that service can be used.

In accordance with the service being usable, in S1958, the DSC control unit A755 transmits the START_601_CONNECT command to the DSC wireless communication unit A712. Then, the establishment of a BLE communication link between the image capturing apparatus 701 and the printing apparatus 601 is started. Once the communication link is established, the DSC wireless communication unit A712 notifies the DSC control unit A755 of the establishment of the BLE communication link with a COMP_601_CONNECT command. The PTR wireless communication unit A612 notifies the PTR control unit A655 of the establishment of the BLE communication link with a COMP_701_CONNECT command.

The DSC wireless communication unit A712 then transmits a DATA_PACKET to the PTR wireless communication unit A612, and receives a DATA_PACKET. Thereafter, the BLE communication is continued between the image capturing apparatus 701, which operates as a central, and the printing apparatus 601, which operates as a peripheral, in accordance with the communication interval.

Once the sequence up to SEQ 1903 ends, the printing apparatus 601 and the image capturing apparatus 701 are still present in the BLE communication range, as in FIG. 12C, but a BLE communication link is established between the image capturing apparatus 701 and the printing apparatus 601, as illustrated in FIG. 12D.

The sequence from SEQ 1905 to SEQ 1911 is the same as the operations from SEQ 1705 to SEQ 1711, described in the third embodiment, with the operations of the communication apparatus 801 omitted. Descriptions thereof will accordingly be omitted.

According to the present embodiment as described above, the image capturing apparatus 701 behaves as a central role apparatus (scanning the advertising packets) in between times the process of operating as a peripheral role. As a result, BLE communication can be established between the image capturing apparatus 701 and the printing apparatus 601, which were operating as peripheral apparatuses, and thus the desired service can be executed.

Other Embodiments

The foregoing embodiments described examples in which the advertising packets transmitted by the printing apparatus 601 and the image capturing apparatus 701 use advertising packets ADV_IND capable of connection requests (SCAN_REQ). However, the advertising packets that can be applied in the foregoing embodiments are not limited to advertising packets capable of making connection requests. For example, if a central role apparatus has established a BLE communication link once, the foregoing embodiments can be realized even if a direct advertising packet ADV_DIRECT_IND, which does not require a connection request, is used. When a direct advertising packet is used, the printing apparatus 601 transmits a direct advertising packet ADV_DIRECT_IND1, including the UUID 1 indicating that the printing service (Service 1) can be executed. The image capturing apparatus 701, meanwhile, transmits a direct advertising packet ADV_DIRECT_IND2, including the UUID 2 indicating that the image transfer service (Service 2) can be executed.

Additionally, in the foregoing embodiments, the printing apparatus 601 scans the advertising packets during the BLE communication interval or the advertising interval. However, in the foregoing embodiments, the scanning of the advertising packets need not be carried out continuously during the aforementioned intervals. For example, if the printing apparatus 601 is already printing onto the printing medium, the scanning of the advertising packets may be stopped temporarily during the interval, and the scanning of the advertising packets during the interval may then be carried out after the printing has ended.

Furthermore, the foregoing embodiments describe an example in which the printing apparatus 601, the image capturing apparatus 701, and the communication apparatus 801 communicate using BLE. However, the foregoing embodiments are not limited to BLE, which is a short-range wireless communication standard. In other words, any wireless communication unit may be used as long as the configuration is such that when one apparatus (playing the role of peripheral or central) transmits an advertising packet (information indicating the presence of the self apparatus), the other apparatus makes a connection request in response thereto and wireless communication is established between the two apparatuses. Additionally, the peripheral role apparatus may be referred to as a "slave apparatus", and the central role apparatus may be referred to as a "master apparatus". In other words, any wireless communication unit may be used as long as the slave apparatus transmits an advertising packet, the master apparatus makes a connection request, and wireless communication is established between the two apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that executes a service which is executable by the communication apparatus by communicating with an external apparatus, the communication apparatus comprising:
   a communication unit configured to establish a connection with the external apparatus including a first external apparatus and a second external apparatus and communicating data with the external apparatus in order to execute the service; and
   a control unit configured to control the communication unit so that the communication apparatus operates as a first role corresponding to a role of slave in the case of connecting to the first external apparatus operating as a second role corresponding to a role of master, and so that the communication apparatus operates as the second role in the case of connecting to the second external apparatus operating as the first role,
   wherein the control unit controls the communication unit so that the communication apparatus operates as the second role to connect to the second external apparatus operating as the first role in between times when the communication apparatus carries out a process for operating as the first role and periodically transmitting a predetermined signal in the case where the communication apparatus is caused to operate as the second role in order to connect to the second external apparatus, the control unit controls the communication unit to receive information indicating the presence of the second external apparatus,
   in wireless communication between the role of slave, corresponding to the first role, and the role of master, corresponding to the second role, the control unit controls the communication unit so that the communication unit transmits information indicating the presence of the communication apparatus to the second external apparatus in the case where the communication apparatus operates as the role of the slave, and the communication unit receives information indicating the presence of the second external apparatus from the second external apparatus in the case where the communication apparatus operates as the role of the master.

2. The communication apparatus according to claim 1, wherein, in the case where a connection with the first external apparatus is established, the control unit controls the communication unit to receive the information indicating the presence of the second external apparatus while a service is not being executed with the first external apparatus.

3. The communication apparatus according to claim 1, wherein, in the case where a connection is not established with the first external apparatus, the control unit controls the communication unit to transmit information indicating the presence of the communication apparatus to the first external apparatus at predetermined time intervals, and to receive the information indicating the presence of the second external apparatus in between times of the predetermined time intervals.

4. The communication apparatus according to claim 2, wherein the control unit controls the communication unit so as to disconnect the connection with the first external apparatus, and establish a connection with the second external apparatus so as to operate as the second role, in response to receiving the information indicating the presence of the second external apparatus.

5. The communication apparatus according to claim 3, wherein
the control unit controls the communication unit so as to stop transmitting information indicating the presence of the communication apparatus to the first external apparatus, and establish a connection with the second external apparatus so as to operate as the second role, in response to receiving the information indicating the presence of the second external apparatus.

6. The communication apparatus according to claim 4, wherein the control unit controls the communication unit so as to disconnect the connection with the second external apparatus after communicating data with the second external apparatus in order to execute the service, and transmit information indicating the presence of the communication apparatus to the first external apparatus at predetermined time intervals so as to operate as the first role.

7. The communication apparatus according to claim 1, wherein the control unit controls the communication unit so as to transmit information, indicating that the communication apparatus cannot connect to an external apparatus, to the first external apparatus, in response to the information indicating the presence of the second external apparatus being received.

8. The communication apparatus according to claim 1, wherein the control unit controls the communication unit so as to transmit information indicating the presence of the communication apparatus to the second external apparatus before receiving information indicating the presence of the second external apparatus.

9. The communication apparatus according to claim 1, wherein the control unit controls the communication unit so as to operate as the first role before operating as the second role.

10. The communication apparatus according to claim 1, wherein the communication unit is configured to establish a connection with the second external apparatus using a second wireless communication method by establishing a connection with the second external apparatus using a first wireless communication method, and communicate data with the second external apparatus using the second wireless communication method.

11. A control method for a communication apparatus, the communication apparatus including communication unit that execute a service which is executable by the communication apparatus by communicating with an external apparatus, the communication unit being communication unit that establish a connection with the external apparatus including a first external apparatus and a second external apparatus and communicate data for executing the service with the external apparatus, the control method for the communication apparatus comprising:
controlling the communication unit so that the communication apparatus operates as a first role corresponding to a role of slave in the case of connecting to the first external apparatus operating as a second role corresponding to a role of master, and so that the communication apparatus operates as the second role in the case of connecting to the second external apparatus operating as the first role,
wherein in the controlling, the communication unit is controlled so that the communication apparatus operates as the second role to connect to the second external apparatus operating as the first role in between times when the communication apparatus carries out a process for operating as the first role and periodically transmitting a predetermined signal,
wherein in the case where the communication apparatus is caused to operate as the second role in order to connect to the second external apparatus, the communication unit is controlled to receive information indicating the presence of the second external apparatus, and
wherein in wireless communication between the role of slave, corresponding to the first role, and the role of master, corresponding to the second role, the communication unit is controlled so that the communication unit transmits information indicating the presence of the communication apparatus to the second external apparatus in the case where the communication apparatus operates as the role of the slave, and the communication unit receives information indicating the presence of the second external apparatus from the second external apparatus in the case where the communication apparatus operates as the role of the master.

12. A non-transitory computer readable storage medium storing a program for causing a computer to execute a control method of a communication apparatus, the communication apparatus including communication unit that execute a service which is executable by the communication apparatus by communicating with an external apparatus, the communication unit being communication unit that establish a connection with the external apparatus including a first external apparatus and a second external apparatus and communicate data for executing the predetermined service with the external apparatus, the control method for the communication apparatus comprising:
controlling the communication unit so that the communication apparatus operates as a first role corresponding to a role of slave in the case of connecting to the first external apparatus operating as a second role corresponding to a role of master, and so that the communication apparatus operates as the second role in the case of connecting to the second external apparatus operating as the first role,
wherein in the controlling, the communication unit is controlled so that the communication apparatus operates as the second role to connect to the second external apparatus operating as the first role in between times when the communication apparatus carries out a process for operating as the first role and periodically transmitting a predetermined signal,
wherein in the case where the communication apparatus is caused to operate as the second role in order to connect to the second external apparatus, the communication unit is controlled to receive information indicating the presence of the second external apparatus, and
wherein in wireless communication between the role of slave, corresponding to the first role, and the role of master, corresponding to the second role, the communication unit is controlled so that the communication unit transmits information indicating the presence of the communication apparatus to the second external apparatus in the case where the communication apparatus operates as the role of the slave, and the communication unit receives information indicating the presence of the second external apparatus from the second external apparatus in the case where the communication apparatus operates as the role of the master.

* * * * *